United States Patent [19]
Simpson et al.

[11] Patent Number: 5,303,528
[45] Date of Patent: Apr. 19, 1994

[54] STANDING SEAM ROOF ASSEMBLY AND SUPPORT APPARATUS

[75] Inventors: Harold G. Simpson, Tulsa, Okla.; Leo E. Neyer, Spokane, Wash.

[73] Assignee: Harold Simpson, Inc., Tulsa, Okla.

[21] Appl. No.: 846,278

[22] Filed: Mar. 2, 1992

Related U.S. Application Data

[60] Division of Ser. No. 402,901, Sep. 1, 1989, Pat. No. 5,142,838, which is a division of Ser. No. 745,320, Jun. 14, 1985, abandoned, which is a continuation-in-part of Ser. No. 713,319, Apr. 22, 1985, Pat. No. 4,620,397, Ser. No. 698,082, Feb. 4, 1985, abandoned, Ser. No. 568,083, Jan. 4, 1984, Pat. No. 4,597,234, Ser. No. 503,299, Jun. 10, 1983, Pat. No. 4,534,148, Ser. No. 481,858, Apr. 4, 1983, Pat. No. 4,525,976, Ser. No. 481,844, Apr. 4, 1983, Pat. No. 4,700,522, Ser. No. 428,568, Sep. 30, 1982, Pat. No. 4,602,468, and Ser. No. 378,241, May 14, 1982, Pat. No. 4,528,789.

[51] Int. Cl.⁵ .............................................. E04B 1/32
[52] U.S. Cl. ..................................... 52/640; 52/66; 52/90.1; 52/645
[58] Field of Search ............... 52/640, 641, 645, 66, 52/83, 408, 506, 693.4, 90, 126.6, 126.1, 126.3, 126.5, 199, 302, 22; 248/354.5, 188.5

[56] References Cited

U.S. PATENT DOCUMENTS

| | | | |
|---|---|---|---|
| 1,368,613 | 2/1921 | DeJong | 52/58 |
| 1,918,346 | 7/1933 | McHose | 52/58 |
| 3,407,548 | 10/1968 | Russell | 52/58 |
| 3,583,121 | 6/1971 | Tate | 52/481 |
| 3,740,917 | 6/1973 | Wong | 52/58 |
| 3,750,987 | 8/1973 | Gobel | 52/126.5 |
| 3,899,857 | 8/1975 | Mochizuki | 52/126 |
| 3,900,995 | 8/1975 | Ehrenberg | 52/126 |
| 4,106,256 | 8/1978 | Cody | 52/646 |
| 4,525,976 | 7/1985 | Simpson | 52/748 |
| 4,528,789 | 7/1985 | Simpson | 52/404 |
| 4,534,148 | 8/1985 | Simpson et al. | 52/640 |
| 4,597,234 | 7/1986 | Simpson et al. | 52/478 |
| 4,602,468 | 7/1986 | Simpson | 52/410 |
| 4,620,397 | 11/1986 | Simpson et al. | 52/66 |
| 4,631,878 | 12/1986 | Laramore | 52/90 |
| 4,700,522 | 10/1987 | Simpson | 52/528 |
| 5,142,838 | 9/1992 | Simpson et al. | 52/640 |

FOREIGN PATENT DOCUMENTS 2330824  6/1977  France .

Primary Examiner—Carl D. Friedman
Assistant Examiner—Beth A. Aubrey
Attorney, Agent, or Firm—Bill D. McCarthy

[57] ABSTRACT

An improved standing seam roof assembly and support apparatus which seeks to achieve a number of objects including improved panel joining integrity both at the standing seam joints along longitudinal edges of the panels and at interlapping panel ends including the four corner juncture areas. A unique interlocking standing seam joint features cooperative clip and side lap sealant positioning. Advantageous end lapping is securely sealed via end lap sealant and a cinch strap assembly which compresses and interconnects the panel ends. Novel notching of the panel ends permits installation of near identical panels in both a first installing direction and in a recovered second installing direction. Other features include adjustable and flexible roof panel supporting structures, improved panel center and edge hold-down assemblies, and an improved seam roller apparatus.

41 Claims, 29 Drawing Sheets

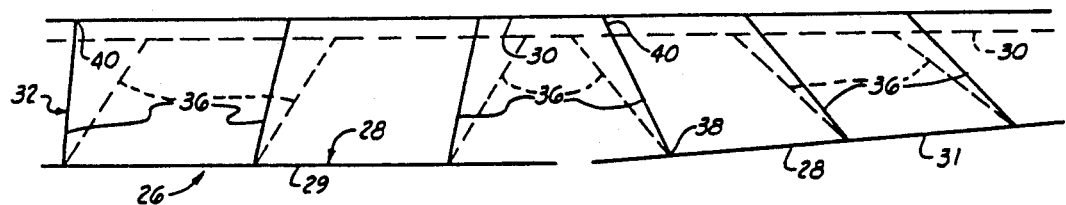
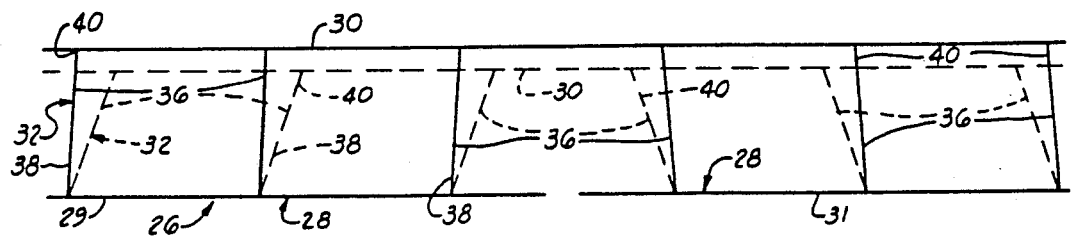
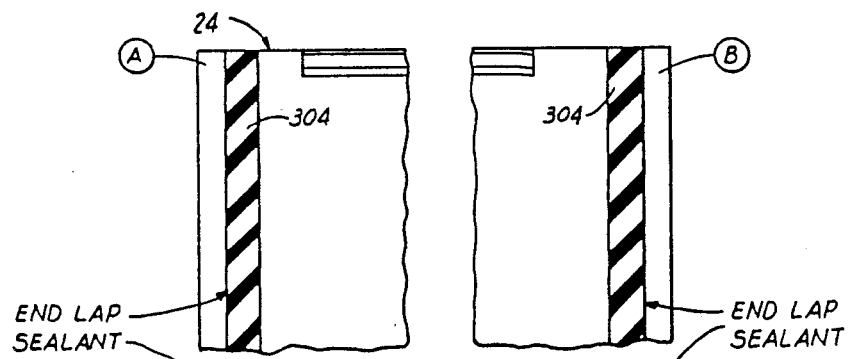

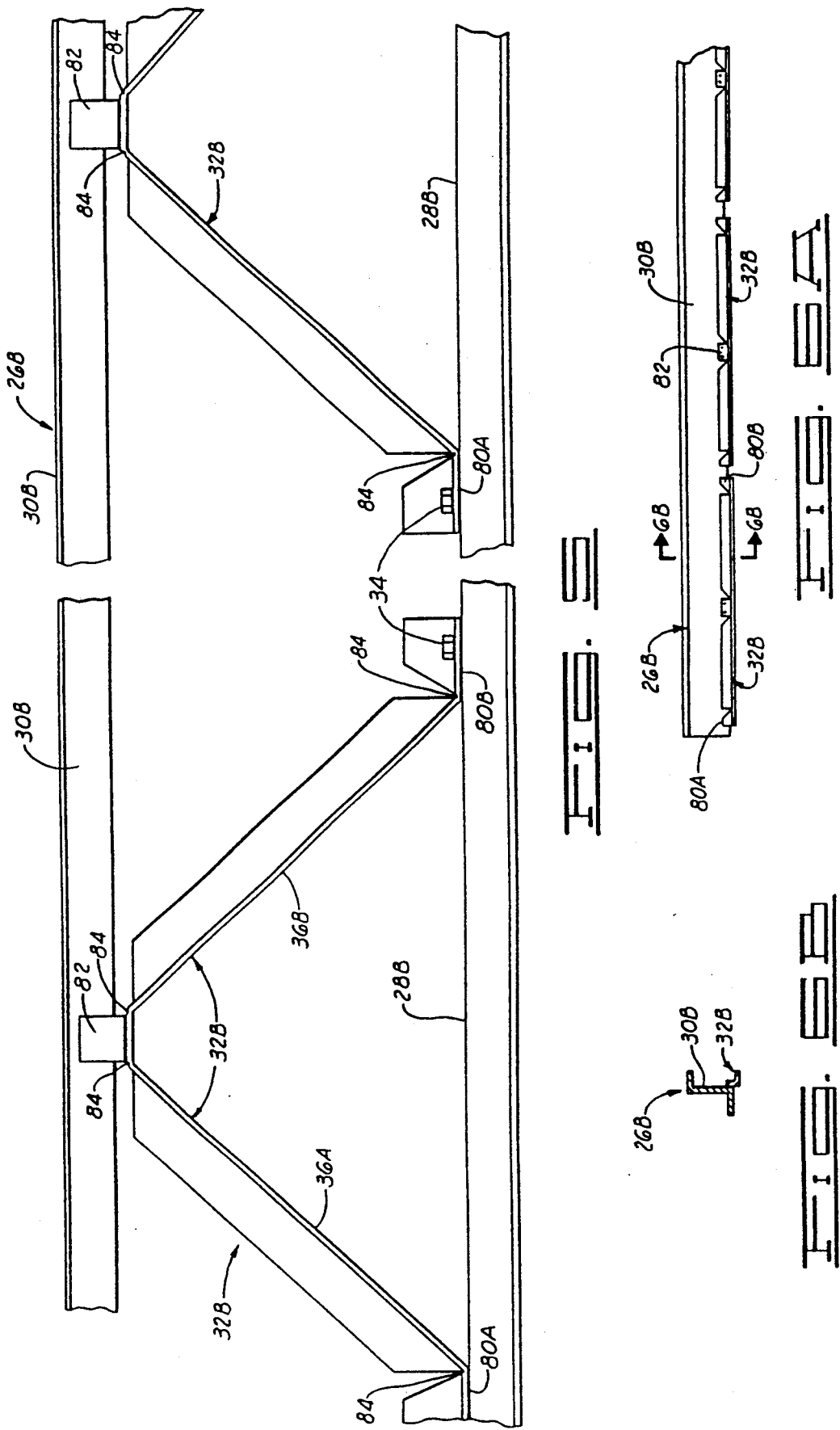

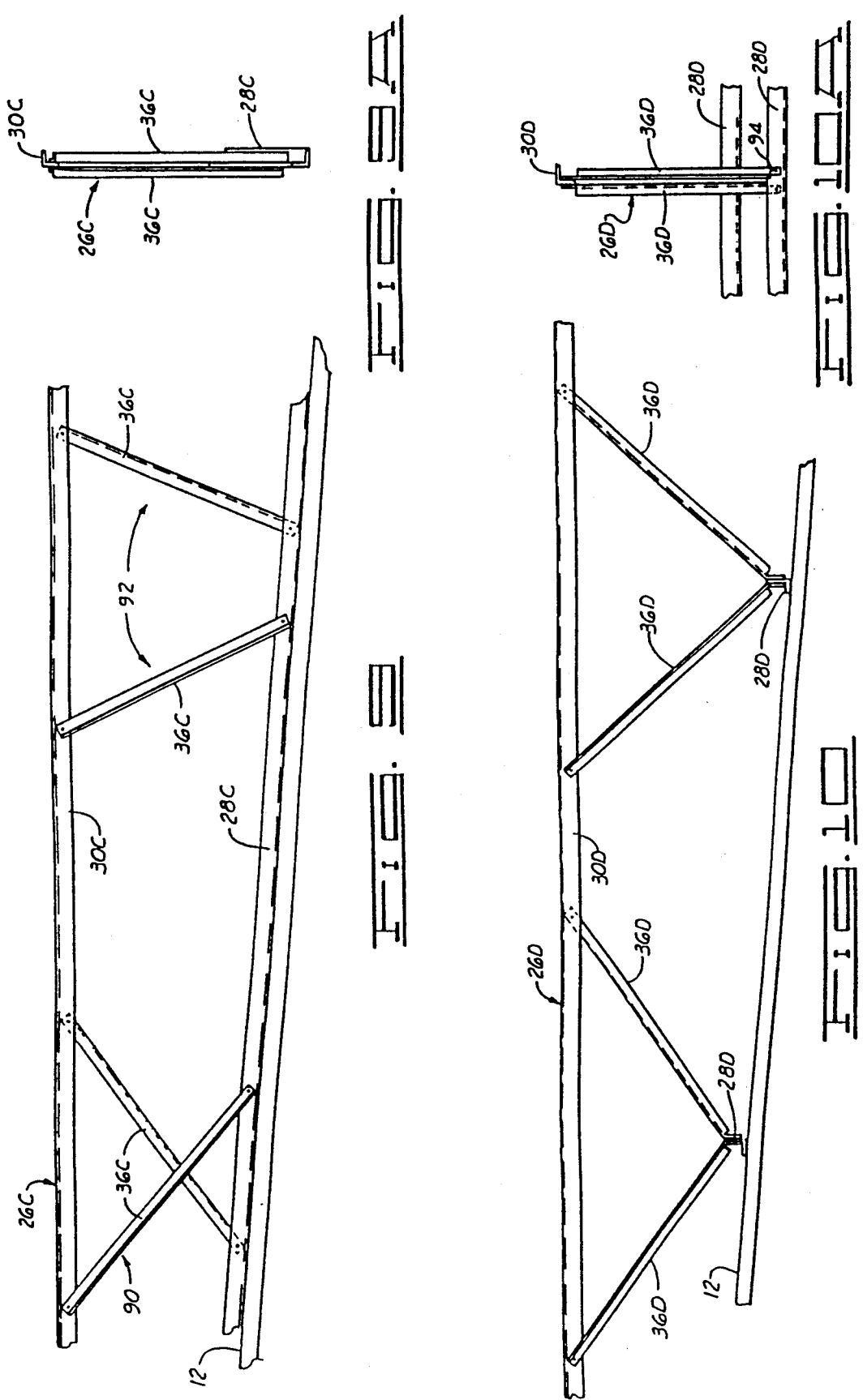

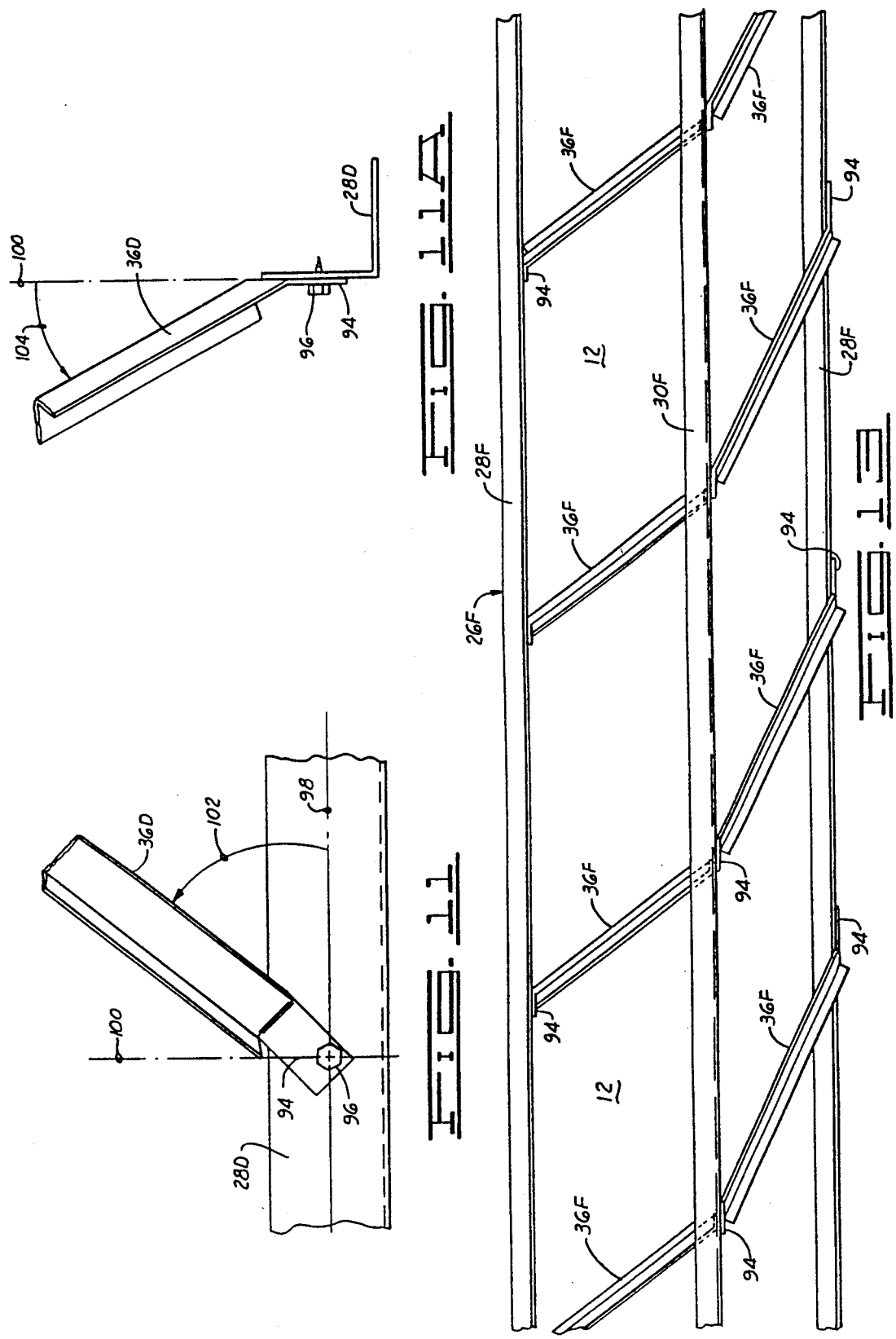

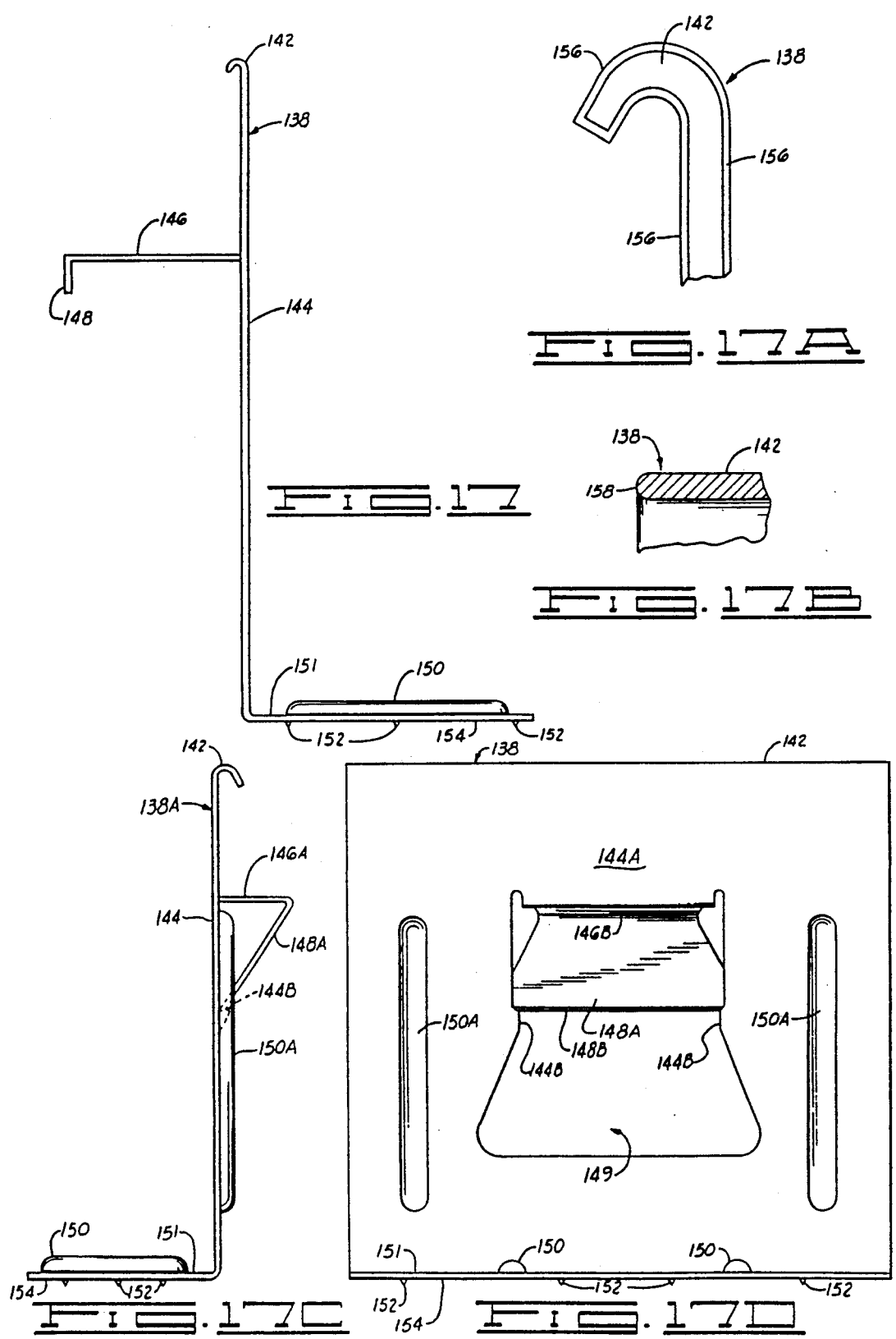

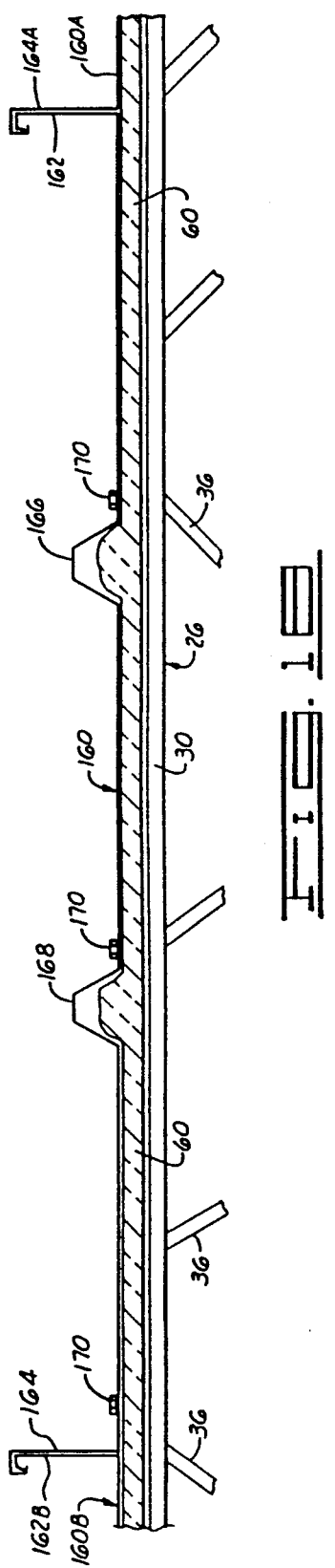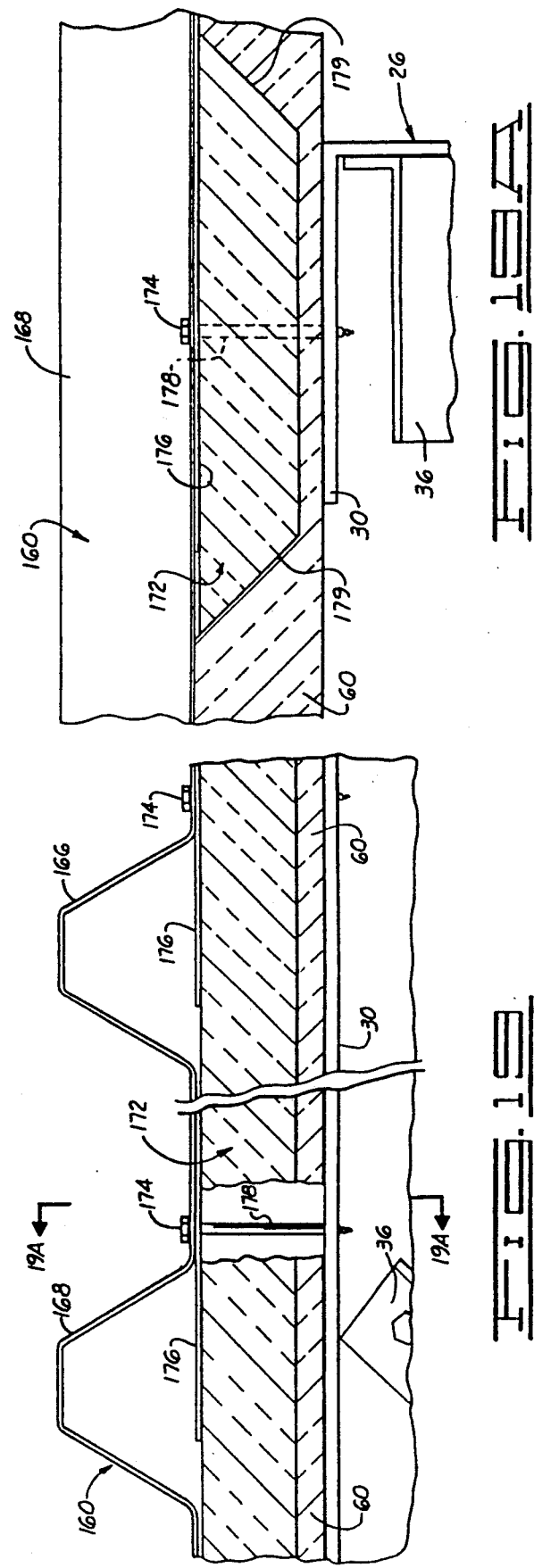

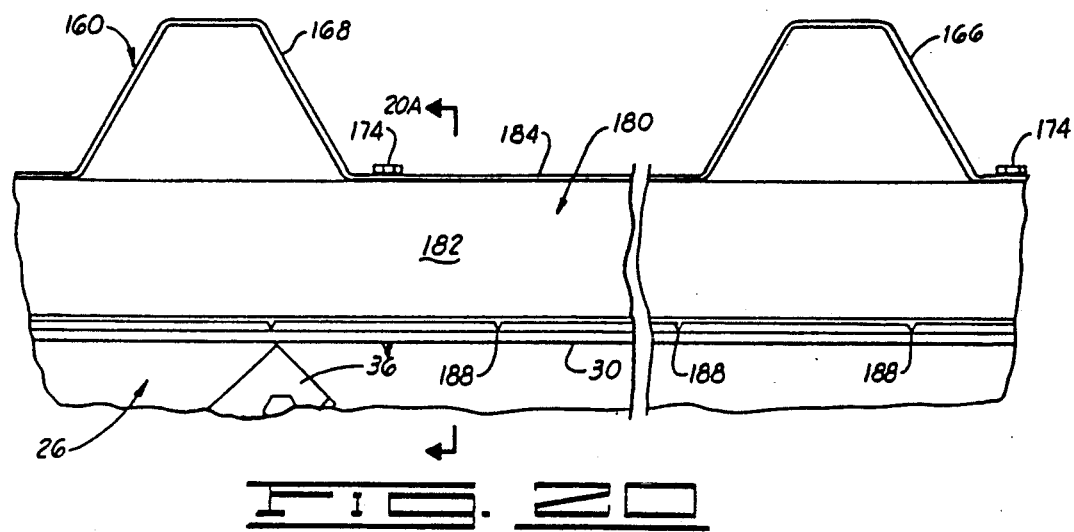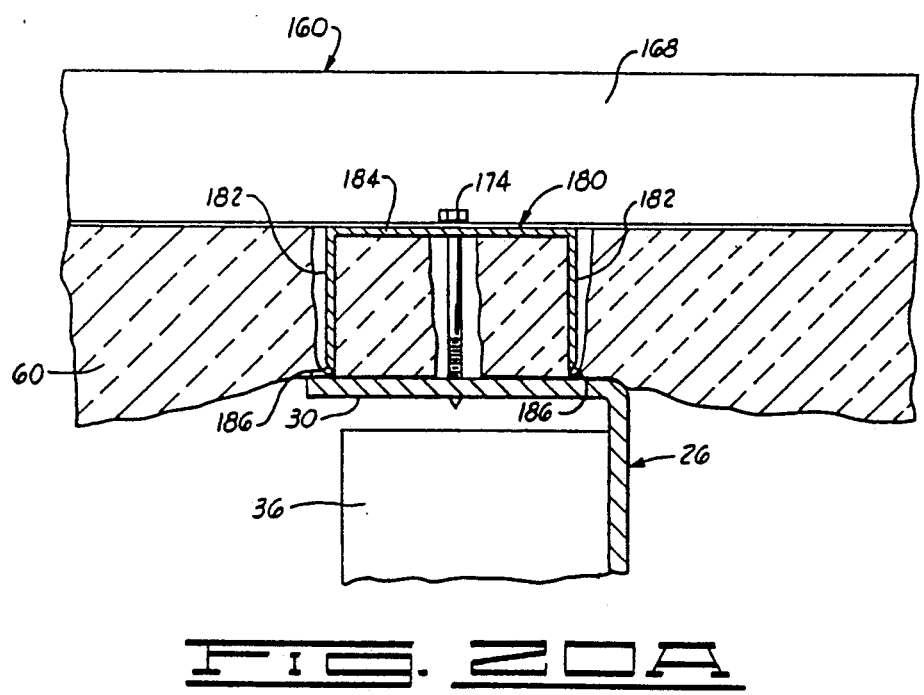

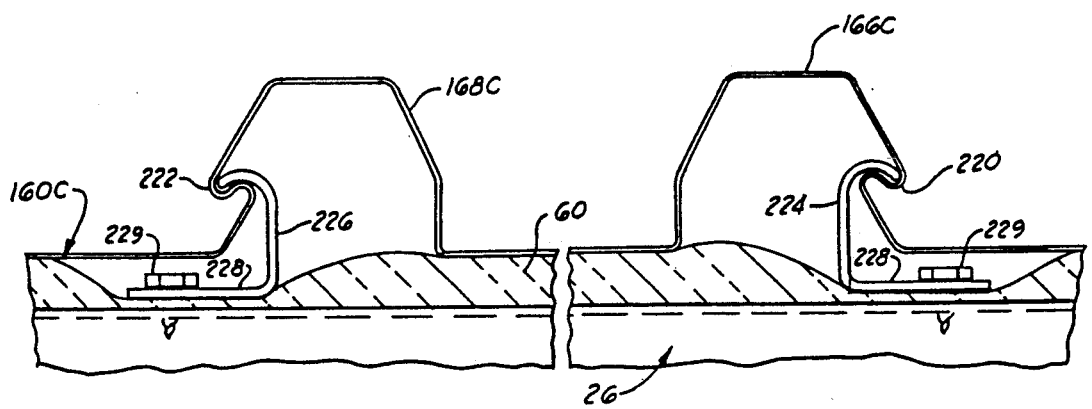
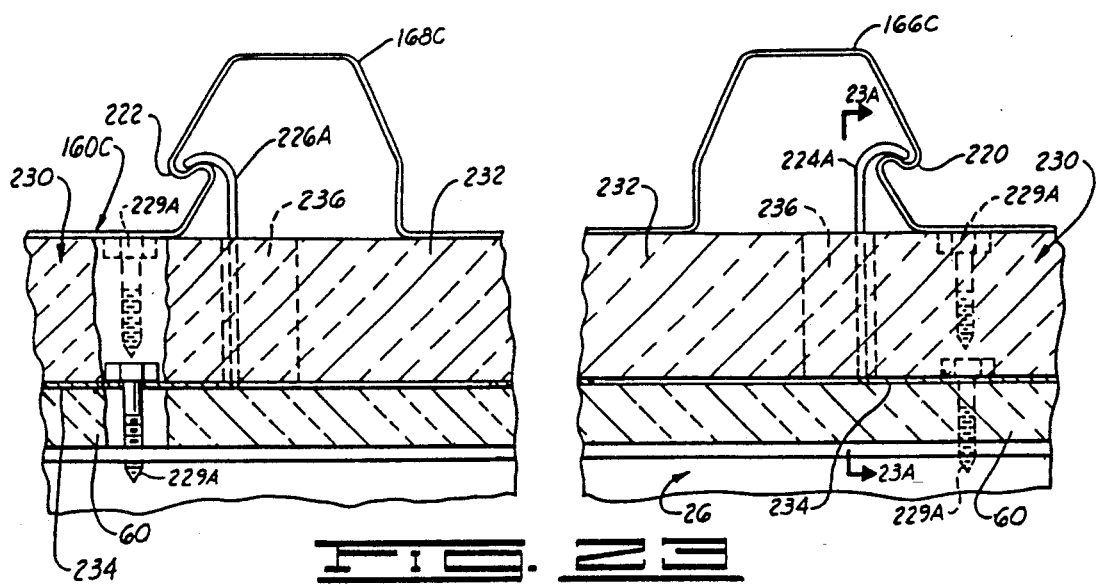
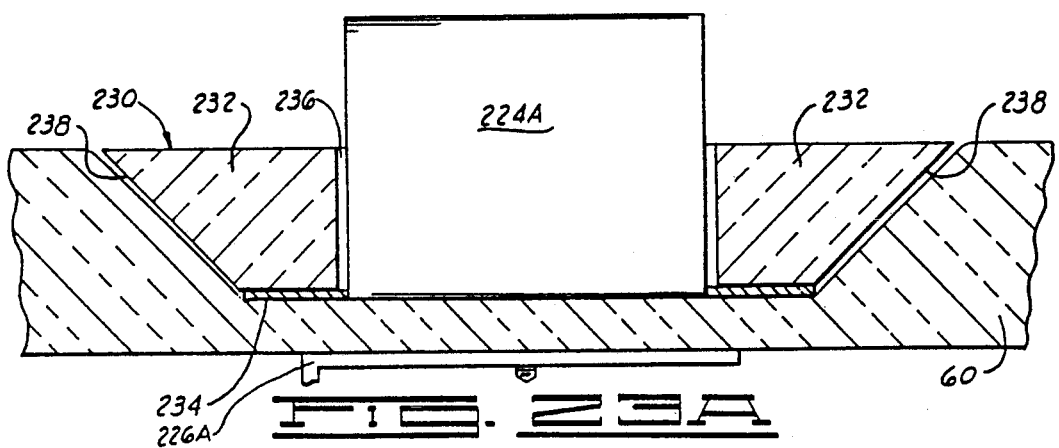
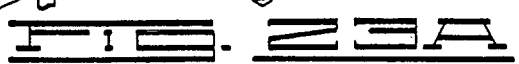

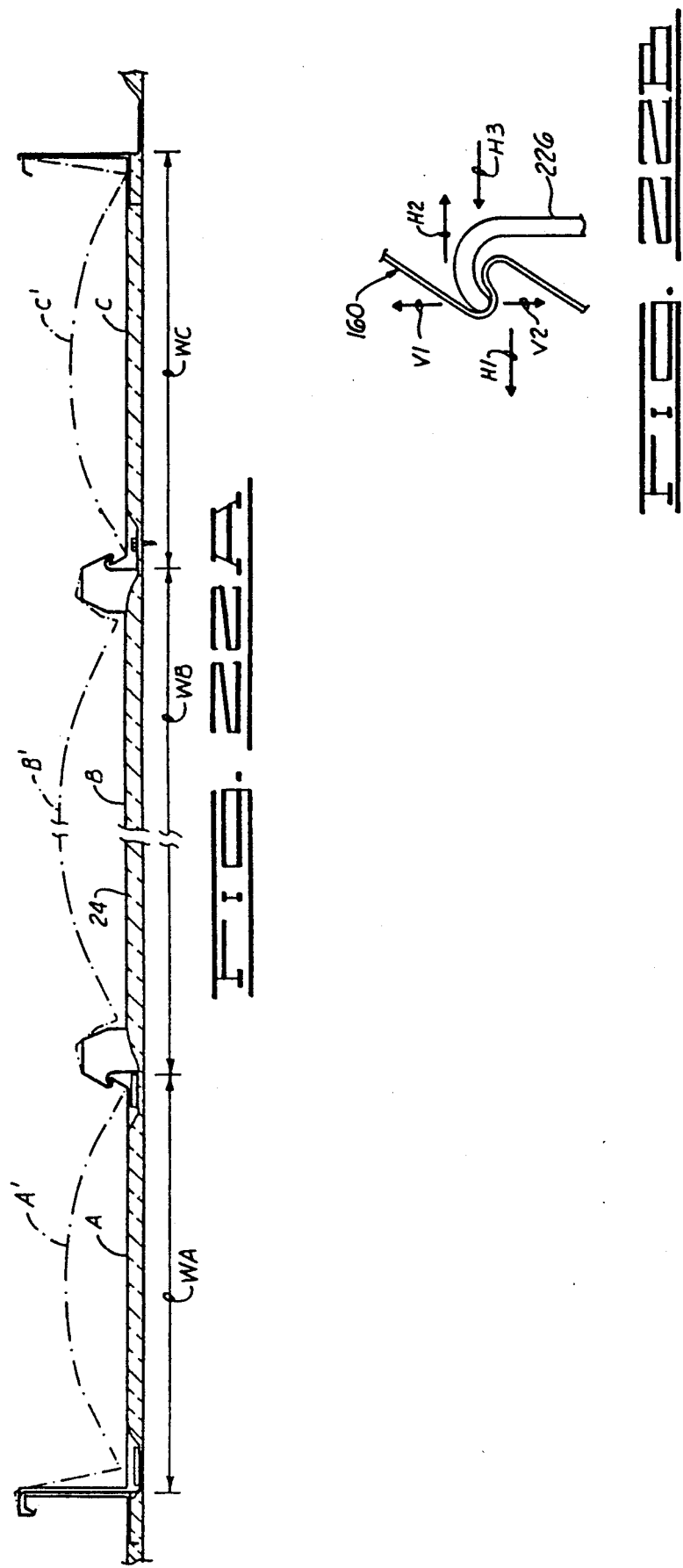

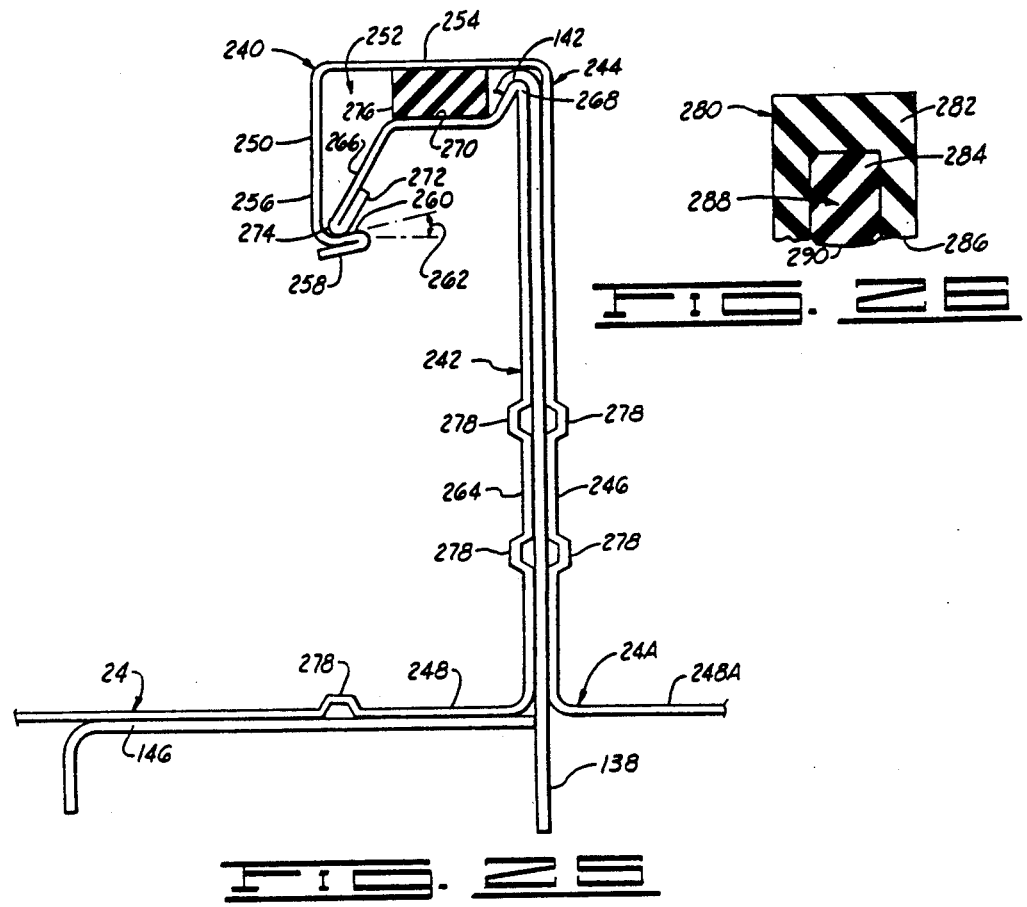
FIG. 26
FIG. 25
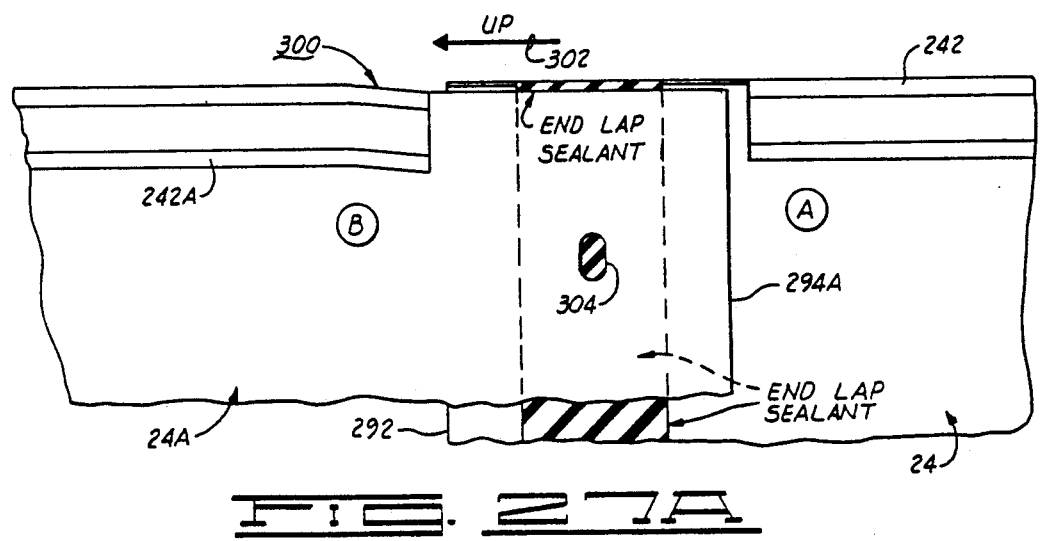
FIG. 27A

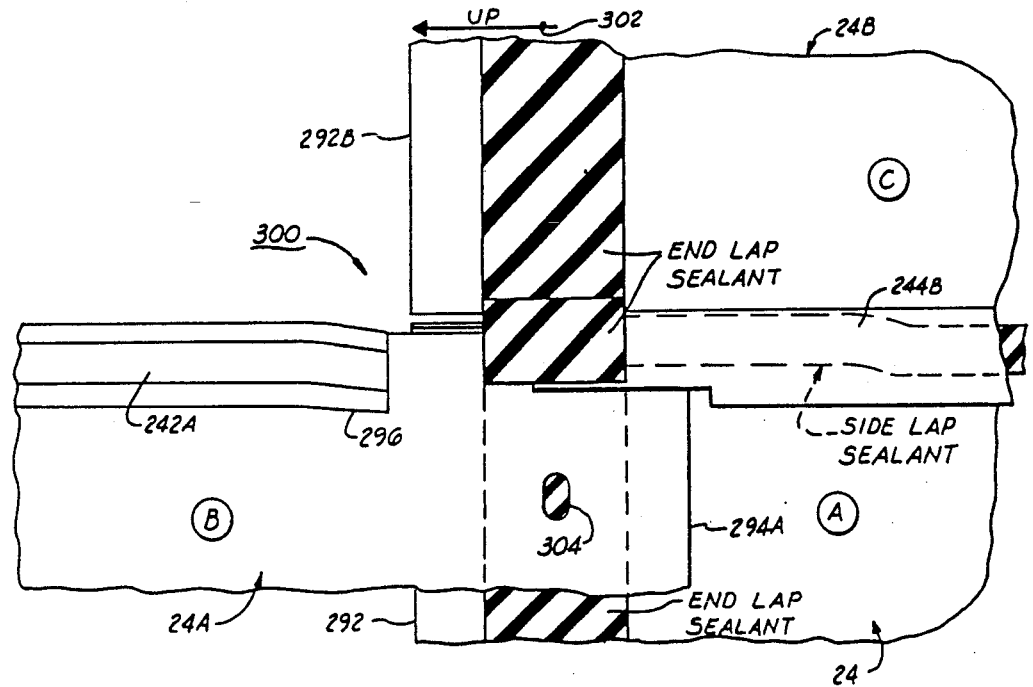
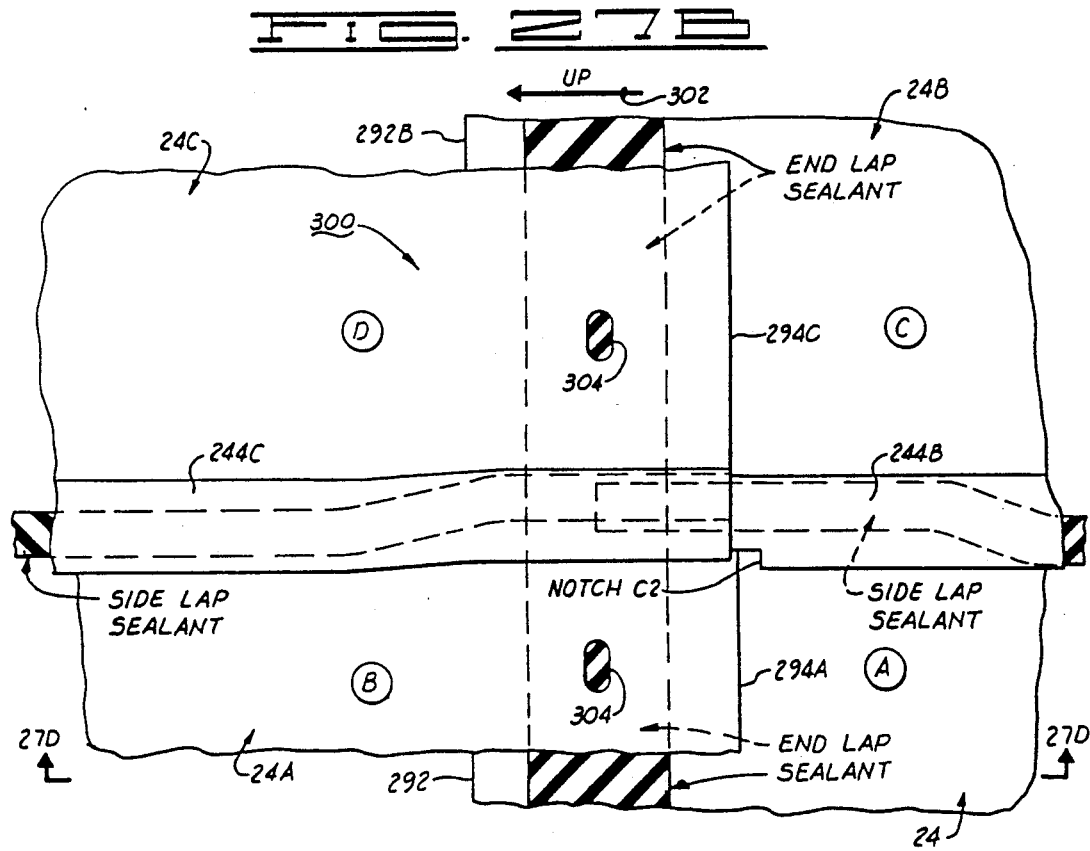

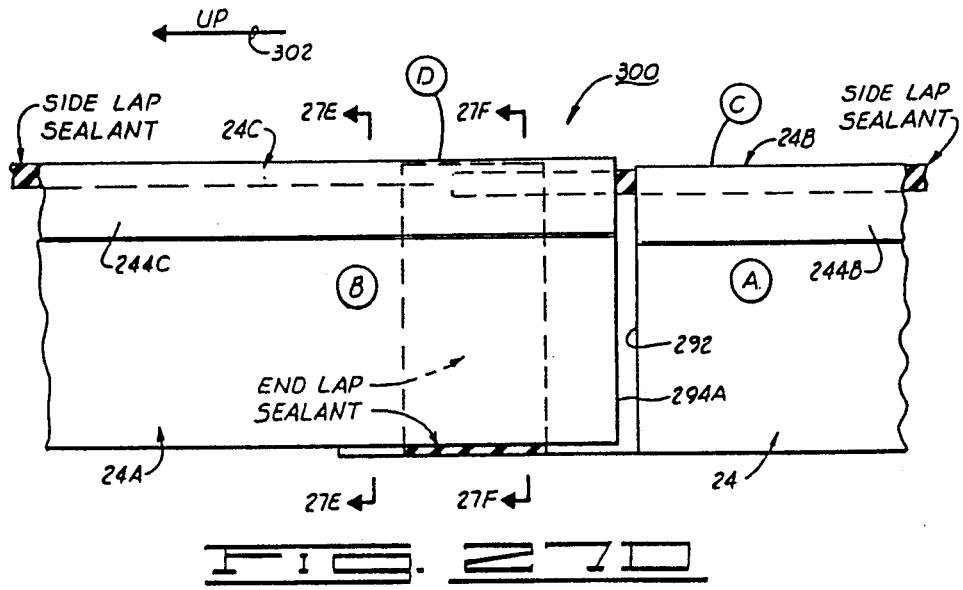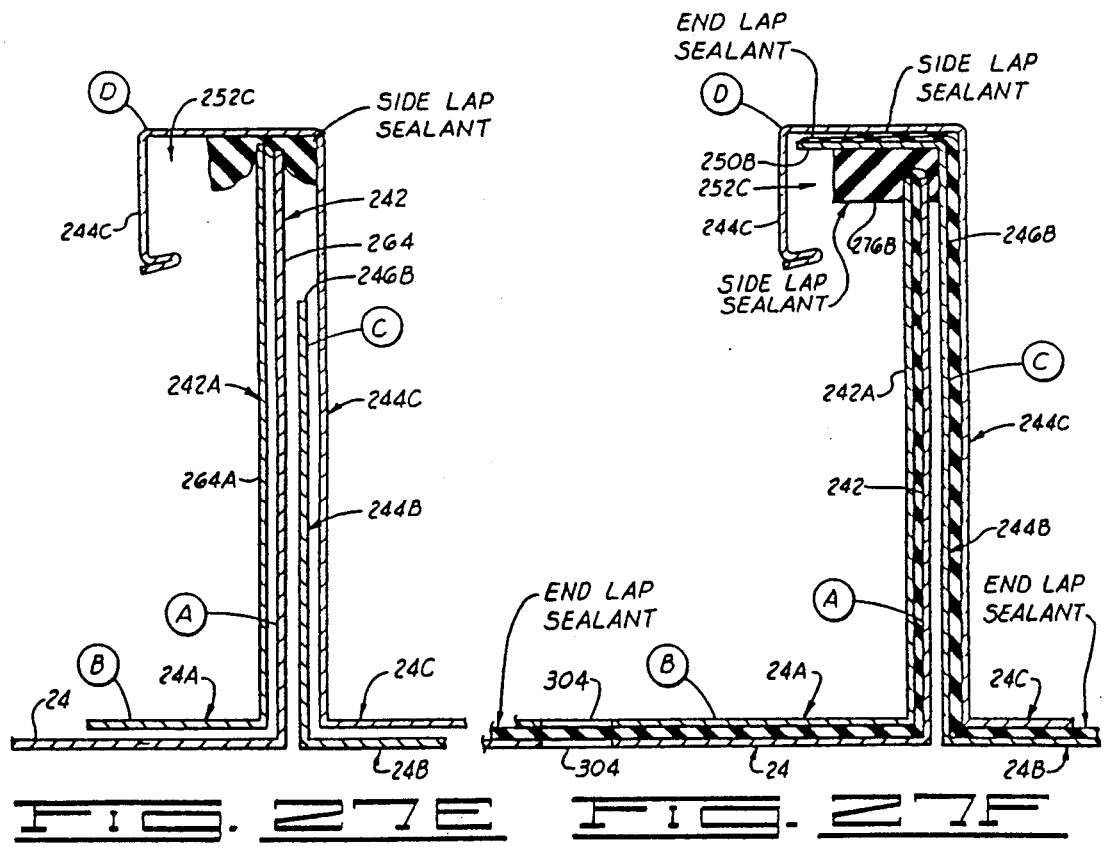

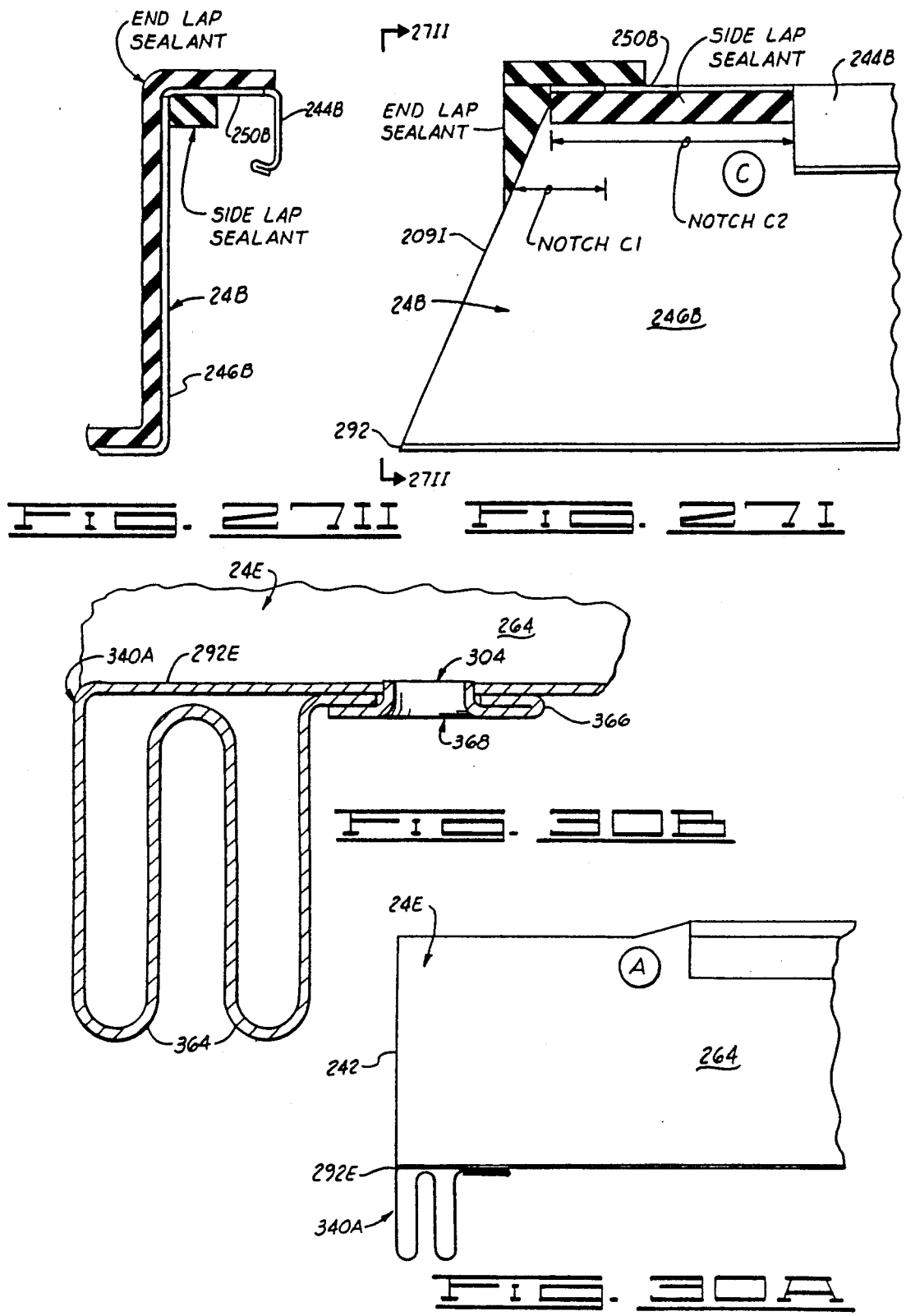

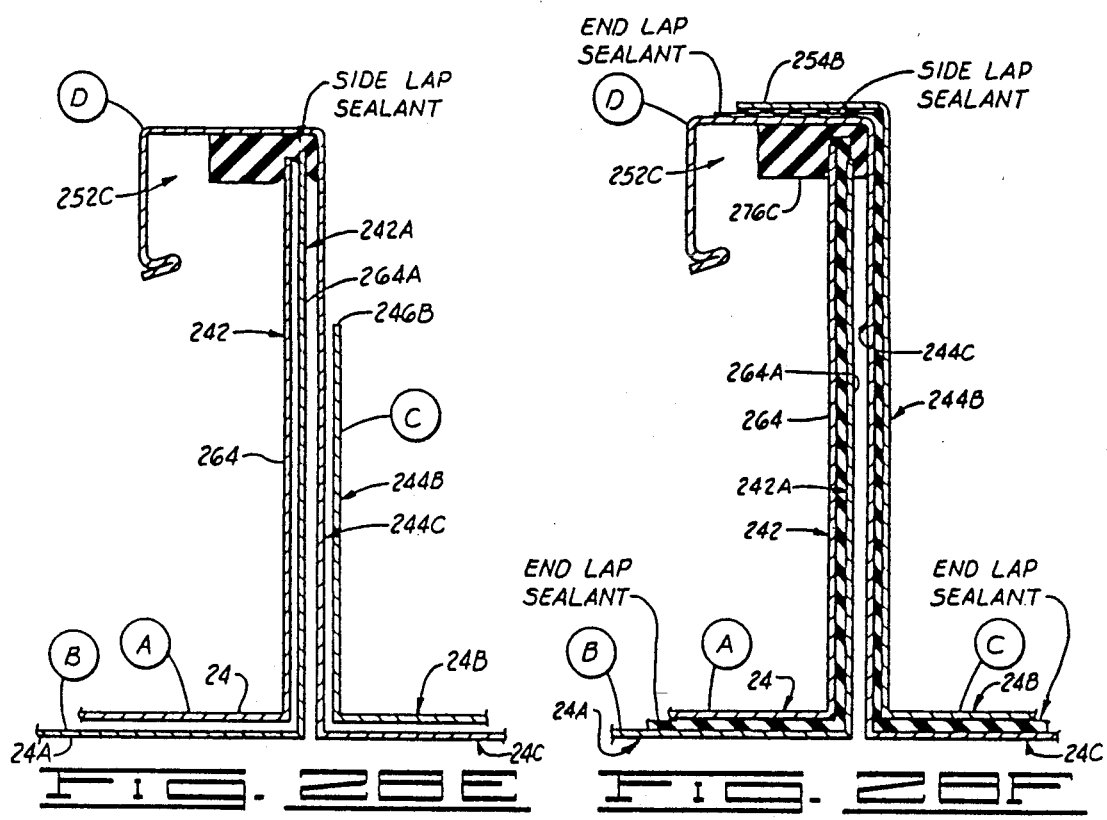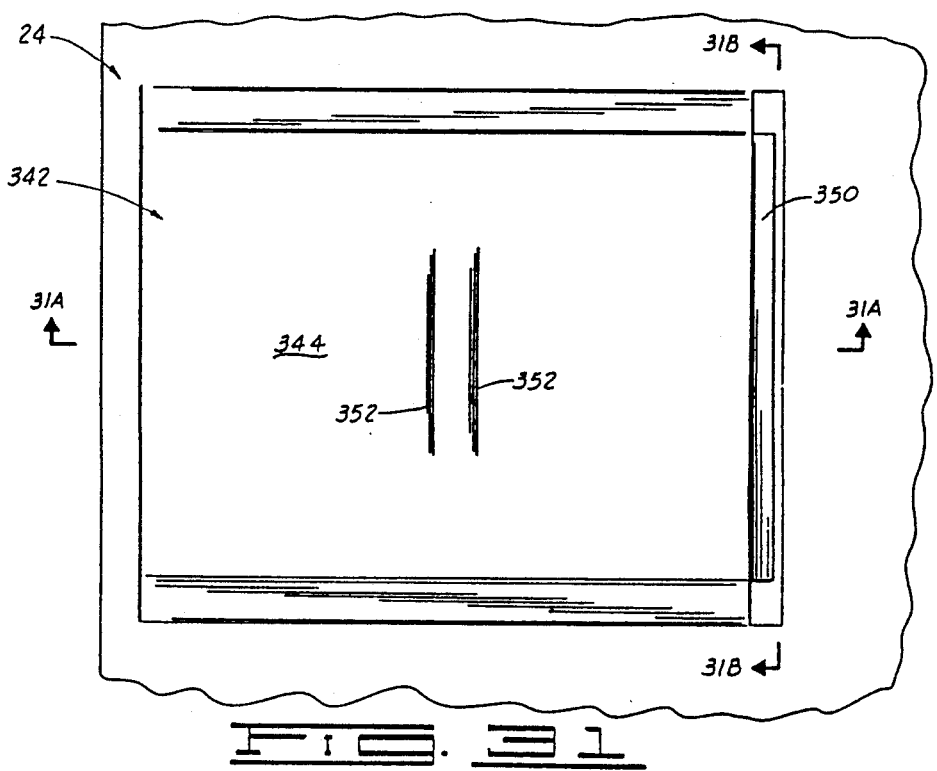

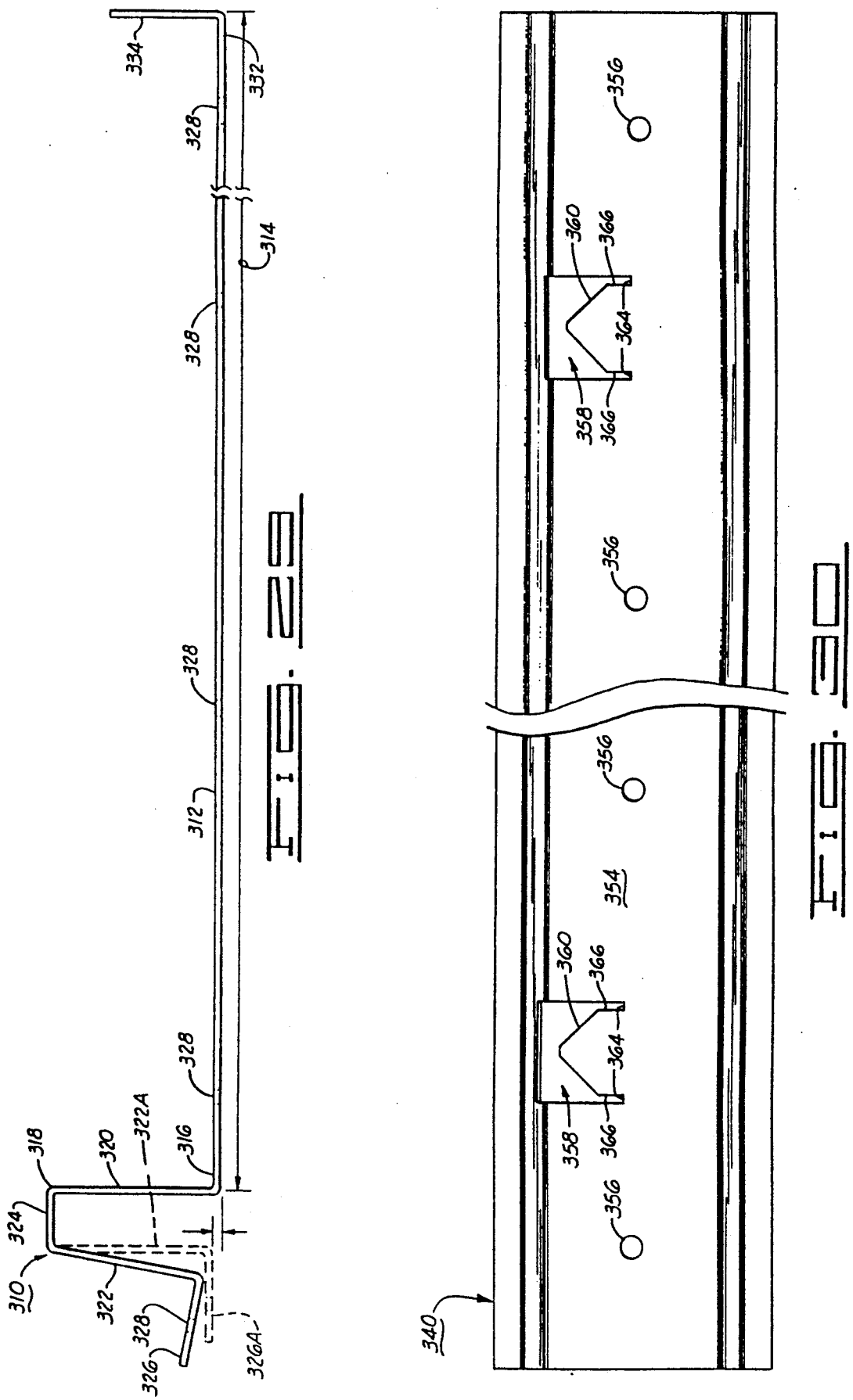

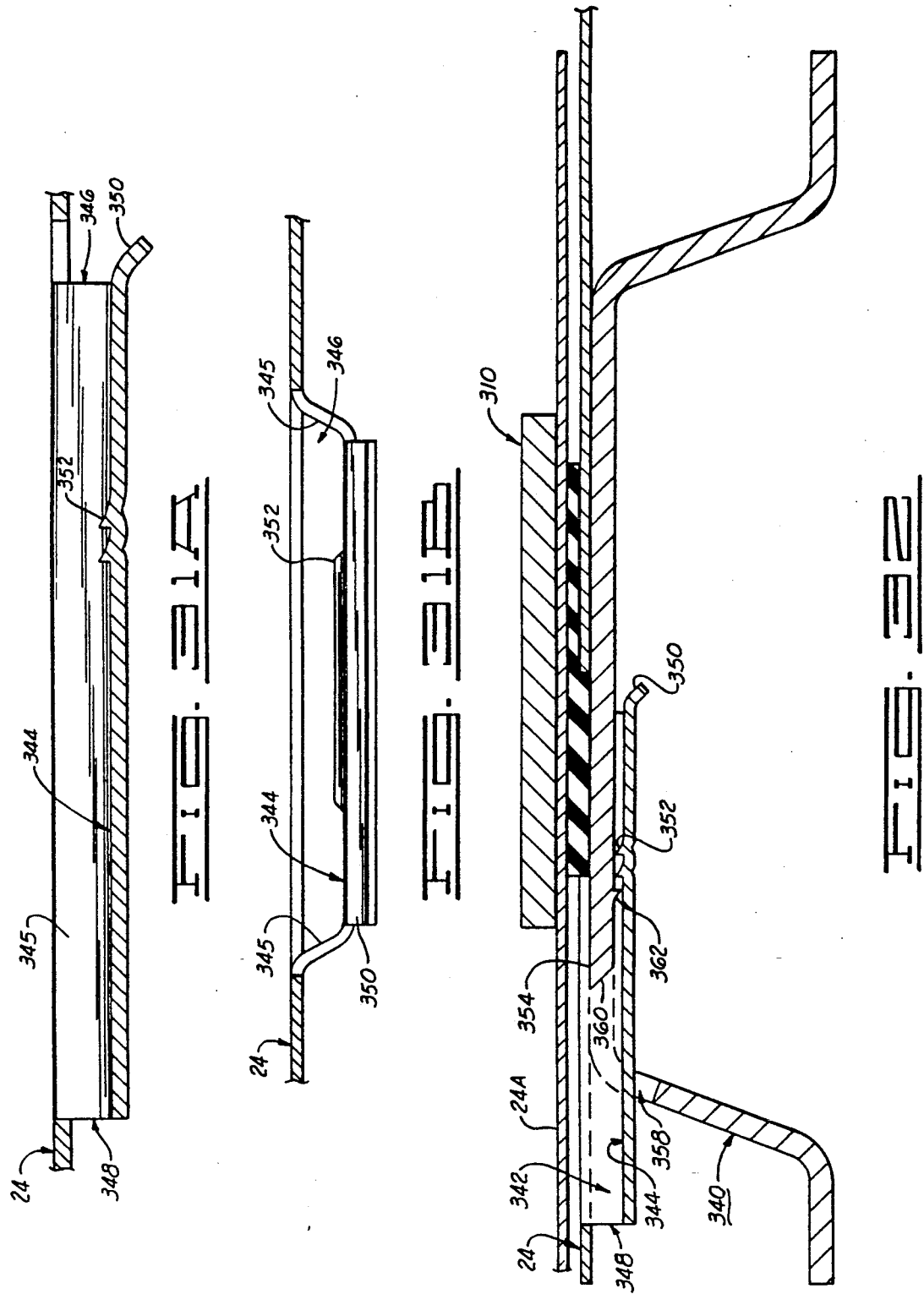

STANDING SEAM ROOF ASSEMBLY AND SUPPORT APPARATUS

CROSS REFERENCE TO RELATED APPLICATIONS

The subject application is a divisional of: STANDING SEAM ROOF ASSEMBLY AND SUPPORT APPARATUS, U.S. application Ser. No. 07/402,901 filed Sep. 1, 1989 (U.S. Pat. No. 5,142,838) which is a divisional of: STANDING SEAM ROOF ASSEMBLY AND SUPPORT APPARATUS, U.S. application Ser. No. 06/745,320 filed Jun. 14, 1985 (now abandoned) which is a continuation-in-part of the following: ROOF SYSTEM POSITIONABLE OVER AN EXISTING ROOF STRUCTURE AND METHOD FOR INSTALLING SAME, U.S. application Ser. No. 06/713,319 filed Apr. 22, 1985 (U.S. Pat. No. 4,620,397); APPARATUS FOR ASSEMBLING STANDING SEAM ROOFS, U.S. application Ser. No. 06/698,082 filed Feb. 4, 1985 (now abandoned); STANDING SEAM ROOF ASSEMBLY, U.S. application Ser. No. 06/568,083 filed Jan. 4, 1984 (U.S. Pat. No. 4,597,234); ADJUSTABLE ROOFING SUPPORT SPACER APPARATUS AND ERECTION METHOD, U.S. application Ser. No. 06/503,299 filed Jun. 10, 1983 (U.S. Pat. No. 4,534,148); METHOD AND APPARATUS FOR ASSEMBLING STANDING SEAM ROOFS, U.S. application Ser. No. 06/481,858 filed Apr. 4, 1983 (U.S. Pat. No. 4,525,976); STANDING SEAM SIDELAP SYSTEM AND METHOD FOR ASSEMBLING SAME, application Ser. No. 06/481,844 filed Apr. 4, 1983 (U.S. Pat. No. 4,700,522); ROOF CLIP ASSEMBLY FOR A ROOF SYSTEM, U.S. application Ser. No. 06/428,568 filed Sep. 30, 1982 (U.S. Pat. No. 4,602,468); and INSULATED ROOF SYSTEM, U.S. application Ser. No. 06/378,241 filed May 14, 1982 (U.S. Pat. No. 4,528,789).

BACKGROUND OF THE INVENTION

1. Field of the Invention

The present invention relates to a standing seam roof assembly for a building structure, and more particularly, but not by way of limitation, to a standing seam roof system positionable over a new building structure or over a preexisting roof structure.

2. Discussion of Prior Art

The established method of erecting the roof of a pre-engineered building is to erect the primary structural members; attach the secondary structural members to the primary structural members; secure the appropriate bracing members; roll blanket-type insulation across the secondary structural members; dispose roof panel members over the insulation; and connect the roof panel members to adjacently disposed roof panel members and to the secondary underlying structural members.

Numerous types of roof assemblies have heretofore been proposed for pre-engineered buildings in efforts to provide a watertight roof assembly, while at the same time enabling the roof assembly to expand and contract as changes in temperature are encountered. Typical of such prior art roof assemblies which has met with considerable success in recent years is the standing seam roof assembly. The panel members of the standing seam roof assembly are joined to each other along adjacent sides such that the sides are lapped together to form the standing seams. The panel members of the standing seam roof are secured to the secondary structural members by means of clips. The interconnection of the panel members of the standing seam roof lend stiffness and strength to the roof structure while allowing the roof structure to expand and contact as a function of the coefficient of expansion of the materials of which the roof panels are made and the temperature cycles to which the roof panels are exposed.

The repeated action of expansion and contraction of the panel members of the roof assembly tends to weaken the panel-to-panel lap joints and thus often causes panel separation, structural failure and roof leakage. Leaks are generally caused by the weakening of the fastening members and working or kneading of the sealant disposed at the joints. In many of the prior art roof assemblies, the sealant employed required adhesion, flexibility and water repellency. Further, the design of the joint was in many instances such that the pressure on the sealant varied greatly throughout the length of the side lap and end lap joints of the panels, resulting in uneven distribution and voids of the joint sealant.

Many of the problems discussed hereinabove encountered in prior art standing seam roofs, such as structural failures and leaks, have been overcome by a standing seam floating roof assembly such as is disclosed in co-pending U.S. patent application Ser. No. 568,083, filed Jan. 4, 1984 by Harold G. Simpson. The standing seam floating roof assembly is formed of elongated metal panels, each of which is provided with a female member formed along one longitudinal edge and a male member formed along the opposed longitudinal edge, adjacently disposed panels being joined by interlocking female and male members thereof to form the standing seam joint. Clips interconnect the standing seam joints and the underlying secondary structure, with the upper portions of the clips hooking over the male members of the panels. Most such clips are of the sliding type which permits the hooking portion to move relative to a supporting base portion connected to the secondary structure, while relative motion between the clip hook and the metal panel is substantially prevented. A sealant material is disposed to form a moisture dam in the interlocking joint of the female and male members.

Panel members of pre-engineered roof systems are constructed of identical sheet metal panels that are laid end to end, as well as side by side as discussed above. This presents the problem of sealing the end or butt joints, especially at the "four corner" areas where four of the panels are interlapped to form a juncture area. Various butt joining techniques have evolved in the prior art, all of which involve selective notching and overlapping to achieve a close fitting juncture area, and liberal application of mastic to effect the best seal possible under the design circumstances. Serious deficiencies have been encountered in prior art butt joints, including water leaks, high costs, tooling complications, packaging, etc.

In addition to the use of standing seam roof assemblies on newly constructed pre-engineered buildings, standing seam roof assemblies are also finding increasing usage in another segment of the roofing industry, that of "built-up roof" replacement. Generally, a built-up roof is formed of a plurality of sections which are interconnected and overcoated with asphaltic composition to provide a watertight seal. While such roof assemblies have generally served successfully, problems have nevertheless been encountered as a built-up roof ages, or when the building settles, or when construction errors result in water standing in pockets on the roof assembly. This standing water often results in deterioration of the roof, causing leaks and the like to occur.

A need has long been recognized for a means for replacing a built-up roof, as well as other conventional roofs, which does not require substantial modification to the preexisting roof and which is economical both in fabrication and on-site construction. Further, it is highly desirable that the new roof assembly be capable of providing a new roof surface independent to the variations in the surface of the preexisting roof assembly. Past repair methods, especially those capable of altering the slope of the roof surface to improve drainage characteristics, have required substantial destruction of the original roof assembly and extensive custom construction, thus exposing the building and its contents to damage by the elements during the reroofing process and being excessively time consuming.

SUMMARY OF THE INVENTION

Disclosed herein are an advantageous panel support assembly and several advantageous panel systems that are optimum solutions for specific "subsets" of often conflicting factors inherent in the design and construction of various roof system elements.

More specifically, the present invention provides an adjustable roofing support spacer for use over a preexisting roof structure to support plural roof panels forming a new roof structure. The roofing support spacer apparatus, broadly speaking, comprises a beam assembly having a first beam spatially disposable above the preexisting roof; one or more adjustable web assemblies connected to the first beam; and an adjustable support spacer connector means for connecting the web assemblies to the preexisting roof.

An object of the present invention is to provide an adjustable roofing support spacer for supporting a new roof assembly over a preexisting roof structure which does not require substantial modification or damage to the preexisting roof.

Another object of the present invention, while accomplishing the above stated object, is to provide an adjustable roofing support spacer for supporting a new roof assembly wherein the new roof system is not limited in design and configuration by the preexisting roof.

Another object to the present invention, while achieving the above stated objects, is to provide an adjustable roofing support spacer for supporting a new roof assembly which is substantially independent of the grade or shape of the preexisting roof.

Another object of the present invention, while achieving the above stated objects, is to provide an adjustable roofing support spacer for supporting a new roof assembly which is substantially free to move independently to the preexisting roof as the two roofs expand and contract because of building movement, temperature changes and similar forces.

Other objects, features and advantages of the present invention will become clear from a reading of the following detailed description when read in conjunction with the appended claims.

BRIEF DESCRIPTION OF THE DRAWINGS

FIGS. 2A and 2B are schematic depictions of adjustable roofing support spacers utilized in the roof system of FIG. 1.

FIG. 5 is a partial, side elevational view of another adjustable support spacer.

FIG. 6A is a side elevational view of the support spacer of FIG. 5 in a folded mode prior to shipping, and FIG. 6B is taken at 6B—6B in FIG. 6A.

FIGS. 9 and 10 show side elevational views of alternate support spacer members.

FIGS. 9A and 10A show end elevational views, respectively, of the support spacer members of FIGS. 9 and 10.

FIGS. 11 and 11A are side and elevational views, respectively, of a double direction hinge connection.

FIG. 13 is a plan view of one more alternate support spacer.

FIG. 17 is an elevational view of a side lap clip member utilized in the roof system of FIG. 1.

FIG. 17A is an enlarged view of the hook portion of the side lap clip member.

FIG. 17B is a partial cross sectional view of the hook portion of the side lap clip member of FIG. 17.

FIGS. 17C and 17D show another embodiment of the side lap clip member.

FIG. 18 is an end schematic view of the profile of a roof panel member which can be utilized in the roof system of FIG. 1.

FIG. 19 is a partial side elevational view of an alternate attaching assembly for the roof panel member of FIG. 18.

FIG. 19A is a view taken at 19A—19A in FIG. 19.

FIG. 20 is a partial side elevational view of yet another alternate attaching assembly for the roof panel member of FIG. 18.

FIG. 20A is a view taken at 20A—20A in FIG. 20.

FIG. 22 is one other attaching assembly for a modified roof panel member which is shown in schematic profile in FIG. 22A.

FIG. 22B is a force diagram at one of the hooking clip members.

FIG. 23 is a partial side elevational view of another alternate attaching assembly for the modified roof panel member of FIG. 22A.

FIG. 23A is a view taken at 23A—23A of FIG. 23.

FIG. 24A is a partial top plan view of the roof panel member of FIG. 24.

FIG. 25 is an elevational view of the profile of the standing seam joint formed by interlocked adjacent roof panel members of the type shown in FIG. 24.

FIG. 26 shows an alternate side lap sealant for use in the standing seam joint of FIG. 25.

FIGS. 27A through 27C are partial plan views of the interlapped panel corners depicting progression through assembly of the roof panel member of FIG. 24 at the four corner juncture area.

FIG. 27D is an elevational view in partial cutaway detail of the four corner juncture area depicting interlapped panel ends prior to installation of cinch strap and backup plate assemblies.

FIG. 27E is a view taken at 27E—27E in FIG. 27D, and FIG. 27F is a view taken at 27F—27F therein.

FIG. 27GG is a view taken at 27GG—27GG in FIG. 27G.

FIG. 27I is a partial detailed, elevational side view of corner C of the FIG. 24 roof panel member.

FIG. 27II is a view taken at 27II—27II in FIG. 27I.

FIGS. 28A through 28F are similar to corresponding views in FIGS. 27A-27F above but show the installation sequence of the roof panel members as used on an oppositely sloped roof structure.

FIG. 29 is an elevational view of the bar strip portion of a cinch strap assembly used to sealingly interconnect interlapped panel ends at the four corner juncture area.

FIG. 30 is a top plan view of the backup plate portion of the cinch strap assembly.

FIG. 30A is a partial detailed side elevational view of a modified roof panel member having an integrally formed backup assembly at one end thereof. FIG. 30B is an enlarged, cross sectional view in elevation of that integrally formed backup plate assembly.

FIG. 31 is an enlarged top plan view of one of the stirrup connectors integrally formed in a selected end of the roof panel member of FIG. 24.

FIGS. 31A and 31B are views, respectively, taken at 31A—31A and 31B—B in FIG. 31.

FIG. 32 is a cross sectional view through one of the stirrup connectors shown in FIG. 31 with the backup plate of FIG. 30 mounted therein and with sealant, an overlapping roof panel member and bar strip of FIG. 29 disposed thereupon.

DISCUSSION

Figure 1:
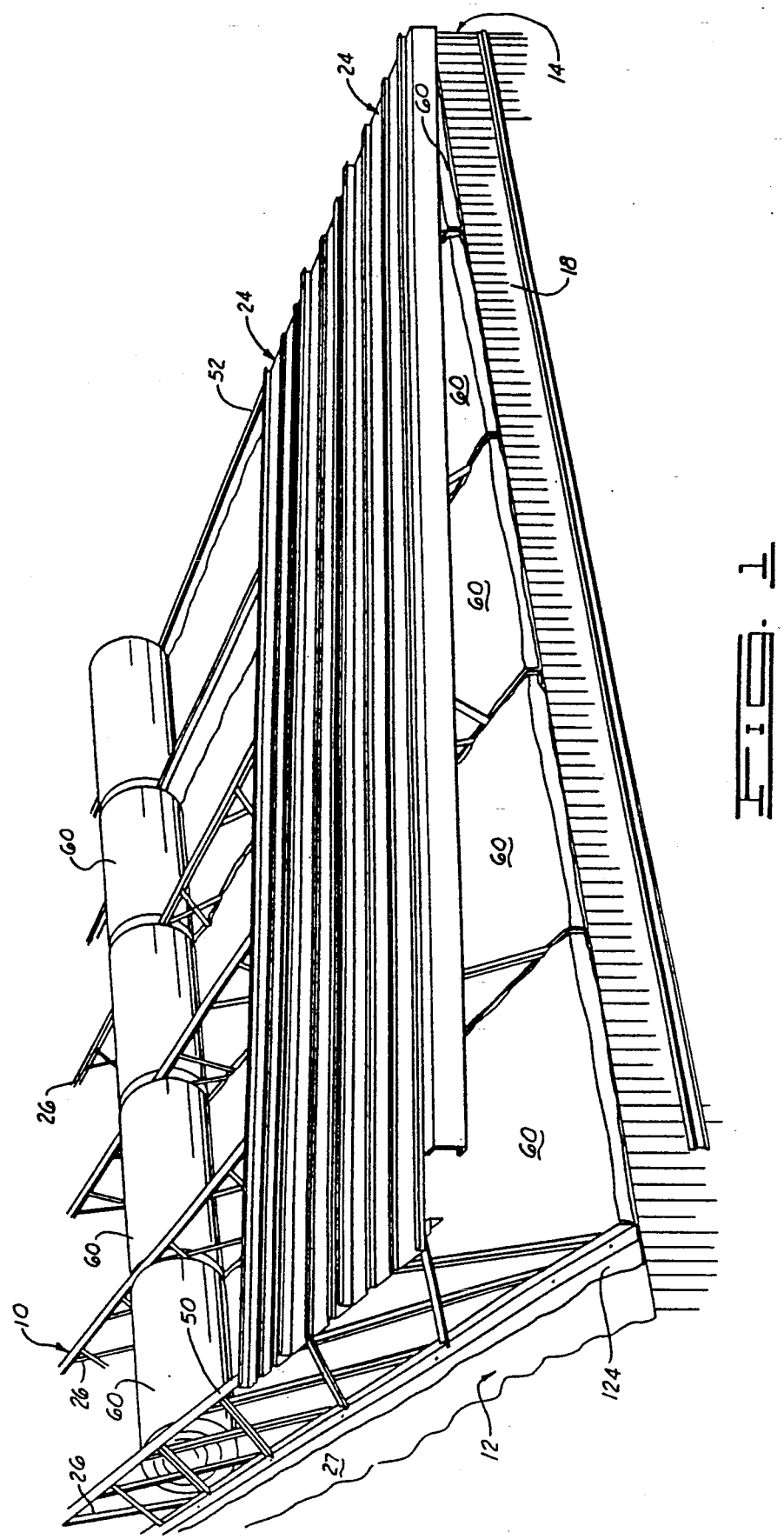
FIG. 1 is a partial isometric view of a roof system constructed in accordance with the present invention.

Concerning design criteria for standing seam roofs, the relative importance and nature of many factors—such as strength, watertightness, costs, durability and aesthetics—will vary depending on the roof slope, geographic area in which the roof is to be used, occupancy of the building to be covered, length of panel run without expansion or contraction joints, extent and nature of inwardly and outwardly directed loads, spans on which the roof is to be used, insulation, vapor control requirements and other factors relating to the simplicity and ease of its manufacture, crating and erection.

Standing seam metal panel roof systems of the functional type are usually placed on relatively flat building slopes and as a result must be capable of resisting a standing head of water when used with buildings housing most occupancies. Because the roof is relatively flat, panel runs are often long and because expansion and contraction joints are difficult to make watertight, few are used. This means panel attachment to the underlying secondary structural system must accommodate panel expansion and contraction. Steeper roof pitches, as are used with architectural panels, are shorter and require less end lap, side lap and fastener watertightness because gravity pulls the water down away from the panel joints faster than the wind blows it through panel joints and in general snow and ice slide off the roof.

To obtain watertightness at points of attachment of the roof panels to underlying structure, the panel must be permitted to expand and contract without fracturing the panel. This may be accomplished by limiting the length of the panel or by utilizing a support structural that is sufficiently flexible to allow the attachment means to move with the expanding or contracting panel. The flexibility of the support structural must be greater for longer panel runs since the expansion or contraction of the panel will be greater.

The panel attachment means is further complicated by the fact that most buildings are insulated. Many past solutions have placed the insulation between the support structure and the panel. This enables ease of placement of the insulation and has other advantages, but it complicates panel support and attachment. Most insulation contains small pockets of entrapped gas to gain its advantageous insulating properties. The smaller and the more numerous the gas pockets the better the insulation tends to be. When the insulation is crushed, the gas pockets are destroyed and much of the insulating value is lost. As a result, low cost insulations are structurally weak and are easily compressed and damaged by imposed roof load.

Sometimes the loss of thermal protection lost by prior art crushing of insulation has been compensated for by substituting a more expensive but somewhat structurally more adequate insulation. When such has been used with fixed fasteners, such as through screw fasteners, the roof system is often damaged because panel expansion and contraction pries at the connection and damages it. To overcome the numerous problems associated with the panel attachment the designer has most often limited panel attachment to those places where panel side joints pass over secondary structural supports and the panels can be attached more easily without penetrating the panel surface. This has served as an effective limit to panel width because, when subjected to wind uplift, the unattached panel center portion has tended to bow up and fail. This can be overcome by increasing panel material thickness, forming more or deeper corrugations, providing more secondary supports, or providing complicated non-penetrating center hold-downs, but only at significant cost increase. Thus, there has been a conflict in panel design in that the panel designer has to date been unable to gain the advantage of a 36" wide panels, with their advantageous flat-width-to-covered width material ratio and more economical erection, and yet avoid the problems associated with center hold-down fasteners.

Past practices have been to attach both the center and side lap joints exclusively with either penetrating or non-penetrating fasteners. When non-penetrating clips have been used past clip practice has been to use either a fixed or sliding clip that has a minimum length contact surface between the hold-down portion of the clip and the top of the male leg of the panel. The length of the clip has been held to a minimum, usually 2" or 2½" in length, in order to minimize manufacturing costs, with the maximum length known to the inventors is 4". This practice has caused stress concentrations to occur in the panel at the point of attachment and has caused severe distortion in the panel joint as the panel is subjected to wind uplift.

The standing seam clip bears only on the male portion of the panel which has been inserted into the adjacent female portion. The female portion is not retained directly by the clip and as a result the load from the female portion of the panel must pass through the male portion and then into the clip where it can in turn pass to the secondary structural. This action tends to "unravel" the panel joint and allow distortions over the short section retained by the clip. This has resulted in premature panel failure when subjecting the panel to wind uplift.

A roof panel is usually attached to its underlying supporting structure in a manner that causes the panel to act as a continuous beam. This arrangement substantially reduces the maximum moment occurring at any one point compared to the moment that would occur in a simple beam, other factors being equal. However, this means of construction causes a negative moment to occur at the attachment point. This negative moment peaks and drops off very quickly as the panel section under consideration moves from the center line of the attaching clip towards the point of inflection (P.I.), the P.I. being that point where the moment in the panel changes from positive to negative.

Past center hold-down practice for panel erection has been to coordinate such usage with edge hold-down practice so that if through fasteners were used to attach the center of the panel to the underlying structural, then through fasteners were used to attach the edge of the panel to the underlying structural; and conversely, if the panel edge attachment consisted of a non-penetrating attachment means, such as a clip, then the center hold-down was either totally eliminated or a non-penetrating center hold-down device was utilized. However, non-penetrating center hold devices heretofore have largely been ineffective and expensive.

The effectiveness of non-penetrating center hold-down devices is influenced by the number and height of corrugations formed in the panel and the width, thickness and strength of the metal laterally separating the corrugations. The configuration and number of panel corrugations in turn has a direct impact on the efficiency of material utilization, which in turn is a primary cost factor. Conventional standing seam roofs may only achieve a flat width to corrugated with ratio as low as 1.25:1 where through fasteners exist only at panel end laps and do not occur at the panel centers. On the other hand, non-standing seam panels with center hold-down fasteners are commonly 36" wide and may achieve flat-width-to-coverage ratios as low as 1.17.

In summary, it is clear that panels with through fasteners, while having many disadvantages associated with the placement of fasteners through the panel, can achieve better material utilization and erection efficiency than can standing seam panels that utilize only non-penetrating fasteners. The primary reason for this is that the panel connector can be placed immediately adjacent to intermediate corrugations which greatly increases the panel's wind uplift resistance.

Thus, it is apparent that a panel design that can achieve the material utilization and erection efficiency of a panel having through center fasteners, without the disadvantages of structurally compromising the structural connections to underlying secondary support members, or a panel with a simple non-penetrating center hold-down fastener, would provide significant advantages over prior art panels. The present invention provides such an improved panel design with a secondary support system having sufficient flexibility built into it so that the panel and fastener under the influence of expansion and contraction move the underlying structural while still maintaining the structural integrity and watertightness of the overall system. The present invention provides an alternative approach to achieve this desirable effect by coordinating the shape, spacing and size of the intermediate corrugations and the standing seam side lap corrugations so that a panel fastener capable of moving in relation to the panel is achieved, while at the same time minimizing the flat width to corrugated width coverage ratio.

The panel design provided herein also serves to minimize panel material thickness. It would be of no benefit to minimize the panel flat width to corrugated width ratio if this is done at the expense of increasing the base material thickness. To the contrary, it is very desirable to also reduce the panel thickness to minimize the amount of material used to make the panel. Of course, these goals could be done by reducing the span between secondary support members, but this would lead to increased costs in other elements of the building structure and therefore would be self defeating.

DESCRIPTION OF PREFERRED EMBODIMENTS

Referring now to the drawings, and more particularly to FIG. 1, shown therein is a portion of a new roof system 10 supported by a preexisting roof 12 of a building structure 14. The preexisting roof 12 of the building structure 14 can be any preexisting roof structure, such as a built-up roof, which is connected to and supported by conventional elements, such as a primary and secondary structural systems (not shown), and a plurality of wall members 18 (one shown). The primary structural system of the building structure will usually consist of a plurality of upwardly extending column members which are rigidly connected to a foundation and a plurality of primary beams which are generally horizontally disposed and supported by the column members. The secondary structural system will usually consist of a number of purlin or joist members supported by the column members or other members, such as primary beams.

The improved roof system 10 will generally be formed of a plurality of roof panels, such as panels 24 illustrated in FIG. 1. The roof panels 24 of the roof system 10 are connected to provide a roof plane for the roof system 10, and while generally flat panels (except for joints and stiffen ribs) are depicted in FIG. 1, it will be understood that the present invention is also applicable to curvilinearly shaped panels such as is sometimes preferred by certain architectural planners. Further, if desired, the roof sections of the roof system 10 can be disposed on the preexisting roof 12 such that interlocking adjacent roof sections form a multi-pitched roof. On the other hand, the roof sections can be joined such that the roof system 10 is provided with a substantially single roof plane, i.e. a roof plane having a unidirectional slope, as depicted in FIG. 1.

The roof panels 24 of the roof system 10 are supported by a plurality of one form of an adjustable roofing support spacer 26 constructed in accordance with the present invention, these spacers being disposed along upper side or surface 27 of the preexisting roof 12 of the building structure 14 so that each of the adjustable roofing support spacers 26 extends upwardly from the preexisting roof 12 as required to support the roof panels 24 in a predetermined planar slope.

FIGS. 2A THROUGH 14

Referring now to FIGS. 2A and 2B, each of the adjustable roofing support spacers 26 is characterized as having one or more base support members 28, a spatially disposed upper beam 30 and an adjustable web assembly 32 interconnecting the base support members 28 and the upper beam 30. The base support members 28 may be formed as a continuous segment or a plurality of segments as shown in the drawings. When the base support members 28 are formed of a plurality of segments, such as segments 29 and 31, the base support members 28 are adapted to more readily fit the contour of the preexisting roof 12. The base support members 28 provide for load distribution across the area of the base support members 28 onto the preexisting roof 12 in contrast to the concentrated load point that would be present at the lower end of the web assembly 32, were the base support members 28 not there to distribute the load. The web assembly 32 of each of the adjustable roofing support spacers 26 is connected to the upper beam 30 and the base support members 28 at various positions so that the upper beam 30 of each of the adjustable roofing support spacers 26 is disposed a selected height above the base support members 28 (and thus above the upper surface 22 of the preexisting roof 12) independent of slope or irregularities that may be present in the preexisting roof 12.

In FIG. 2A the line drawing illustrates the adjustable feature of the adjustable roofing support spacer 26 where the upper beam 30 is in a substantially non-parallel relationship with the base support members 28 at a selected height. The phantom line drawing in FIG. 2A illustrates the adjustable roofing support spacer 26 wherein the upper beam is secured in a substantially parallel relationship with the base support members 28 at a second selected height. In FIG. 2B the line drawing illustrates the adjustable feature of the adjustable roofing support spacer 26 when the upper beam 30 is substantially horizontally disposed in a parallel relationship with the base support members 28 at a first selected height; the phantom line drawing in FIG. 2B illustrates the adjustable roofing support spacer 26 wherein the upper beam 30 is secured in a substantially parallel relationship with the base support members 28 at a second selected height. It is to be understood that the distance between the base support members 28 and the upper beam 30 of the adjustable roofing support spacer 26 can be varied between the geometrical limits of the angular disposition of the adjustable web assembly 32.

The base support members 28 of the adjustable roofing support spacers 26 that support the roof panels 24 are secured to the preexisting roof 12 by any suitable fasteners known in the art, such as a plurality of self-tapping screws 34, or to the secondary structure members.

The web assembly 32 of the adjustable roofing support spacer 26 depicted in FIGS. 2A and 2B comprises a plurality of spacer webs 36 having a first end portion 38 and an opposed second end portion 40. The first end 38 of each of the spacer webs 36 is secured to one of the base support members 28 of the adjustable roofing support spacers 26 and the opposed second end 40 of the spacer webs 36 is secured to the upper beam 30. The angular disposition of the spacer webs 36 of the web assembly 32 of the adjustable roofing support spacers 26 is such that the upper beam 30 is maintained in a proper, selected relationship with the base support members 28 and thus the preexisting roof 12 of the building structure 14. The upper beam 30 of each of the adjustable roofing support spacers 26 in adjacent roof panels 24 may be secured via their adjacently disposed ends by any suitable means known in the art.

The roof panel members 24 are positioned upon and supported by the upper beam 30 of the spacer webs 36 so as to substantially extend across and from a continuous panel section across the upper beams 30. The roof panel members 24 are secured to the upper beams 30 of the adjustable roofing support spacers 26 in such a manner that the roof system 10 is provided with a selected planar slope substantially independent to the planar slope of the preexisting roof 12. Any suitable panel fastener assemblies can be employed for connecting the roof panel members 24 to the upper beam 30 of the adjustable roofing support spacers 26, such as self-drilling, self-tapping screws heretofore known in the art and employed in the assembly of roof panels in standing seam and standard corrugated roof assemblies and the like, or some of the more advantageous means shown hereinafter.

Figure 3:
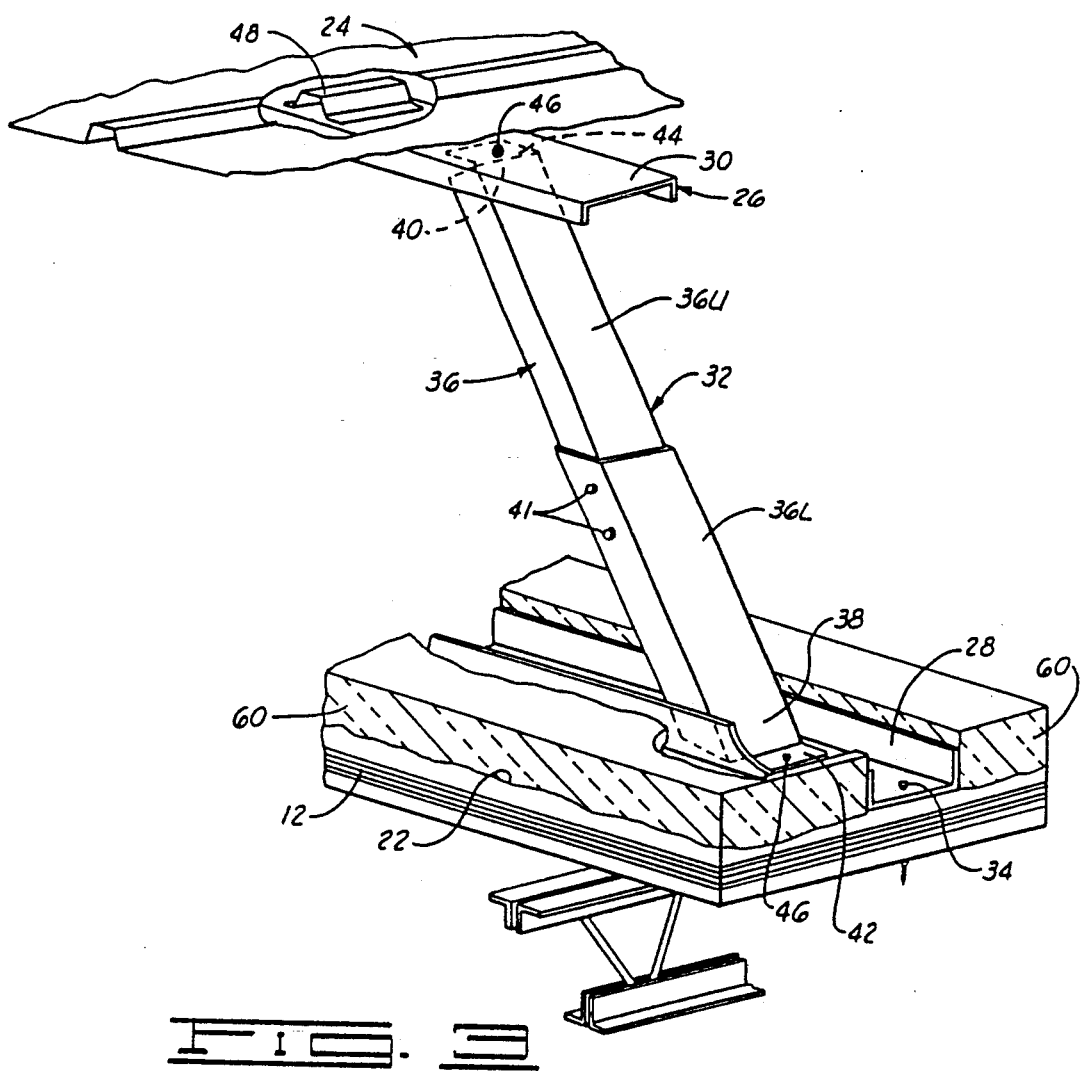
FIG. 3 is an isometric view of a spacer web utilized in the adjustable roofing support spacer of FIG. 2A and 2B.

The roof system 10 employs the adjustable roofing support spacers 26 which are capable of being selectively adjusted to provide a desired surface slope for the roof panel members 24 independent of the surface slope of the preexisting roof 12 on which the roof system 10 is secured. Referring now to FIG. 3, the connection of the spacer webs 36 of the web assembly 32 to the base support members 28 and the upper beam 30 of the adjustable roofing support spacers 26 of the roof system 10 is shown in detail. While the web assembly 32 comprises a plurality of spacer webs 36, only one spacer web 36 is illustrated in FIG. 3. In FIG. 3, spacer web 36 is shown as a telescoping member having an upper spacer web section 36U, a lower spacer web section 36L and screw fasteners 41 which secure the upper and lower web sections once the spacer web 36 is adjusted to the desired angle and length. Of course, the spacer webs 36 can be constructed of a single channel member as otherwise shown in the drawing.

It should be noted that the length and angular disposition of the spacer webs 36 may be different for each adjustable roofing support spacer 26, and that the angular disposition of the spacer webs will be dependent upon the selected height of the upper beam 30 of the adjustable roofing support spacer 26, the relationship of the upper beam 30 to the base support members 28, and the plane of the preexisting roof 12.

The upper beam 30 and the base support members 28 of the adjustable roofing support spacer 26 are illustrated as channel members, the channel portion of the base support members 28 adapted to receive the opposed first end portion 38 of the spacer web 36. The spacer web 36, also a channel member, further comprises a flange member 42 formed on the first end portion 38 thereof, and a flange member 44 formed on the opposed second end portion 40 thereof. The first end portion 38 of the spacer web 36 is secured to one of the base support members 28 of the adjustable roofing support spacer 26 via the flange member 42 and self-tapping, self-drilling screw 46. The opposed second end portion 40 of the spacer web 36 is secured to the upper beam 30 of the adjustable roofing support spacer 26 via the flange member 44 using another self-tapping, self-drilling screw 46 or other suitable fastening means such as welding. The opposed second end portion 40 of the spacer web 36 is skewed up to about fifteen degrees so that in the assembled position of the web assembly 32, the upper beam 30 can be maintained in a substantially selected relationship with the base support members 28 and disposed substantially thereabove independent of the grade or slope of the underlying planar surface 22 of the preexisting roof 12. As previously stated, each of the spacer webs 36 forming the web assembly 32 of the adjustable roofing support spacer 26 is positioned independently of the adjacent spacer webs so that the desired relationship between the upper beam 30 and the base support members 28 of the adjustable roofing support spacer 26 is maintained.

When the adjustable roofing support spacer 26 has been properly positioned on the preexisting roof 12 so that the upper beam 30 of the adjustable roofing support spacer 26 is disposed in the selected position and each of the adjacent adjustable roofing support spacers 26 have likewise been so positioned, the roof panel members 24 are positioned on the upper beam 30 of the adjustable spacers 36 and secured thereto by any suitable means, such as a corrugation support clip 48 and suitable fastening means, such as self-drilling, self-tapping screws (not shown).

In order to more fully describe the present invention the method of erection of the roof system 10 as shown in FIGS. 1 thru 3 will now be described. In the formation of the roof assembly 10 on the preexisting roof 12 of the building structure 14, the initial construction procedures involve the removal of any interfering caps and foreign matter which may be on or connected to the top portion of the preexisting roof 12. Once this is achieved, an optional vapor retarder and insulation may be installed, and the adjustable roofing support spacers 26 are erected on the preexisting roof 12 as follows. The base support members 28 of the adjustable roofing support spacer 26 are secured to the preexisting roof 12 by a plurality of self-tapping, self-drilling screws or other means well known in the art. The adjustable web assembly 32 of the adjustable roofing support spacer 26, which comprises a plurality of spacer webs 36, is connected to the base support members 28 and the upper beam 30 so that the upper beam 30 is disposed in a desired position at a desired selected height above surface 22 of the existing roof 12. The adjustable roofing support spacer 26 is temporarily braced so that the spacer web 36 is maintained in its proper position during construction of the roof system 10.

The base support members 28 of the adjustable roofing support spacer 26 of the roof section 24 are then positioned upon the preexisting roof 12 and secured thereto by any suitable means, such as the self-tapping, self-drilling screws 34. The number of adjustable roofing support spacers 26 employed in the formation of the roof assembly 10 will vary depending upon the overall length of the roof panels 24, but desirably the adjustable roofing support spacers 26 are positioned on the preexisting roof 12 so as the be spaced approximately five feet apart. Once the base support members 28 of each of the adjustable spacers have been secured in the desired position on the preexisting roof 12, a tightline is attached to the new roof high point 50, as illustrated in FIG. 1, and the new roof low point 52. The adjustable web assembly 32 of each of the adjustable roofing support spacers 26 disposed between these high and low points are elevated such that when the upper beam 30 is secured to each of the adjustable web assemblies 32, and the first end portion 38 is secured to the base support members 28, the upper beams 30 are positioned so as to be substantially aligned relative to the tightline and in a determined shape. Upper beams 30 of adjacently aligned adjustable roofing support spacers 26 may be joined end to end.

When the roof panels 24 are of a length which requires multiple panel spanning across the upper beams 30 of the adjustable roofing support spacers 26, the roof panel members 24 are end lapped and connected together in a manner heretofore known in the roofing art, or in the manner described hereinbelow for the panel profile taught herein. The placement of the roof panel members 24 continues across the upper beams 30 of the adjustable roofing support spacers 26 until approaching the opposite side of the building structure 14. At this point, flashing assemblies may be secured to either side of the building structure 14. Similarly, a flashing assembly may be used to interconnect the roof panels 24 and the end wall of the building.

It is often desirable to incorporate additional insulation material, such as insulation 60, on the preexisting roof 12 of the building structure 14. In such instances, the insulation 60 is positioned on the preexisting roof 12 as shown in FIG. 1 prior to the attachment of the roof panel members 24 to the upper beams 30 of the adjustable roofing support spacers 26 as heretofore described. Alternately, or in addition to the insulation 60, insulation can be placed to extend over, and be supported by, the upper beams 30 prior to placement of the roof panels 24 thereupon. This latter method of insulation placement is sometimes required by panel manufacturers to protect the underside of the roof panels from corrosion potentially effected by moisture condensation.

Figure 4:
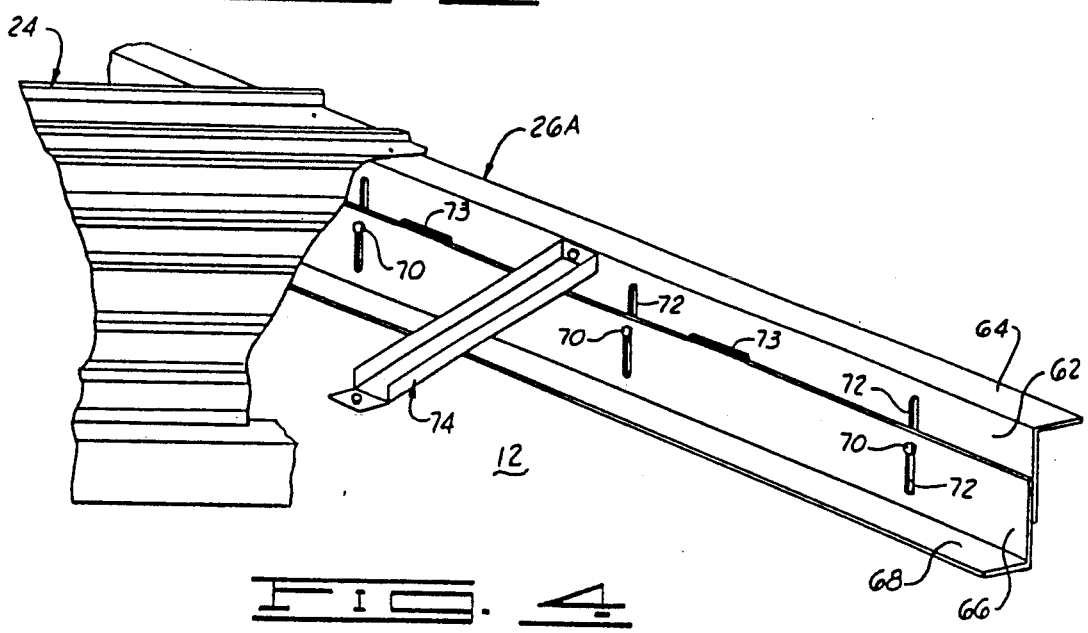
FIG. 4 is another adjustable roofing support spacer utilized in the roof system of FIG. 1.

Another embodiment of the adjustable roofing support spacer which is useful at or near the building eaves is shown in FIG. 4. An adjustable roofing support spacer 26A, a "Z" assembly shaped assembly, comprises an upper web member 62, an upper flange 64, a lower web member 66 and a lower flange 68. The upper web member 62 is overlappingly disposed over the lower web member 66 and is adjusted to the selected height of the new roof in accordance with procedures discussed hereinabove. The lower flange 68 is connectable to the preexisting roof 12 by suitable fasteners, while the roof panels 24 are supportable by, and attachable to, the upper flange 64. The upper web 62 is connected to the lower web 66 by fasteners 70, such as by nuts and bolts. These nuts and bolts 70 may be inserted through aligning slots 72 in both the upper web 62 and the lower web 66 such that loosening the fasteners 70 will allow the two members to increase or decrease the amount of overlapping and thus the distance between the upper and lower flange 64 and 68. After the desired initial overlapping has been accomplished using the adjustable fasteners 70, the overlapping position is secured by permanently interconnecting webs 62 and 66 with non-slip connection means such as weldments 73, or self-tapping, self-drilling screws (not shown).

Another feature of the present invention is presented by bracing bars 74, one of which is shown in FIG. 4. The bracing bars 74 serve to impose rigidity to the adjustable roofing support spacer 26A as such braces are attached to the preexisting roof 12 (or to any convenient portion of the building 14) and to the support spacer as shown by conventional fasteners. This rigidity is then imparted to the other support spacers 26 by way of the diaphragm formed by the interlocked roof panels 24. Thus structural stability is effected for the roof system 10 while permitting temperature expansion of the interlocked roof panels 24 by way of limited rotation of the support spacers 26. This unique feature of the roof panel members 24 being attached directly to a laterally stable element, such as represented by the braced adjustable roofing support spacer 26A, serves as a structural connection which stabilizes a portion of the roof section. This attachment, in combination with the design of the adjustable roofing support spacer 26 and the diaphram action and column strength of the roof panel members 24, enables the roof panel members 24 to retain their substantial roof watertightness and load capacity and stability as the roof panel members 24 expand and contract due to temperature variations or to loading. In other words, the design of the adjustable roofing support spacers 26 is such that there is enough flexability in the adjustable roofing support spacers 26 to allow the spacers to rotate slightly back and forth as the roof panel members 24 move due to temperature variations, while the pinned connection between roof panel members 24 and the laterally structurally stable support spacer 26A, supported by bracing bars 74 provides a stable roof system in which the adjustable roofing support spacers 26 and 26A will not collapse laterally when the roof system 10 is subjected to loading.

FIG. 5 shows another embodiment of an adjustable roofing support spacer 26B which has an adjustable web assembly 32B comprising a first flange member 80A and an opposed second flange member 80B, a center flange member 82 and first and second spacer web members 36A and 36B. The center flange member 82 is connectable to the upper beam 30B of the support spacer 26B by any suitable means such as a weld, fastener or the like.

The adjustable web assembly 32B may be attached at a factory to the upper beam 30B so it is substantially parallel and nested with the upper beam for ease of shipping and later on-site erection, as is shown in FIGS. 6A and 6B. The spacer webs 36A and 36B would be unassembled in the factory in such a manner that they lay adjacent to the upper beam 30B, the assembly 32B thus being transportable to the field in a compact manner to minimize shipping costs and to use factory equipment to make the connection rather than less reliable and more costly field application, and also to assure that the two pieces are in the proper relationship with each other when they reach the field. It is time consuming and expensive to locate, separate and bring various components into proper position at an end use location.

Field assembly of the upper beam 30B and adjustable web assembly 32B to the base support member 28B of the support spacer 26B is accomplished by moving the web members 36A and 36B out from the upper beam 30B to an angular position so as to approximate the selected height of the new roof from the upper beam 30B to the base support member 28B. The flange members 80A and 80B are bent to a position that these flanges are substantially coplanar with the flange of the base support members 28B. Final adjustment is made by moving flanges 80A and 80B such that the upper beam 30B is raised to the height of the tightline guide discussed hereinabove. The adjustable web assembly 32B may have bend scores 84 made during the manufacturing process to facilitate the ease of bonding, as shown in FIG. 8 at the first and second end flanges 80A and 80B and at the opposing sides of the center flange member 82. The flanges 80A, 80B are secured to the base support member 28A by self-tapping, self-drilling screws 34 or other suitable means known in the art.

Figure 7:
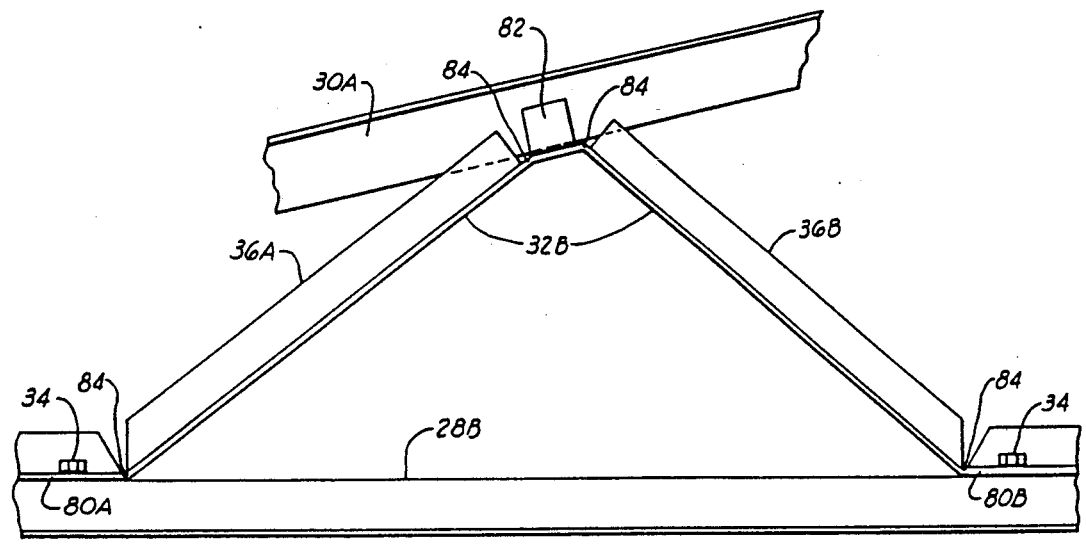
FIG. 7 is a partial side elevational view of an adjustable web assembly utilized in the support spacer of FIG. 5.

FIG. 7 is a view of the present invention utilizing the adjustable web assembly 32B showing the position of the first and second web members 36A and 36B where the plane of the upper beam 30B is sloped in relationship to the plane of the base support members 28B. Erection of this embodiment would be similar to that discussed hereinabove and further description of same is not believed necessary.

Figure 8A:
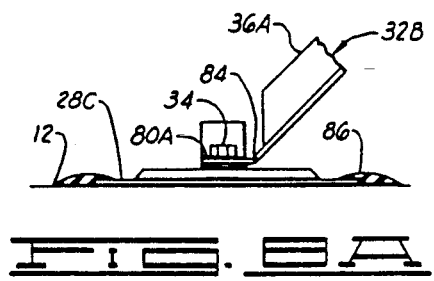
FIG. 8A is a side elevational view of a base plate utilized in lieu of a base support member of the support spacer such as shown in FIG. 5.
Figure 8B:
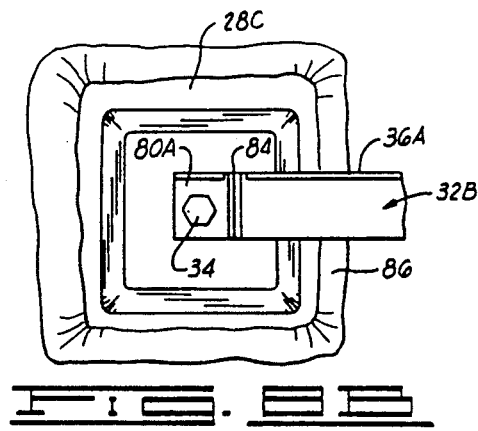
FIG. 8B is a top plan view hereof.

FIG. 8A illustrates a side view of a base plate 28C, said base plate 28C being in lieu of the base support member 28B in the present invention. The base plate 28C is connectable by the adjustable web assembly 32A via first and second end flange members 80A and 80B by the self-drilling screws 34. As is the case for all of the base support members 28, it is sometimes desirable that the base plate 28C be water proofed by bedding it in a base coat of hot tar 86, or other suitable sealant, to maintain the current level of watertightness of the preexisting roof during construction of the new roof. The base plate 28C, also shown in top plan view in FIG. 8B, is attachable to the preexisting roof 12 by any suitable means. In certain instances it may be desirable to connect flange members 80A and 80B directly to the underlying secondary structurals. This is accomplished by first removing portions of the preexisting roof 12 so that flange members 80A and 80B rest on and are connected to the underlying purlins or joists.

It will be apparent that the adjustable roofing support spacers 26 of the present invention can take a number of forms. In the preceding discussion, all of the drawings with the exception of FIG. 7 have depicted the upper beam 30 disposed in final assembly in substantially a horizontal spatial orientation. FIG. 7, on the other hand, introduced the possibility of angularly disposed upper beams for the adjustable roofing support spacers; this may be accomplished using identical web assemblies 32B, or if required, by varying the lengths of members 36B adjacently disposed. The reason for this non-horizontal disposition is to service those applications in which the upper beams of the support spacers are preferably disposed to extend from the eave (by way of example) to the ridge of the roof, or in a manner which accommodates unusual roof shapes, such as circular or curvilnearly shaped roofs. For whatever reasons, the present invention does yield to any required configuration and disposition of the upper support beams 30. Further, while such upper support beams have been discussed with regard to one or more lower beams that are generally parallel to the supported upper beams, the following examples of other forms of the adjustable roofing support spacers will display the flexibility of the present invention, to wit, that one or more upper support beams can be supported in any selected spatial disposition and can be supported by random attachment to one or more supporting lower beams or point contacts with the underlying preexisting roof or its underlying secondary structural members.

FIG. 9 depicts an adjustable roofing support spacer 26C having a lower support beam 28C, also referred to herein as a base support member, and an upper support beam 30C. A plurality of interchangeable spacer web members 36C are attached via appropriate fasteners, such as self drilling-self tapping screws, to the upper and lower beams 30C, 28C. FIG. 9 depicts a sloping preexisting roof 12, with the upper support beam 30C supported in generally horizontal disposition while the lower beam 28C follows the slope of the preexisting roof. The spacer web members 36C are paired with one pair 90 shown in crossed configuration while another pair 92 shown as separated, which are optional arrangements. In each of the pairs 90, 92 one of the spacer webs 36C is disposed on each side of the web portions of the upper and lower beam members 30C, 28C, each of which is of angle iron profile. This spacer web positioning is more clearly shown in the end view of FIG. 9A, and serves the purpose of more uniformly supporting the adjustable roofing support spacer 26C. As described above, the spacer web members 36C are preferably factory installed on the upper support members 30C and shipped for on site assembly to the lower support member 28C which is achieved by simply pivoting the spacer web members 36C to the required positions and field connecting same to the lower support beam 28C. Another feature gained by placing spacer web members 36C on opposite sides of the adjustable roofing support spacer 26C is that, when folded in the shipping position, all those on a given side may extend in the same direction, thus permitting longer such members 36C to be used than would otherwise be possible.

FIG. 10 depicts an adjustable roofing support spacer 26D of similar construction as above with some exceptions, chiefly in that a single upper beam 30D is supported by multiple lower beams 28D. Interconnecting these members are web assemblies comprising paired spacer web members 36D. The lower end portions of the spacer web members 36D are pivotally connected to the base support members 28D which are also viewable in the end view of FIG. 10A. These lower end portions can be attached to the base support members 28D via individual fasteners, as shown in FIG. 10A, or a single fastener can be used to attach adjacently disposed lower end portions of the web members 36D.

As described above, the spacer web members 36D can be pivotally attached to one of the support members at the factory and shipped with the spacer support members 36D extending along their respective base support members 28D. At the field site, the spacer web members 36D are pivoted into the required position; also, because of the angular offset being that as shown, each of the spacer web members 36D must be bent to the required angular disposition. To assist in this shaping, the lower ends of each of the spacer web members 36D has the double direction hinge portion as depicted in FIGS. 11 and 11A. These figures show a portion of one of the base support members 28D and a lower portion of one of the spacer web members 36D which has an extending tab portion 94 pivotably connected to the base support member 28D via a fastener 96. The longitudinal axis 98 of the base support member 28D is indicated, as is the axis 100 which is normal to the longitudinal axis 98 thereof. The spacer web member 36D is readily pivotable on the fastener 96 away from the longitudinal axis 98 as denoted by the arrow direction 102, and the spacer web member 36D is also bendable at its tab portion 94 away from the normal axis 100 as depicted by the arrow direction 104. This double pivotation capability of the hinge attachment of the spacer web members 36D to the base support members 28D permits adjustment to the angularity of such members as shown by way of example in FIGS. 10, 10A such as is required to dispose the upper support beam 30D at a selected height in the manner and for the purpose described earlier hereinabove with regard to the adjustable roofing support spacers 26, and with like field attachment to the upper support beams 30D.

Figure 12:
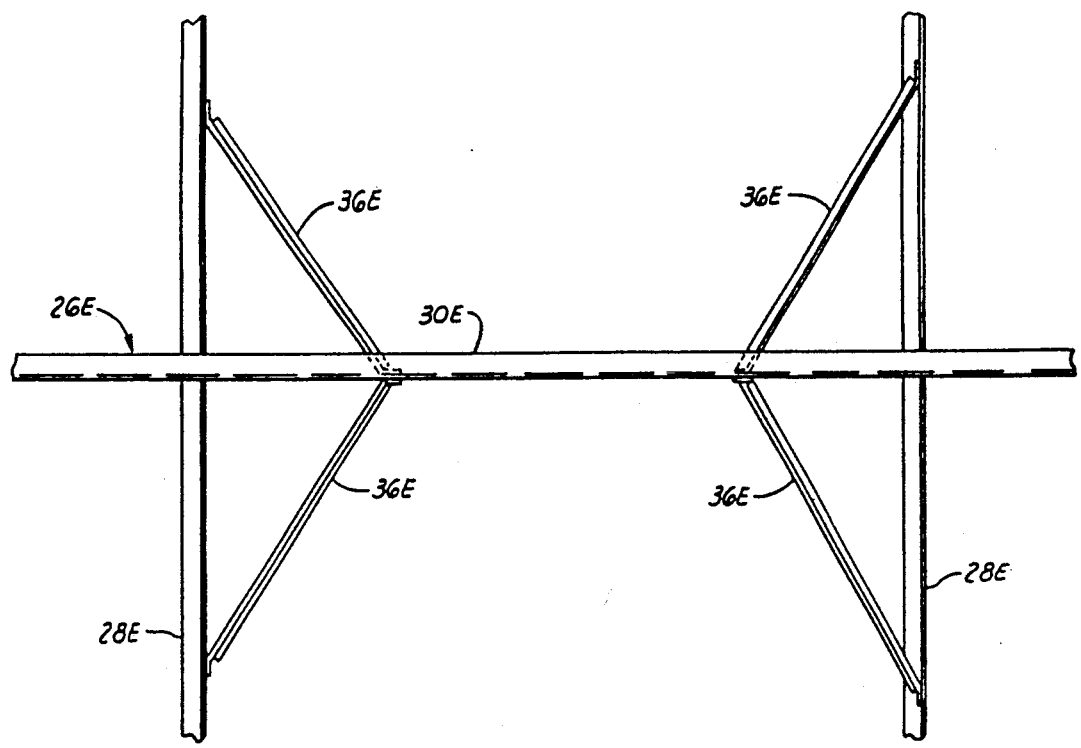
FIGS. 12 and 12A are top plan and side elevational views of a further alternate support spacer member.
Figure 12A:
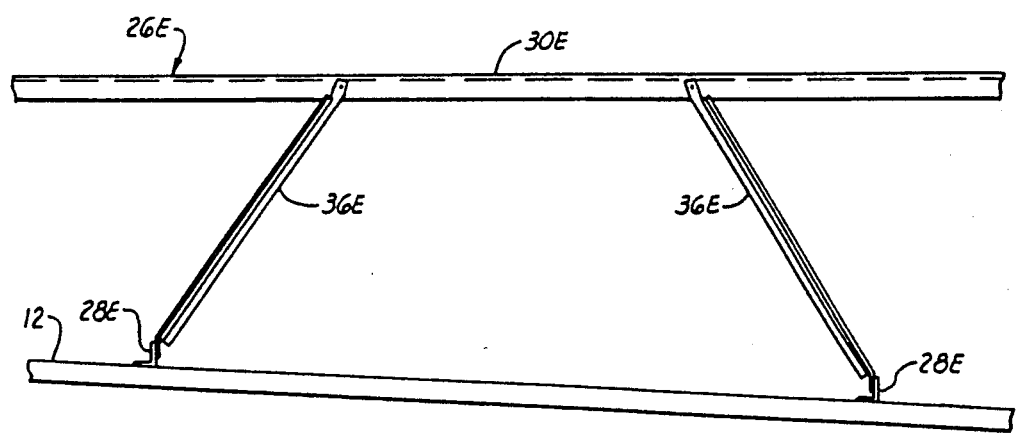

FIG. 12 shows a plan view of yet another adjustable roofing support spacer 26E which again is of similar construction as above described with some exceptions. A single upper beam 30E is supported by multiple base support members 28E, with pairs of spacer web members 30E extending from each base support member 28E at intervals therealong. In this case, each end of the spacer web member 36E has the double rotation hinge 94 that was described hereinabove with reference to FIGS. 11 and 11A. The angular disposition of the members also is viewable in FIG. 12A, a side elevational view. The locations of pairs of the spacer web members 36E serve to produce countering forces for stability as in the other forms of the adjustable roofing support spacers 26 described hereinabove. Assembly need not be described further at this point since this will be clear from the description already provided for the other forms of the support spacers.

FIG. 13 shows a plan view of one more version of the present invention in an adjustable roofing support spacer 26F which features an upper support beam 30F supported by generally parallel lower or base support members 28F which are in turn disposed upon the preexisting roof 12. Adjustable web assemblies are provided and are comprised of spacer web members 36F which interconnect the upper and lower beams 30F, 28F to support the upper beam 30F at a selected height and spatial orientation above the preexisting roof 12. The spacer web members 36F are equipped with the double hinging tab portions 94 at each end thereof, but are only factory assembled to one of the upper and lower beams 30F, 28F, preferably to the upper beam 30F, with the usual attachment to the lower beam 28F at the field site as above described.

Figures 14A, 14B:
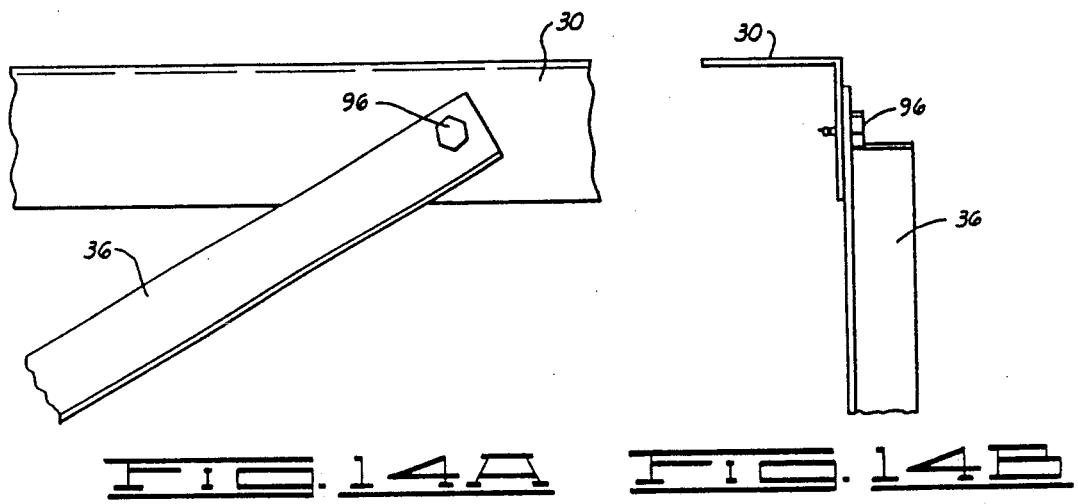
FIGS. 14A and 14B are side and elevational views, respectively, of a single direction hinge connection.
Figures 14C, 14D:
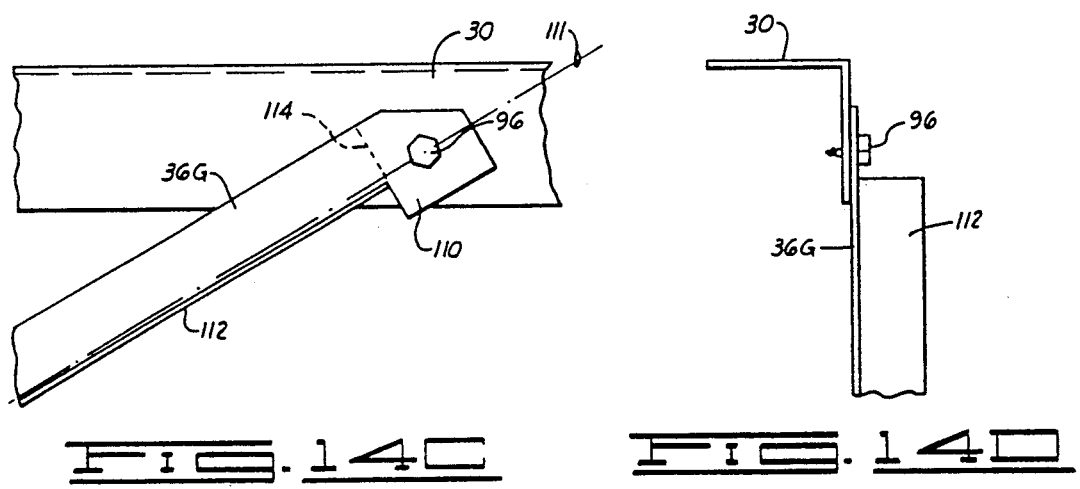
FIGS. 14C and 14D are side and elevational views, respectively, of an alternate single direction hinge connection.

At this point in the description of the various forms of the adjustable roofing support spacers 26, attention is directed to FIGS. 14A and 14B which are, respectively, side and end elevational views of an attachment of one of the spacer web members 36 to one of the support beams, with the upper support beam 30 being shown. These views depict the pivotal attachment of the angle iron profile spacer web member 36 via the fastener 96 through a web portion thereof. While this is generally satisfactory, an improved attachment of a modified spacer web member 36G is shown in the similar views of FIGS. 14C and 14D. The end portion of the spacer web member 36G has a web extension portion 110 which permits placement of the fasteners 96 in an advantageous alignment with the centroid 111 of spacer web member 36G, the centroid 111 being determined by the mass distribution of the spacer web member 36G and determinable via conventional calculation methods. This hammer head pivot adds stability to the spacer web member 36G over that of the spacer web member 36C shown in FIGS. 14A and 14B and is desirable in certain configurations of the adjustable roofing support spacers 26. Further, it will be recognized that the hammer head pivot 110 can also serve as a double hinge by bending same along dashed line 114 shown in FIG. 14C.

FIGS. 15-17

As mentioned above, an isometric view of a partial cut-away roof system is shown in FIG. 1 in which a portion of the pre-engineered building roof system 10 is supported by a building structure 14. The building structure 14 has the preexisting roof 12 which supports a plurality of the adjustable roofing support spacers 26 which extend upwardly to support the roof panels 24. While the present invention will present a novel panel profile, it will be clear that the adjustable roofing support spacers 26 are useable with any number of panel and insulation designs. And while such panels can be attached directly to the upper support beams 30 as discussed, the panels can be supported in a number of ways, one of which is depicted in FIG. 15.

Roof panels 120, of the profile taught in U.S. patent application Ser. No. 568,083, filed Jan. 4, 1984, and referenced hereinabove, are supported on support assemblies 122 which are attached to the upper beam 30 of the adjustable roofing support spacers 26. The roof panels 120, only portions of which are shown, are depicted as being standing seam panels, with their interlocking edge seams being supported by clip portions of the panel support assemblies 122, as will become clear below. A conventional, standing seam roof panel, on the average, is about thirty-five feet long and about twenty-four inches wide, although other lengths and widths are known. Typically, a standing seam roof panel member is made of 24-gauge sheetmetal material, and because of the relative thinness of the metal, corrugations are commonly formed running lengthwise in the panel to provide sufficient strength for load bearing. Further, typical prior art standing seam roof panels are secured at the interlocking side lap joints and at the end overlap of contiguous panels. Fastener penetration of the panels, except at the end overlaps, has been avoided to minimize leakage points. The reason for this is that the panels are sometimes used on wide buildings in which case the connection of the panels directly to relatively rigid underlying structural members has caused the panels to rip out around the fasteners. When used on short spans, or flexible secondary structural members, this does not occur, and the advantages of through center fasteners and an unsupported standing seam joint can be used advantageously. The medial portions of the panels located between standing seam joints are not normally secured to the underlying structural members, there being many disadvantages to doing this with prior art technology. Such roof panels are inherently laterally flexible but longitudinally inflexible. Because the panel is usually placed transverse to the roof, if the panels are joined rigidly end to end and attached rigidly to the underlying secondary structure and portions of the underlying structure are rigid, much damage is caused by differential movement between the two.

The panel width and material thickness are dictated by the structural configuration of the panel and its support structure, as well as the inwardly and outwardly directed load requirements imposed by regulatory, insurance and good engineering practices; other factors being equal, the material thickness required normally is greater for outwardly directed load than inwardly directed load. The reason for this is that the panel is more fully supported by the underlying secondary support for inwardly directed load than for outwardly directed load. The support points, other than at panel ends, for outwardly directed load were in the past located only at points of attachment of the panel to the secondary structural. Past practices limited these points of attachment to places such as those where the panel edge points pass over secondary structural members and where attachment could be made without causing additional holes in the panel. Several attempts have been made to devise intermediate corrugation and corresponding clips to hold the center of the panel to the underlying structural. These attempts have met with limited success because the outwardly directed force bows the center of the panel outward as load is applied and causes the clip to become disengaged. As will be discussed more fully below, the present invention provides for attachment of medial panel portions to underlying structural members, and thus, while maintaining equivalent panel quality, it provides the capability of using thinner gauge material and wider panels while at the same time eliminating ripping of metal around fasteners so as to reduce roof leak potential and the adverse effects of differential expansion and contractions. This presents considerable benefit in time and cost savings to the pre-engineered building art.

Figure 15:
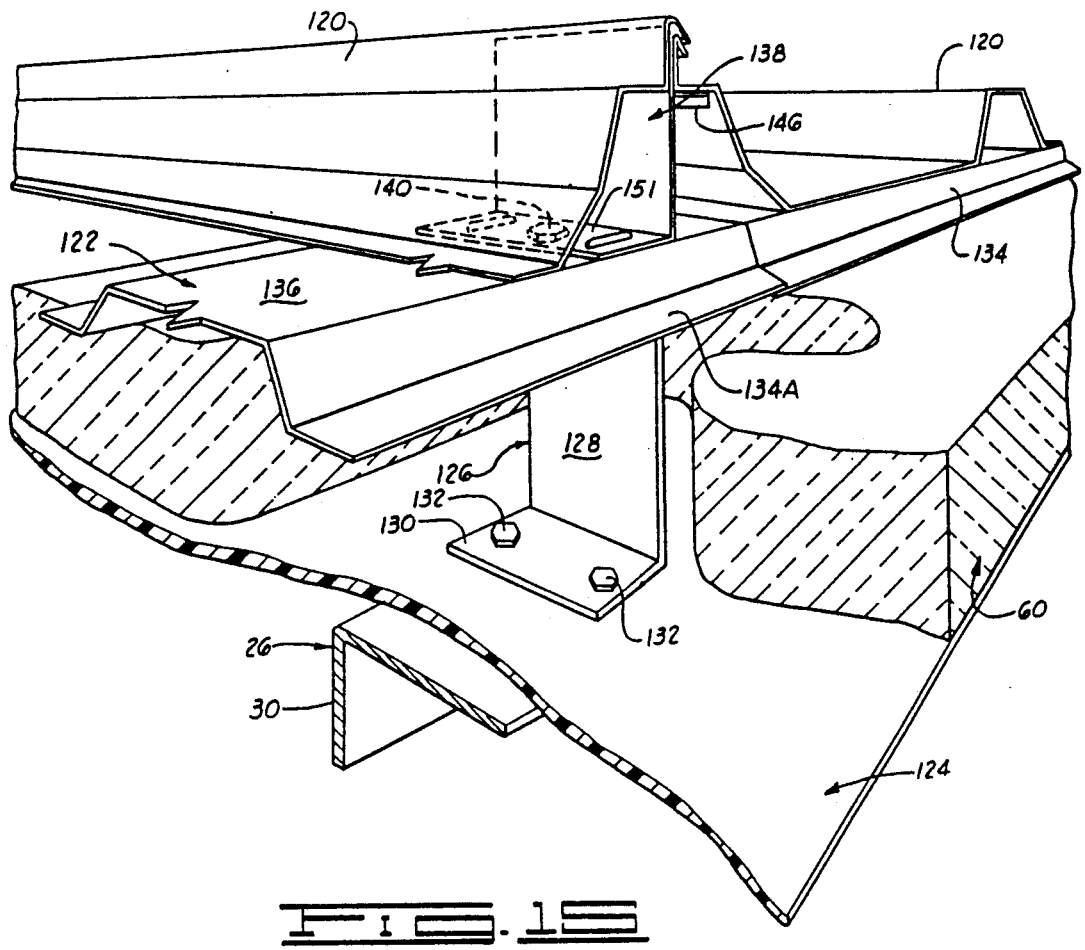
FIG. 15 is a perspective view, in partial cutaway detail, of a support assembly interposed between the roof panels and the adjustable roofing support spacers of FIG. 1.

Continuing this discussion with reference to FIG. 15, a flexible membrane 124 is extended substantially tautly over the support spacers 26 beneath the panel support assemblies 122 and secured thereby to the upper beams 30. A layer of compressible insulation, such as the insulation 60, is supported by the flexible membrane 124 beneath the roof panels 120 in substantially its preinstalled expanded state. As for the type of blanket insulation 60 to be used, it will be noted that such insulation is usually a laminated product that comprises a layer of compressible mineral insulation or chopped glass fiber insulation which is bonded via an adhesive to a flexible facing membrane. However, other types of insulation, such as blown shredded paper, glass fibers and foam, may be used advantageously. The facing membrane 124 may consist of one or more thin layers of materials such as aluminum foil or vinyl plastic which serves to provide a vapor barrier for the building envelope. A typical blanket batt insulation is made by the Mizell Brothers Company of Dallas, Tex., which is a product comprising a laminated facing membrane made of a layer of vinyl, a layer of fiberglass scrim, and a layer of aluminum foil. Bonded to the facing membrane is a thick layer of compressible fiberglass material.

The membrane 124 may also be a separate, independent member which provides a continuous membrane vapor barrier and also serves as a support platform for the insulation layer 60. An independent membrane preferably will be a facing flexible facing membrane about one to two mils in thickness with an embedded scrim, such as Fiberglass or nylon, capable of taking tensile load. The flexible membrane 124, if separate to the insulation, is placed over the upper support beams 30 by attaching it between convenient support members, such as a building wall or roof structurals, so that the membrane extends substantially taut therebetween. Once the membrane is tautly in position, the insulation 60 is simply placed upon the membrane.

Of course, the positioning of the membrane 124 and insulation 60 over the upper support beams 30 is intended as an optional treatment to the provision of a similar membrane and insulation directly upon the preexisting roof 12 as discussed above with reference to FIG. 1. Further, there will most likely be applications where both insulations are installed, or in which the insulation and/or membrane can be eliminated altogether.

Figures 16A, 16B:
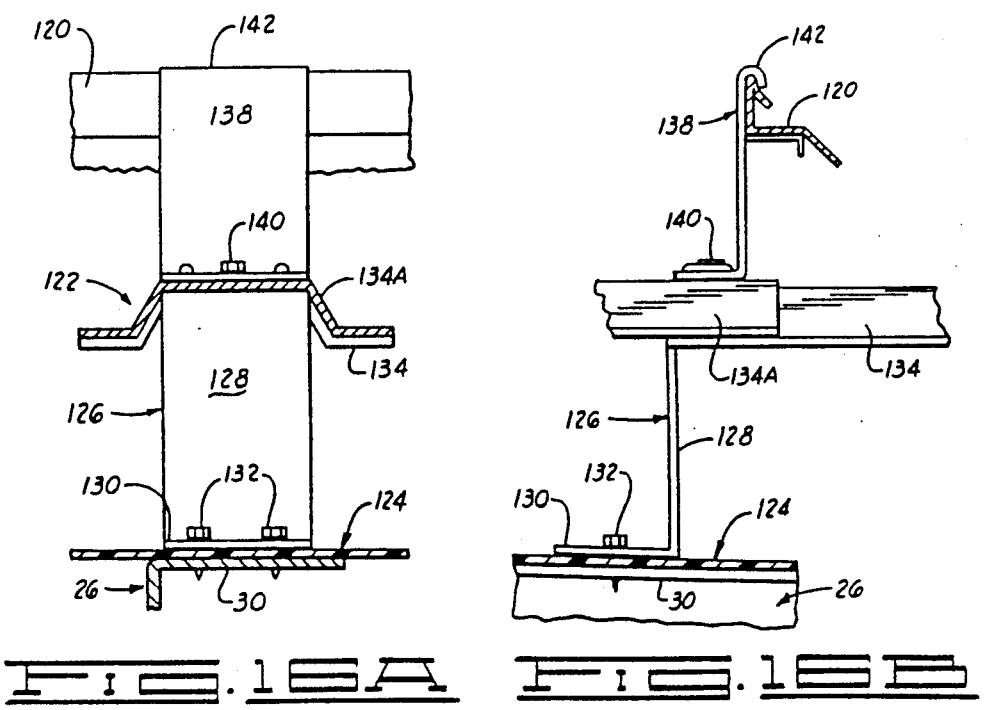
FIGS. 16A and 16B are end and side elevational views, respectively, of the clip members utilized in the support assembly of FIG. 15.

The panel support assembly 122 shown in FIG. 15 comprises a plurality of base clips 126 each of which has a median web portion 128. At the lower end of the median portion 128 there is formed a leg portion 130 through which self-drilling/self-tapping screws 132 extend to secure the base clip 126 to the underlying support spacers 26. As shown in FIG. 16A, the attachment of the base clips 126 serve to secure the flexible membrane 124 to the top of the upper support spacers.

The panel support assembly 122 also comprises a plurality of panel support beams 134 that are generally elongated channel shaped members arranged in overlapping, end-to-end relationship. As shown, the panel support beams 134 extend generally parallel to the underlying upper support beams 30, but where desired, the panel support beams can be disposed to run perpendicularly to, or otherwise angularly to, the underlying upper support beams 30. Preferably, the base clip 126 is formed as an integral portion of the panel support beam 134 to which it is attached. That is, each of the base clips 126 is formed as an extension of the web portion of its channel shaped support beam 134 and is press formed to extend downwardly thereform to support one end of its respective support beam 134 at a predetermined distance above the underlying support beam 30. This is for the purpose of providing clearance below the panel support beam 134 in order to provide space for the insulation material 60 to be positioned thereunder, and further, each base clip 126 has the capability to flex to accommodate expansion and contraction of the roof panels 120.

The roof panels 120 are secured to the panel support beams 134 and rest on, and are connected to, upper support surfaces 136 thereof which provide support for the medial portions of the roof panel members 120 for both inwardly and outwardly directed load. As shown in FIGS. 16A and 16B (which show only the male side lap joint of one roof panel 120 in order to display the clip), an upwardly extensive clip member 138 is secured to the upper support surface 136 of the overlapped panel support beams 134, 134A via a screw 140. An upper hook portion 142 of the clip member 138 is formed to hook over the apex portion of the male side lap joint of the roof panel member 120.

Once the flexible membrane 124 is tautly secured to selected anchoring points and stretched over the support spacers 26, the base clips 126 are secured in place via the bolts 132, and the panel support beams 134 are overlappingly aligned along each of the support spacers 26. The standing seam roof panel members 120 are snapped into overlapping and interlocking relationship over the clip members 138.

FIG. 17 shows an enlarged view of the clip member 138 which has an upwardly extending web portion 144 which supports the hook portion 142 and a laterally extending male joint support shelf 146. The support shelf 146, which has a downwardly turned lip portion 148 for strength, is disposed to extend beneath the male joint portion of the roof panel 120 as shown in FIG. 15. This feature of the clip member 138 is a unique feature of the present invention in that support of the male edge portion assists in increasing joint sealing integrity as the snap on female edge portion of the contiguous roof panel is laid in place and interlocked to the male edge portion.

Other features of the clip member 138 include the provision of embossed strengthening ribs 150 in a base leg portion 151. Further, the base leg portion 151 is provided downwardly extending cleat members 152 from its under surface 154 that serve dual purposes. First, the cleat members 152 are dimensioned to cut through the flexible membrane 124 as the screw 140 is screwed down, and also, the cleat members 152 are caused to dig into the upper surface of the underlying support members (the upper support beams 30 of the support spacers 26) to assist in seating the base leg portion 130 and prevent its rotation with the torquing of the screw 140. This latter feature assures that the hook portion 142 is maintained in proper alignment on the upper part of the male joint being pinned thereby. Finally, the outer surfaces of the clip member 138 are selectively treated with a lubricant or friction reducing coating 156 as depicted in FIG. 17A which is a further enlargement of the hook portion 142. The coating 156 is also provided on the support shelf 146, another bearing surface area of the clip member 138. The purpose of the coating 156 is to reduce frictional contact between the stationary clip members 138 and the supported roof panels 120 during expansion and contraction of same. To this end, the end edges 158 of the hook portion 142 are curved or rounded slightly, as depicted in the partial top plan view of FIG. 17B, and are made smoothe so as to prevent the end edges 158 from digging into the joint portions of the supported roof panel 120 during relative movement thereof.

FIGS. 17C and 17D show another embodiment of the clip member 138A. Portions of the clip 138A are identical to corresponding portions in the clip 138 of FIGS. 17, 17A and 17B, and such portions bear identical numerical designations in FIGS. 17C and 17D, to wit, the hook portion 142, the rib portions 150, base leg portion 151, the cleat members 152 and the lubricant coating 156. In the clip 138A, the support shelf is cut directly from the web portion 144A and form bent along the form intersection 146B to position the support shelf 146A extending generally normal to the web portion 144A. The lip portion 148A is angularly extensive from the distil edge of the support shelf 146A, and the lower edge 148B of the lip portion 148A is caused to be supported by a pair of supporting ear members 144B that are form bent portions of the web portion 144A that (prior to form bending) extend into the profiled hole 149 left in the web 144A once the support shelf and lip portion are broached and form bent as described. Because of the weakening of the web portion 144A by the profiled hole 149 therein, it is desirable to provide a pair of embossed strengthening ribs 150A in the web. The thus described clip member 138A provides an exceptionally stable yet inexpensive clip complement for the roof system 10.

FIGS. 18-23

The present invention provides a number of improvement features for the roof assembly 10 of FIG. 1, many of which are applicable to various roofing panel profiles such as those shown in the drawings discussed hereinabove. The invention shown in FIGS. 18 through 22A is a new and unique panel incorporating features which enables one to manufacture and use a wider, light gauge, standing seam, metal panel then heretofor possible. This is accomplished by incorporating edge standing seam corrugations, a pair of center panel ribbed corrugations and a center panel hold-down assembly that allows the panel to perform exceptionally well for a specific range of end use applications.

For such a wide panel to perform satisfactory it is necessary to suitably stiffen the panel longitudinally and to connect the edge and center portion of the panel to the underlying structure. The connection best suited to connect the edge and center portion of the panel to the underlying structure will depend on a number of factors relating to the overall nature of the building, its supporting structure and the insulation system used.

This unique metal standing seam roof panel system possesses superior material utilization and erection economy. The flat width of 26 gage (0.019 inch) material utilized to roll form the panel may be as low as 117% of the coverage of the panel after forming and being attached to the roof while achieving the benefits of continued watertightness, superior wind uplift resistance and easy low-cost erection. The panel side lap may incorporate any one of a number of side lap configurations as disclosed herein or as utilized in other designs.

To further improve the structural strength of the panel, while at the same time maintaining its watertightness, the panel is attached to the underlying supporting structure in such a manner that the stress concentrations that normally occurs in the panel at the points of attachment are minimized. Because the negative moment in the panel at the attachment is high, but drops off very rapidly, it is possible to gain a superior benefit at a minimum cost by extending the length of the clip past present practices. This results in a substantial reduction in the maximum moment that must be resisted by the panel and at the same time reduces the tendency of the male portion of the panel to pull out of, or unroll, the retaining portion of the female. The present clip may be used to do this economically and effectively. The reason for this is that the upper portion of the clip is an intregal part of the lower portion of the clip, and the complicated slide mechanisms required in many past solutions are avoided. This enables the length of the clip to be extended economically. A clip equal to, or longer than 0.083 of the panel span between supports has been found to be very advantageous and to greatly improve the performance of the panel under wind uplift conditions.

Shown in FIG. 18 is an end schematic view of the profile of a roof panel member 160 which incorporates the unique features just described. In order to illustrate the profile geometry, the panel member 160 is shown interlocked with a contiguous roof panel member 160A on one side and with a contiguous roof panel member 160B on the other side thereof. The roof panel member 160 has a vertically extending male side lap joint portion 162 formed along one side thereof, and a vertically extending female side lap joint portion 164 formed along the other side thereof. In like fashion, the roof panel member 160A has vertically extending male and female side lap joint portions formed along its sides, with only the female side lap joint portion 164A depicted in FIG. 18. Similarly, the roof panel member 160B has vertically extending male and female side lap joint portions formed along its sides, with only the male side lap joint portion 162B being depicted in FIG. 18. In each of these roof panel members, the male side lap joint portion is supported by the underlying support structure and is lockingly receivable in the insertion cavity formed by the snap together female side lap joint portion of a contiguous panel. In FIG. 18, the male side lap joint portion 162 is interlocked with the female side lap joint portion 164A. Also, the male side lap joint portion 162B of the roof panel member 160B is interlocked with the female side lap joint portion 164 of the roof panel member 160.

The roof panel 160 has a pair of parallel corrugation crowns 166 and 168 formed in the medial portion of the panel. The forming of such corrugations running the length of a roof panel is the conventional manner of adding load bearing strength to light gauge sheetmetal.

It will be noted that the roof panel 160 may be placed directly on top of the insulation 60 and that attaching screws 170 secure the panel directly to the underlying upper support beam 30 of the support spacer 26. Furthermore, the standing seam joint formed by the interlocking male/female side lap joint portions 162B, 164 and 162, 164A are not secured via clip members as is conventional. Thus the roof panel 160 and its attaching means provides a panel having the water tightness afforded by a snap together standing seam joint while having an unlimited panel width securable to the underlying support structure. Because of the vertically rising side lap joint portions, the panels can be effectively snapped together without a seaming tool because backup support is accorded to the joint during seaming connection by the supporting structure itself.

As shown in FIGS. 19 and 19A, the roof panel 160 can alternately be attached to the underlying support spacer 26 by the placement of a semi-rigid foam spacer 172 over the insulation 60 with extended screw fasteners 174 extending therethrough to attach to the support beam 30. The spacer 172 may be provided with a more rigid upper surface via stiffener members 176 adhered to the spacer 172 to prevent fastener indentation upon insertion and torquing the screw members 174. If desired, each such screw member may be provided a standoff sleeve 178 to provide a positive stop of the screw members 174; alternatively, the standoff function provided by the standoff sleeve 178 can be achieved by using a self-drilling screw having an enlarged shaft, or by using dual diameter threading which assures proper dimensional standoff as thread engagement occurs. Also, the longitudinal sides 179 of the foam spacer 170 can be sloped to correspond generally to the crushed shape of the insulation 60.

FIGS. 20 and 20A show yet another alternate means for supporting and attaching the roof panel 160 to the underlying support spacer 26. A rigid panel support member 180 is supported directly on the upper support beam 30 and the screw fasteners 174 extend downwardly through the roof panel 160 to attach to the support beam 30. No standoff member is necessary for the screws 174 as the opposing walls 182 of the channel shaped panel support member 180 exert countering forces to the screws 174, the panel 160 being supported on upper portion 184 of the panel support member 180. The bottom edges 186 of both walls 182 are tapered to present a relatively sharp knife edge profile which serves to cut through the insulation 60 with installation of same. Disposed along the lower most portion of the bottom edges 186 are standoff tip portions 188 which are brought to rest upon the vapor membrane of the insulation 60 (if said insulation is provided with such membrane) or upon the flexible membrane 124 if it is disposed to support the insulation 60 as described above. The standoff tips 188 serve to prevent the knife edges 186 from severing the vapor membrane.

While the panel support member 180 is shown as extending continuously along the supporting spacer 26 in FIG. 20, it will be apparent that the length of such panel support members is one of design choice for a particular application. That is, it may be desirable to provide a plurality of shorter panel support members at spaced apart intervals beneath the roof panel 160, and while it is generally thought best to pass each screw fastener 174 through an underlying panel support member, there may be instances where such fasteners will be placed at panel areas not directly over a panel support member. It may be desirable to equip such individual fasteners with standoff sleeves 178 such as shown in FIG. 19.

Figure 21:
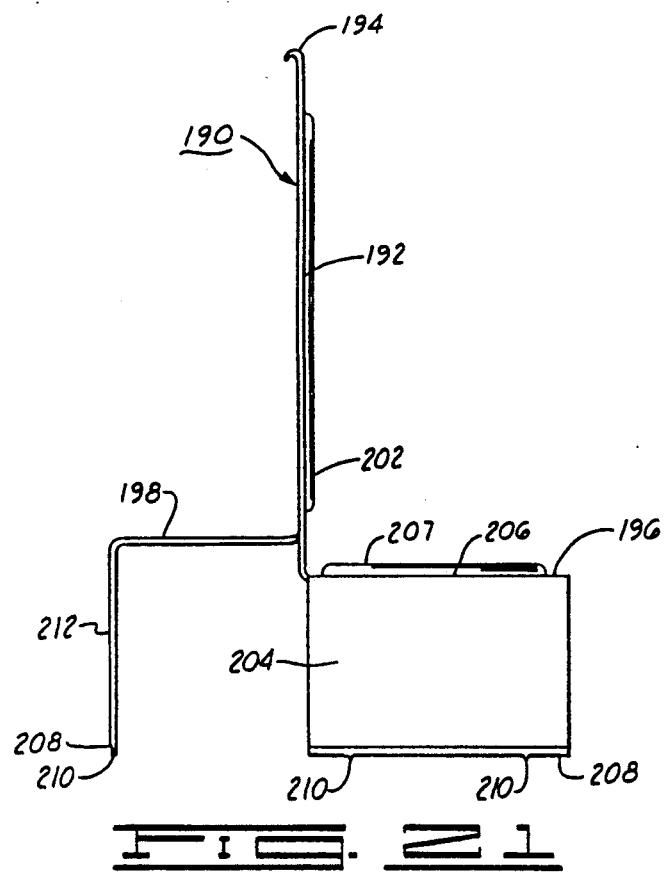
FIGS. 21 and 21A are side and elevational views, respectively, of a side lap clip member which incorporates an insulation cutting feature.
Figure 21A:
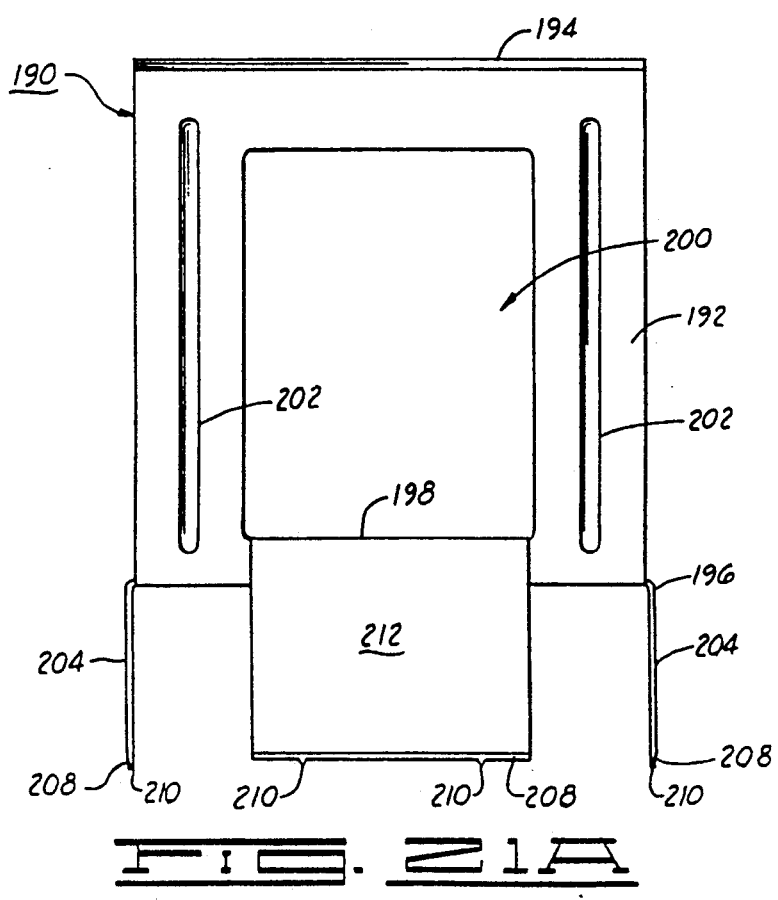

Shown in FIGS. 21 and 21A is a clip member 190 which incorporates the supporting and insulation cutting features of the panel support member 180. The clip member 190, a joint hold-down clip that serves the same panel attaching function of the clip member 138 shown in FIG. 15, has an upstanding web portion 192 with an upper hook portion 194 that engages the male side lap joint of a standing seam panel such as at 162 shown in FIG. 18. The clip member 190 has a base leg portion 196 extensive from and supporting the web portion 192, and a support shelf portion 198 is also extensive from the web portion 198. As shown, the base leg portion 196 and the support shelf 198 extend in opposite directions from the web portion 192, and if desired, the support shelf 198 is cut from the central part of the web portion 192 and form bent into the configuration shown, leaving a profiled hole 200 therein. If desired, strengthening ribs 202 can be provided in the web portion 192.

The base leg portion 196 is channel shaped and has a pair of clip supporting opposing walls 204 extending downwardly from an upper portion 206 having one or more strengthening ribs 207 as shown. The bottom edges 208 of both walls 204 are tapered to present a relatively sharp knife edge profile which serves to cut through insulation (not shown) in the manner discussed for the panel support member 180 of FIG. 20. Disposed along the lower most portion of the bottom edges 208 are multiple standoff tip portions 210 which are brought to rest upon the vapor membrane so as to prevent shearing of same by the knife edges 208 and to prevent the clip from turning on the surface supporting same.

The support shelf 198 is disposed to support the male side lap joint portion of a standing seam roof of the type shown in FIG. 18, and although no clip is shown in FIG. 18, the use of clip 190 is presented as an alternate to, or addition to, the panel attaching means disclosed in that figure. As shown, the support shelf 198 is supported by the web portion 192 and by a leg portion 212 which also has a bottom knife edge 208 with standoff tip portions 210 that serve the purpose discussed above.

The clip 190 permits the placement of insulation, such as glass fiber batting or foam, for example, directly over the underlying support structure, be that purlins, joists or support spacers, while yet accommodating direct joint attachment with substantially full insulation integrity thereat. The attachment of clip 190 is achieved via screw fasteners (not shown) which extend through apertures (not viewed) in the upper portion 206 of the base leg portion 198 and which attach in the manner described above with regard to the fasteners 174 (FIG. 20). The clip 190 can be used in combination with other attachment means, such as, for example, the foam spacers 172 (FIG. 19), the panel support spacers 180 (FIG. 20) or with many other configurations.

A yet further alternate panel attaching means is shown in FIG. 22 wherein is shown a panel 160C which is intended to be of the same construction features as those of the panel 160 (FIG. 18) except for modification to corrugation crowns 166C and 168C. This pair of crowns 166C,168C have oppositely facing hook portions 220,222 respectively, and oppositely facing hooking clips 224 and 226 are hooked therein as shown. Each of the hooking clips 224,226 has a base leg portion 228 through which extends a screw fastener 229 that secures same to the underlying structure 26.

The spaced apart relationship of the standing seam joint and the crown corrugations 166C and 168C should be established so that, when the panel 160C is subjected to upwardly directed load, the catinary forces created as the panel 160C bows up under load will pull the panel corrugations more tightly against the hooking clips 224,226. This effect will be discussed more fully hereinbelow with relation to FIGS. 22A and 22B which are semi-detailed schematical representations dealing with the forces on the panel 160C. At this point it is sufficient to note that the medial portion of the panel 160C is securely attached to the underlying structure 26 load conditions increase up to the point of metal failure of the hooking clips 224,226, a condition well within predictable control of the designer.

The panel 160C is also shown in FIG. 23, but with an alternate attaching means securing it to the underlying structure 26. An insulation board assembly 230 comprises a semi-rigid foam insulation board 232 overlaying and may be previously (factory) adhered to a metal support plate 234. The hooking clips 224A and 226A are partially cut from the support plate 234 and form bent to extend upwardly from the remaining portion of the support plate through holes 236 in the insulation board 232 to engage the hook portions 220 and 222, respectively, of the corrugation crowns 166C,168C. FIG. 23A, a partial cross section, shows this form bent configuration of the hooking clip 224A more clearly. Plural screw fasteners 229A are supported by the insulation board 232 (as shown in broken line view) until placement of the board onto the insulation 60; then the fasteners 229A are secured to the underlying structure 26 as shown, with the heads of the fasteners 229A being finally securely against the support plate 234. The sides 238 of the insulation board are preferably tapered upwardly to generally conform to the crushed portion of insulation 60 over the underlying structure 26.

With regard to the center hold-down described in FIGS. 22 and 23, this is a unique system not previously used in the metal roofing industry. While center hold-downs have been utilized with non-standing seam panels, such prior art devices have had numerous defects. One principal benefit of the center hold-down described herein is that the panel 160C is drawn more tightly against the underlying attachment clips 226 (or 226C) as the panel is subjected to wind uplift. The reason for this is that the panel is proportioned in such a way that as wind creates a suction over the panel and the panel bows upward, the center span, which is longer than the two outside spans exerts a net force counter to the direction the clip points. That is, when the panel is subjected to a uniform outwardly directed load, as would be encountered in wind uplift, the panel flat areas between the center and side hold-down clips bow upward because the transverse flats of the panel have virtually no transverse bending resistance and the panel forms a catenary between panel hold-down clips.

As the panel 160C bows upward, it will exert both a horizontal and vertical force on the side clips as well as on the center clips. The horizontal force is developed because the flat of the panel becomes a catenary and a catenary requires its end supports to exert both horizontal and vertical forces to resist only a vertical load. This is different than normal beam action which requires that the end of the beam resist only equal and opposite loads to be in equilibrium. Other factors being equal, a longer catenary will exert a greater horizontal and vertical force than a shorter one. Also, the greater the curvature the less the horizontal load required to keep the system in balance.

With reference to FIG. 22A, as flat areas A, B and C of panel member 160C bow up as indicated by A1, B1 and C1, this results in a very stiff structurally strong panel in the longitudinal direction. The load delivered to the panel hold-down connector while in this configuration can be divided into components or vectors which are deemed to act both horizontal (parallel to the original panel flat in a transverse direction) and vertical (perpendicular to the original panel flat). The amount and relationship between these two force components or vectors will be determined by the relationship between the spans between panel hold-down connectors and the initial relative tightness of the catenaries, provided other factors such as unit upwardly directed load, material thickness, etc. are constant.

The greater the unit uplift load, the greater the bow between panel hold-down fasteners will become. As the unit uplift load increases, the horizontal component at the end of each bowing panel flat will increase. Since the panel is continuous over the center, non-penetrating, hold-down fasteners, these loads will be off-setting to the extent of the lesser load. The difference between the greater and lesser loads will be resisted by the non-penetrating, center hold-down fastener. Since the width WB of center span is greater than the widths WA and WB of the two outside spans, the net between the two loads will always be directed in such a way as to pull the panel against the non-penetrating center, hold-down clips 224,226.

Because the center span B between the attachment points is wider than the outside spans A and C, and the three sections composing the panel are joined at the juncture over the center hold-down clips, the net force inward at the center hold-down clips will always be greater than the net force out, thus pulling the panel more tightly against the clips. This is depicted in FIG. 22B where H1 represents the horizontal force that results from the outwardly directed load being applied to flat A of the panel. H2 represents the horizontal load resulting from the outwardly directed load applied to panel flat B. In this configuration H2 will always exceed H1 during uplift and this difference must be offset by the force H3 developed in the center hold-down clip 226. Thus, H3 which is opposite to H2 will increase as the load increases, thus forcing the panel 160C more securely against the center hold-down clip 226. The opposite effect will occur at the center hold-down clip 224 located between WB and WC, and the pair of hooking clips 224,226 will cooperate to hold the panel 160C securely to the underlying structural.

The total outward force on the center hold-down clip 226 resulting from its connection to panel 160C is represented by V1 and will be equal and opposite to the hold-down force V2 required to be exerted by the clip 226. Thus, since forces V1 and V2 are balanced, and the difference between forces H1 and H2 is offset by force H3, the joint is seen to be in equilibrium with the net force holding the panel against the clip.

The center hold-down assembly described with reference to FIGS. 1 and 18 are equivalent in performance to that described for FIG. 22 because the center hold-down utilized in FIGS. 1 and 18 rests on flexible roofing support spacers as described in FIGS. 1-3 and 5-10, but not as described and illustrated in FIGS. 11-13. While the center hold-down assembly of FIG. 22 would work on the roofing support spacers described in FIGS. 1-3 and 5-10, this combination would be a more complex and costly solution to the required attributes of the present invention. Conversely, if the roofing system of FIG. 18 is used in continuous runs of over forty feet in length, on a rigid secondary structural system such as that shown in FIG. 11 through 13 on roof slopes of 1:12 or less, the panel will not perform satisfactorily because expansion and contraction will enlarge the fastener holes and cause the roof to leak.

The panel 160 shown in FIG. 18 includes a further improvement in that it does not require a side lap clip which is normally expensive to manufacture and install. This results from the attachment of the panel 160 near the female side lap joint directly to an underlying structural element. The underlying structural element and insulating system may take any one of several forms, such as that shown in FIG. 19.

FIGS. 24 through 32

Figure 24:
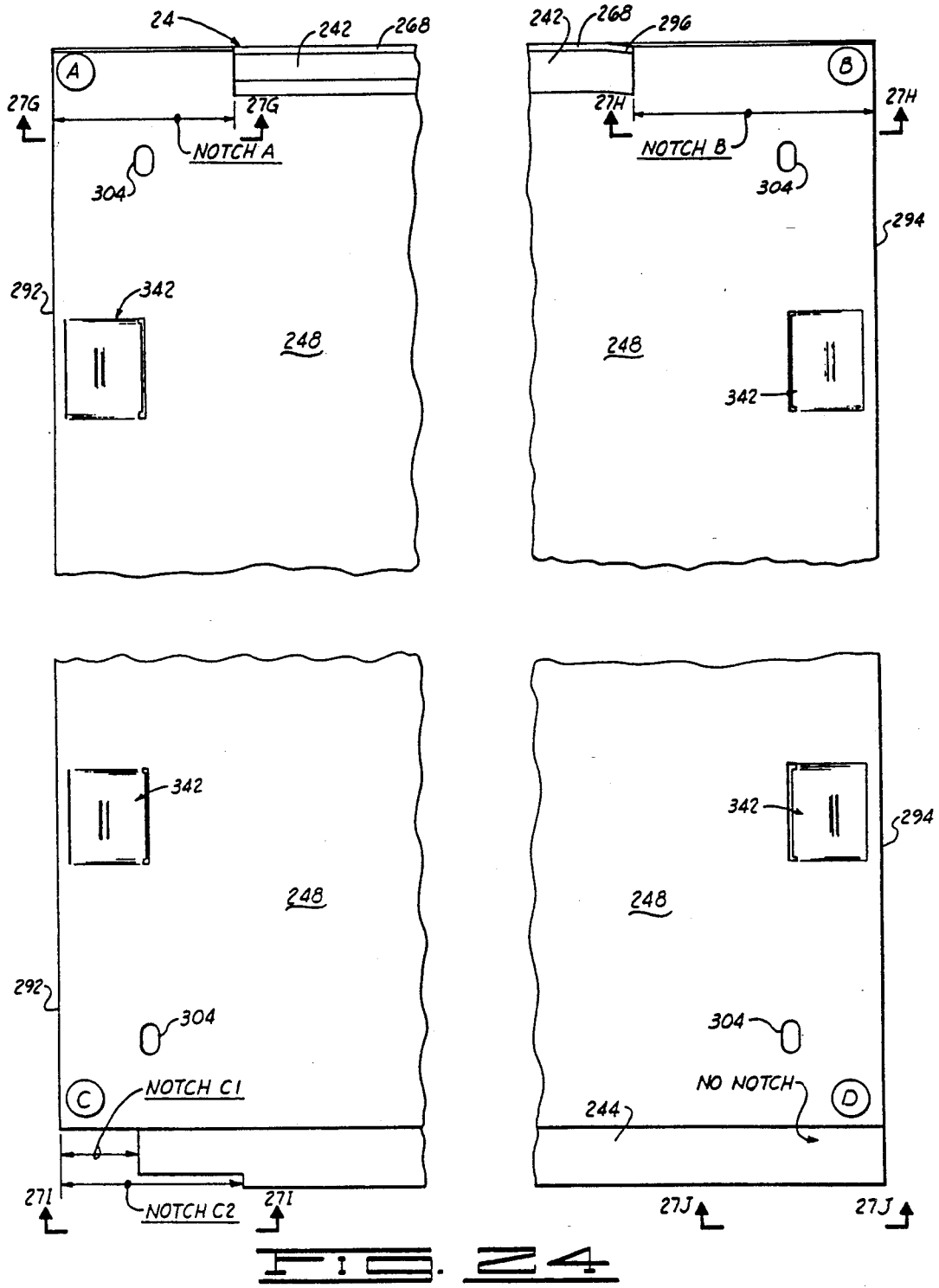
FIG. 24 is a partial plan view of a roof panel member usable in the roof system of FIG. 1.

Turning now to a description of the roof panels 24, and consequently of the alternate roof panels discussed above, shown in FIG. 24 is a partial plan view of the roof panel 24 in which the four corners of same are depicted as corners A, B, C and D, respectively. In FIG. 24A, a semi detailed schematic of the panel 24 shows the position of the end lap sealant which is preferably factory installed prior to delivery to a job site. Together with such end lap sealants, the side lap sealants form selective perimeter preplacement of the panel sealants, the advantages of which will be discussed hereinbelow.

The profiles of the side lap edges of roof panel 24 are depicted in FIG. 25 in which the male side lap edge of roof panel 24 is depicted in interlocked relationship with the female side lap edge an identically constructed roof panel 24A. A description of panel corners A, B, C and D depicted in FIG. 24 will be provided hereinbelow following a discussion of the unnotched side lap edges shown in FIG. 25.

In like fashion to the roof panel 160 of FIG. 18 discussed above, the mating side edges of the roof panels 24 and 24A of FIG. 25 form a standing seam joint 240. Vertically extending male side lap portion 242 of roof panel 24 is engaged by vertically extending female side lap portion 244 of the roof panel 24A. More specifically, female side lap portion 244 extends along one longitudinal edge of the roof panel 24A and has a first female leg portion 246 which extends upwardly from a medial portion 248A of the panel 24A. Also, the female portion 244 has a second female leg portion 250 extensive from the first female leg portion 246 and forming an insertion cavity therebetween. The second female leg portion 244 has an upper flat portion 254 and a downwardly extending portion 256. Lower edge portion 258 of the downwardly extending portion 256 is folded and bent inwardly to form a edge retaining lip 260 which has an incline (measured from a plane parallel with the medial portion 248A) as indicated by the arrow 262. The incline 262 can vary over a wide range, and is preferably between about 0 degrees and about 45 degrees.

The male side lap portion 242 extends along one longitudinal edge of the roof panel 24 and has a first male leg portion 264 which extends upwardly from a medial portion 248 of the panel 24. Also the male portion 242 has a second male leg portion 266 extensive from the first male leg portion 264 and forming a male apex portion 268 therebetween. Another portion of the second male leg portion 266 is substantially parallel to the upper flat portion 254 of the female side lap portion 244, thus forming a sealant engaging ramp 270. Lower edge portion 272 of the second male leg portion 266 is folded to form a male exterior edge 274.

The profile of the male side lap portion 242 is determined in dimensional configuration to be received in the insertion cavity 252 of the female side lap portion 242. A side lap sealant 276, which may be factory installed, is adhered to the inner surface of the upper flat portion 254 of the female side lap portion 244, and upon entry into the insertion cavity 252, the sealant engaging ramp 270 of the male side lap portion 242 is brought into pressing engagement with the side lap sealant 276. This is a unique feature of the standing seam joint 240; not only is the side lap sealant removed from the male apex portion 268 to avoid sealant contact with the clip hook portion 142, the spring like configuration of the male leg portion 266 assures superior performance in sealant to male member contact.

The disposition of the edge retaining lip 260 of the female side lap portion 244 requires overdriving of the male portion 266 during insertion so as to clear the uppermost tip of the edge retaining lip 260, after which the male exterior edge 274 is brought to rest on the edge retaining lip as shown. The closing force required to accomplish this is preferably supplied by a seam roller such as will be described hereinbelow. Also provided hereinbelow with discussion of the seam roller is a discussion of the interaction of the component parts of the standing seam joint 240 during assembly and seaming.

Meanwhile, it will be noted that the configuration of the male leg portion 266 coacts with the female leg portion 250 as leaf like springs that flex during insertion, and once the male exterior edge 274 clears the tip of the edge retaining lip 260, these springing members return to the configuration shown in FIG. 25. However, due to the relative large insertion cavity 250 and the provision of the sealant engaging ramp on the flexible male leg portion 266, there is always adequate space for non-interfering fit of the components of the standing seam joint to correctly join without causing improper bulging joint interference. Improper bulging is caused when the male presses on the sealant so as to cause the sealant to develop sufficient pressure to in turn cause the side lap sealant 276 to be displaced laterally outwardly and prevent male exterior edge 274 and the edge retaining lip 260 from seating properly. Furthermore, the springing characteristic of the male leg portion 266, together with the rolling of the lower edge portion 272, facilitates manufacturing of the standing seam joint 240 as these design characteristics greatly diminish dimensional criticality, thus allowing larger rolling tolerances during the side lap forming.

The standing seam joint 240 is shown in FIG. 25 with one of the clips 138 positioned such that its upper hook portion 142 is hooked over the male apex portion 268 of the male side lap portion 242. Also, support shelf 146 of the clip 138 is shown in underlying support of the panel 24 so as to back up the male side lap portion and hold same in a stable position as the female side lap portion 244 is placed thereover. The clip 138 is attached to underlying structure as described hereinabove.

The panels 24, 24A are shown having a number of strengthening ribs 278 (only two such ribs 278 being shown in FIG. 25), the purpose of which is to stiffen the panels, especially in the vertically extending portions, to assist in joining the male and female side lap portions and to increase the strength of the section when subjected to longitudinal bending. Strength increase may come from both the stiffening effect of the rib and the work hardening of the material so as to effectively increase its tensile or compressive strength. The panel strengthening ribs, if they do not interfere with other panel functions, may be retained as shown herein, or if their retention interferes with other functions of the panel, the work hardening benefit may be achieved by first forming the panel with the strengthening ribs 278 and then immediately roll forming the panel to remove the strengthening ribs. This selective localized work hardening increases the strength of the panel at critical areas and improves its performance when subjected to live load conditions. This strengthening is also useful in assuring joint snapping integrity, especially when self snapping is the sole form of closing pressure exerted, and the same is still helpful with the employment of a seaming tool.

The insertion cavity 252 of the standing seam joint assembly 240 is especially efficacious in obtaining joint sealant integrity. The substantially parallel upper flat portion 254 and sealant engaging ramp 270 serve to secure the side lap sealant in abutting engagement to form a sealing dam all along the standing seam joint. At the end lap regions where the sealant 276 is predisposed to veer to contact the end lap sealants at one side of the insertion cavity 252 with sufficiently arranged space to accommodate this veering. This will become more clear in the discussion of the four corner juncture area below, and it is sufficient to note here that the side lap sealant comprises a longitudinal strip of sealant which is supported alternately in a male joint abutting mode in which mode the sealant strip is in abutting engagement with the sealant engaging ramp 270, and in a juncture mode in which the side lap sealant 276 is in a position to abut the end lap sealants. Further, the side lap sealant 276 in its male joint abutting mode, is positioned to avoid contact with the male apex portion 268 so that the stationary clips 138 do not tear the side lap sealant 276 as relative movement occurs between the panels 24 and the clips 138.

This simple, yet important, sealant arrangement is a significant departure from prior art treatment of joint sealant placement. In most cases, the placement of sealant is almost an after thought of the designer, since mastic type sealant is disposable at will in the joint. However, water tightness of the joint suffers from such design treatment, as can be verified by ordinary observation of roofs; roof leaks are probably the most common complaint and certainly one of the least appreciated. In the standing seam joint 240, the design accommodates the longitudinal extension of the sealant strip 276 with minimal disturbance (excepting the aforementioned veering at the four corner juncture areas), and with this preestablished disposition of the side lap sealant strip, the abutting components of the joint uniformly interact therewith to enhance water tightness integrity.

The side lap sealant strip 276 preferably is comprised of a resilient material such as closed cell foam, but it may also consist of a flowable (butyl type) material. Both of these sealants are conventionally employed in the building art, and are thus well known to a person of ordinary skill in this art. FIG. 26 shows an alternate and unique sealant combination 280 in which both a resilient foam and a flowable materials are utilized. A first foam sealant portion 282 has a channel 284 formed in its bottom surface 286. The channel 284 is filled with a second sealant portion 288 which is a flowable type of sealant material. The second sealant portion 288 may have a protruding exterior miniscus 290 for wetting contact with abutting joint components. The advantage of the combination sealant 280 is that the body of the sealant is readily maintained in resilient damming action while the flowable sealant portion assures contact even should compressive forces diminish in any given zone along the joint. Another, and perhaps the principal, reason for the combination sealant 280 is that the closed cell foam retains a more nearly constant durometer throughout a wide temperature range while the flowable sealant does not. On the otherhand, the flowable material will flow into cracks and crevices at a panel joint to seal off these channels while the closed cell foam will not.

Returning now to FIG. 24, wherein is shown portions of the roof panel 24 in plan view, along one longitudinal edge is disposed the upstanding male side lap portion 242, and along the opposing longitudinal edge there is disposed the upstanding female side lap portion 244. Selective notching of the male and female side lap portions occur at the corners A, B, C and D in order to facilitate interlapping with contiguously disposed roof panels. FIG. 24 displays this notching, as follows: at corner A, notch A extends from lateral edge 292; at corner B, notch B extends from opposing lateral edge 294, and external side edge 296 of the male side lap portion is swaged to feather it slightly inward; at corner C, notches C1 and C2 extend from the lateral edge 292; and at corner D, there is no notch. Notch B is shown in FIG. 24 before swaging and in FIG. 27A after same. The elevational profile of these notches will become clear with the discussion below. Sealant is factory applied across one end of the panel 24 as indicated in FIG. 24A, which shows the positioning of same.

FIGS. 27A through 27C depict the placement of four contiguously disposed and interlapped panels at a four corner juncture area 300; these interlapped panels will be designated 24, 24A, 24B and 24C, all of which are of similar construction. The roof panel 24 has the unique ability of being installed both in a left to right or a right to left laying progression. In these figures, the upslope direction 302 is indicated by the arrow thusly marked, and corner A of panel 24 is downslope on the first panel installed in this instance. (FIG. 27A) Corner B of panel 24A is lapped over corner A of panel 24, which has factory applied end lap sealant placed thereon as shown. Corner B has a slotted hole 304 that is disposed over slotted hole 304 of Corner A. Next (FIG. 27B), corner C of panel 24B is positioned to interlock its female side lap portion 244B over the male side lap portion 242 while placing corner C adjacent to corner A as shown. End lap sealant is factory applied to the panel 24B as shown. Then (FIG. 27C), panel 24C is positioned to interlock its female side lap portion 244C over the male side lap portion 242A of panel 24A and over substantially all of the notched portion (C2) of the female side lap portion 244B of panel 24B, and to position corner D adjacent to corner B while overlapping corners A and C as shown.

As shown in FIGS. 27C and 27D, notch C2 of panel 24B is slightly longer than the overlapping portion of corner D of panel 24C which when assembled is designed to line up with corner B. That is, the lateral edge 294C of panel 24C (at corner D) will theoretically line up with lateral edge 294A of panel 24A (at corner B). However, in actual practice, the underlying supporting structure is often misaligned or out of square, and it may be necessary to move the position of corner D so that lateral edge 294C is out of line with lateral edge 294A by as much as about one eighth of an inch or more. The extra length of notch C2 permits this adjustment without metal interference, and the slotting of holes 304A and 304B permits this positioning while yet lining up these holes sufficiently to permit the passage therethrough of the connecting screw fasteners.

FIG. 27D is an elevational view of the four corner juncture area 300 showing portions of each of the corners A, B, C and D as these corners interlap. FIGS. 27E and 27F depict views taken as indicated in FIG. 27D. In FIG. 27E, the notches in panels 24 and 24A (corners A-notch A and corner B-notch B) in the male side lap portions 242 and 242A, respectively, have removed the upper parts of these side laps so that the first male leg portions 264, 264A extend into the sealant 276C carried by the over extending female side lap portion 244C. The notch C1 in panel 24B has cut the first female leg portion 246B of the panel in noninterfering disposition as shown. In FIG. 27F, notch C2 has removed a small portion of the flat portion 254B and the downwardly extending portion 256B of the second female leg portion 250B so that a substantial portion of upper flat portion 254B is received in the insertion cavity 252C. In this latter view, it will be seen that the sealant 276B is indented by the male leg portions 264, 264A. The other sealants also are displayed, denoting the complete sealant damming that is effected.

Figure 27G:
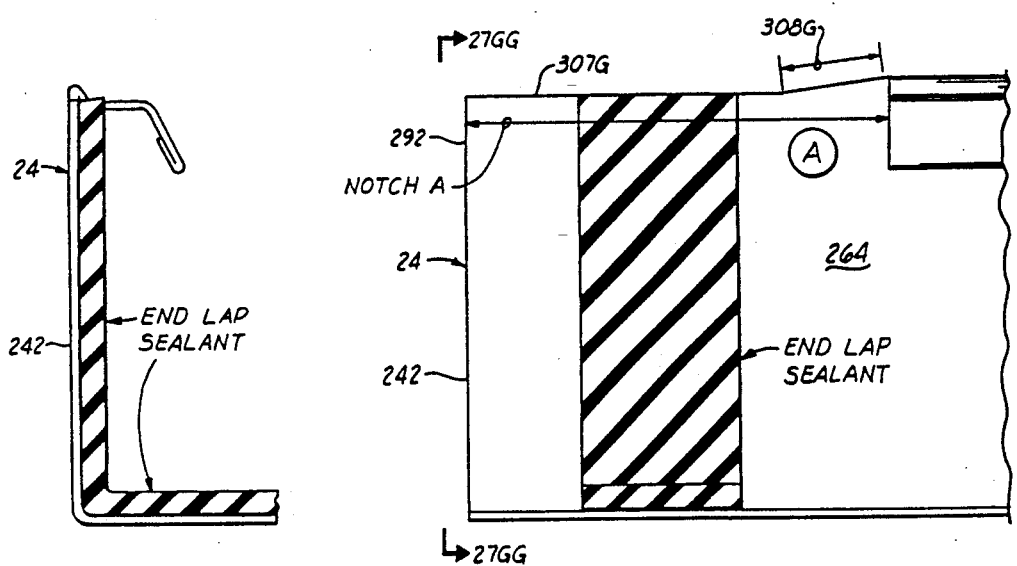
FIG. 27G is a partial detailed, elevational side view of corner A of the roof panel member of FIG. 24.

Another view of the sealant placement and notching is depicted in FIGS. 27G through 27J. FIG. 27G is a partial side view of corner A of the panel 24 in which is shown the end lap sealant extending along the vertical male leg portion 264 of the male side lap portion 242, also shown in the end view of FIG. 27GG. Notch A, extending as shown, has a horizontal edge 307G, and an angularly disposed sealant fillet 308G extends from the edge 307G upwardly, thereby serving as a transition between horizontal edge elevations of notch A. This is an important feature of the present invention in that the sealant fillet 308G avoids the open areas that result in the abrupt edges found in prior art corner notching wherein the sealant, unable to make sharp turns, is often unsupported (separated from the panel) at notch corners and creates an opening through which water can pass to the interior of the building. Contrary to such prior art notching, the sealant fillet 308G provides continuity of sealant contact, leading to water tightness enhancement at the four corner area 300.

Figures 27H, 27J:
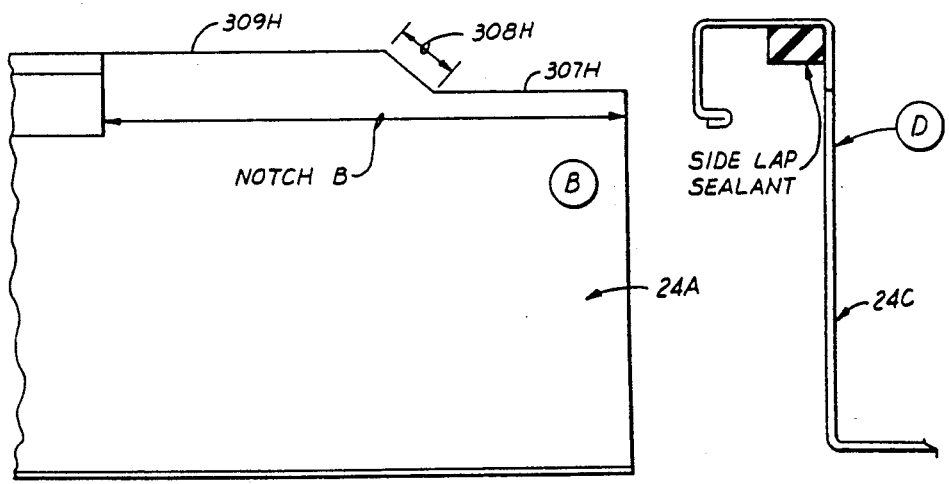
FIG. 27H is a similar view of corner B of the FIG. 24 roof panel member.
FIG. 27J is a partial detailed, elevational end view of corner D of the FIG. 24 roof panel member.

FIG. 27H shows a similar view of the corner B of panel 24A. Notch B, extending as shown, has a lower horizontal edge 307H and an upper horizontal edge 309H, with an angularly disposed sealant fillet 308H that serves to transition between the horizontal edge elevations of Notch B. The sealant fillet 308H serves the function discussed above with regard to the sealant fillet 308G (FIG. 27G).

FIG. 27I shows a partial end view of corner C of panel 24B, with an end view there shown in FIG. 27II. Notch C2, extending as shown, exposes the side lap sealant of panel 24B, and the end lap sealant is adhered along the panel to extend up the female leg portion 246B of the female side lap portion 244B and on the female leg portion 250B (actually, the end lap sealant is only partially supported at the female leg portion 250B as the sealant partially extends without support above leading sloping edge 209I.

FIG. 27J is a partial end view of corner D of panel 24C showing side lap sealant veered to its edge engaging mode in order to be sealingly contacted with the upstanding male leg portions (as at 264 and 264A in FIG. 27E).

FIGS. 28A through 28F, to be explained more fully below, display the installation sequence when the panel 24 is used on the opposite roofing slope. Meanwhile, completion of the four corner juncture area 300 will be described by referring to cinch strap assembly 310 shown in FIG. 29 which comprises a bar strip 312 that has a length dimension 314 which extends between the male and female side lap portions of the panel 24. For simplifying this discussion, the bar strip 312 is depicted as a straight member, but it will be understood that the medial portion of the bar strip will be configured to fit over any corrugation crowns that the panel 24 (or appropriate panel) may have. The first end 316 of the bar strip 312 has a joint strap portion 318 that is shaped to fit over the standing seam joint 240. The joint strap 318 has a first leg portion 320 and a second leg portion 322 interconnected by a generally horizontal portion 324. The second leg portion 322 has an angular set as shown, and a base leg portion 326 extends from the distil end thereof. A plurality of holes 328 are disposed along the cinch strap 310 which are predetermined to overset the slotted holes 304 in the ends of the panel 24. When the joint strap 318 is placed over the standing seam joint 240, the leg portion 326 is forced against the medial portion of panel 24, and as indicated by the dashed lines 322A and 326A, which depict the final position of the joint strap 318 (just before attachment), the leg portion 322 is shorter than the leg portion 320 by a distance 330 which is greater than the thickness of the bar strip 312. Thus, when the base leg portion 326 is forced against the medial portion of the panel 24 by screw fasteners, the joint strap 318 will be caused to compress the standing seam joint 240 whereupon sealing integrity is enhanced. Finally, at the other end 332 an upstanding lapped leg portion 334 is disposed. When the cinch strap 310 is overlapped by the joint strap 318 of a contiguous cinch strap of identical construction, the lapped leg portion 334 is secured therein.

To secure the cinch strap 310 in place over the four corner juncture area 300, a companion backup plate 340, shown in FIG. 30, is provided. When installing the cinch strap assembly 310, the screw fasteners that are placed through the holes 328 and 304 of the cinch strap 310 and panels 24 respectively, a nut plate is provided since the thin gage panel material is not usually suitable to distribute the screw fastener compression load over the desired compression area or retain long term compression integrity of the juncture area 310. This nut plate must either be held in place by a worker under the panels, which is usually not feasible, or it must be held in position by mechanical means. The present invention presents a novel means of placement and retention of the backup plate 340 prior to installing the cinch strap 310.

Returning to FIG. 24, a plurality of stirrup connectors 342 are disposed near the lateral edge 292 or the lateral edge 294 of the roof panel 24. While stirrup connectors 342 are shown at both ends of the panel 24, this is illustrative only, and it will be understood that such stirrups will occur only on the bottom one of the end lapping panels. An enlargement of one of the stirrup connectors 342 is shown in FIG. 31, this connector comprising a support platform 344 which is partially cut from the panel metal and embossed downwardly. As shown in FIGS. 31A and 31B, the support platform 344 has a pair of supporting side walls 345 and is open at ends 346 and 348, with end 346 having an entry lip 350 turned slightly downward. A pair of detent ribs 352 are embossed to extend upwardly from the upper surface of the stirrup connector 342.

With further reference to FIG. 30, the backup plate 340 comprises an angularly profiled member having an upper planar surface 354 with plural guide holes 356 disposed to align with holes 304 that are disposed near the ends of panels 24 and 24A. The length of the backup plate 340 is sufficient to back up the cinch strap assembly 310. As also shown in FIG. 32, relief areas 358 are cut in the bar plate 340 to expose a pair of extensive stirrup engaging tabs 360 that are spatially determined to be slidably received by the pair of stirrup connectors 342 supported beneath panel 24 near end 292. Each such stirrup engaging tab 360 has an embossed detent rib 362 as is viewable in FIG. 32. When the tab 360 is moved into the opening at end 346, it passes unrestrictedly and its detent rib 362 passes over the detent ribs 352. These latter mentioned detent ribs 352 serve to resist removal of the tab 360 once it is in support engagement with the support platform 344, thus assuring retention of the backup plate 340 beneath the lower most roof panel 24 at the four corner juncture area 300. The stirrup engaging tabs 360, having an arrow point shape as shown, serve to guide the backup plate 340 during assembly into its proper position. The dimensions of the relief area is determined such that the deep edges 364 are brought to rest against the ends of the side walls 345 of the stirrup connectors 342. Further, the tab edges 366 of the stirrup engaging tabs 360 are disposed to be in near proximity to the side walls 345 of stirrup connectors 342 once the backup plate 340 is installed, thus disposing the backup plate with a degree of precision placement that assures proper alignment of the holes 356 (of backup plate 340), 304 (of the lapping panels) and 328 (of the bar strip 312 of the cinch strap assembly 310). This aligning feature of the present invention facilitates the installation of the cinch strap assembly 310 and assures quality end lap sealing.

With the backup plate 340 in place, screw fasteners are placed through the holes 328 (in the cinch strap assembly 310) and holes 304 (in the overlapping roof panels), and threadingly engaged with the guide holes 356 in the backup plate 340, which, like the bar strip of the cinch strap, is of sufficient thickness to endure the compressive force generated on the four corner juncture area to ensure water tightness integrity.

An alternate backup assembly to be used in lieu of the backup plate 340 is shown in FIG. 30A. The backup plate 30 is a separate component which is supported beneath the bottom panel at the lapping area via the stirrup connectors 342 formed in the panel 24 as required. A backup assembly 340A is formed integrally with the modified roof panel 24E shown in FIG. 30A. The panel 24E is the same as described above for panel 24 with the exception that the lateral edge 292E of the panel flat is extended and is form bent to have a plurality of stiffening runs 364 beneath the end of the panel 24E, as shown more clearly in the enlarged cross sectional view of FIG. 30B. A nut platform 366 is shaped to extend from the stiffening runs 364 just beneath the panel flat, and holes 368 are formed therein just below, and registered with, the holes 304 in the panel 24E. Preferably, the holes 368 are punched and tubulated into, or with, the holes 304 so that the walls of the holes 368 project into the holes 304 in the manner shown. The stiffening runs 364, provided in the number, shape, and dimension necessary, serve to strengthen the panel flats at the four corner areas, and the holes 368 are appropriately sized such that the platform 366 serves as an integrally formed nut for the screw fasteners that secure the cinch strap assembly 310 to the four corner juncture area.

As mentioned above in the discussion of the four corner juncture area 300, FIGS. 27 through 27F depicts the lapping sequence of installing the roof panels 24 with the roof upslope direction being that indicated by the arrow 302. The roof panels are unique in that progression of panel installment can also proceed in similar fashion when the roof upslope direction is reversed, as when dealing with the roof section on the other side of the roof ridge. FIGS. 28A through 28F depict this lapping procedure when the upslope direction is that indicated by 302R. The same numerical designations will be used in FIGS. 28A-28F to indicate identical components appearing in FIGS. 27A-27F.

Figure 28A:
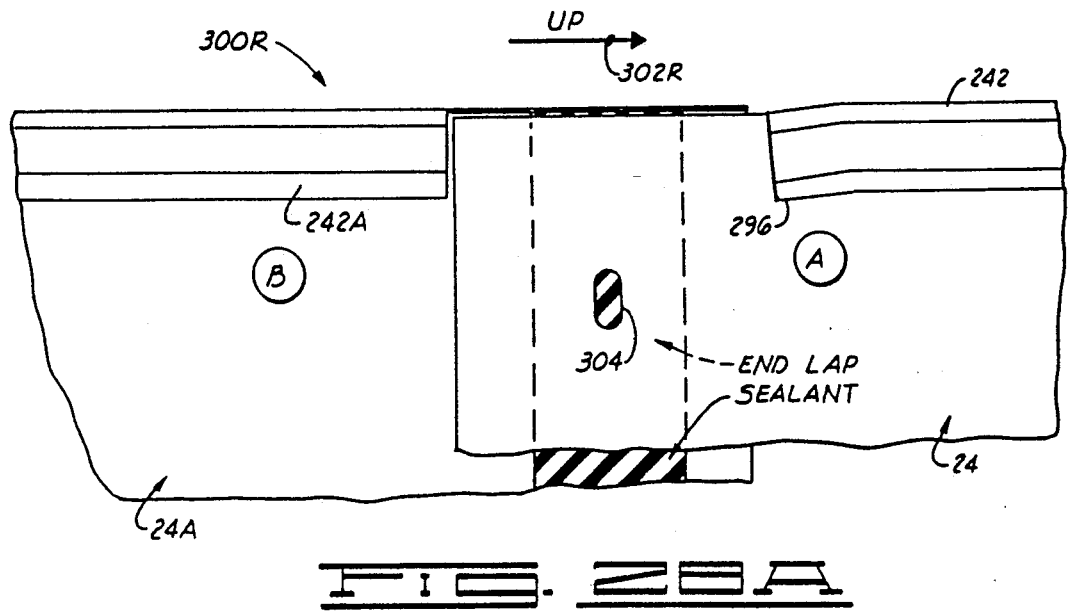
Figure 28B:
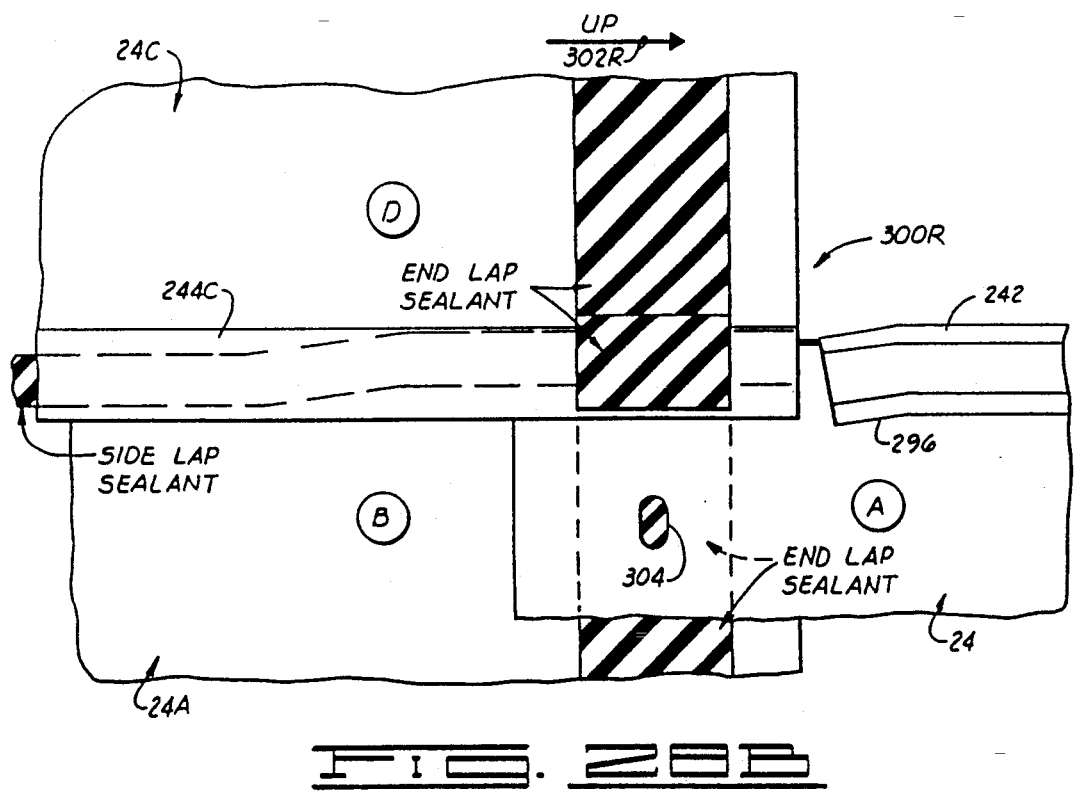
Figure 28C:
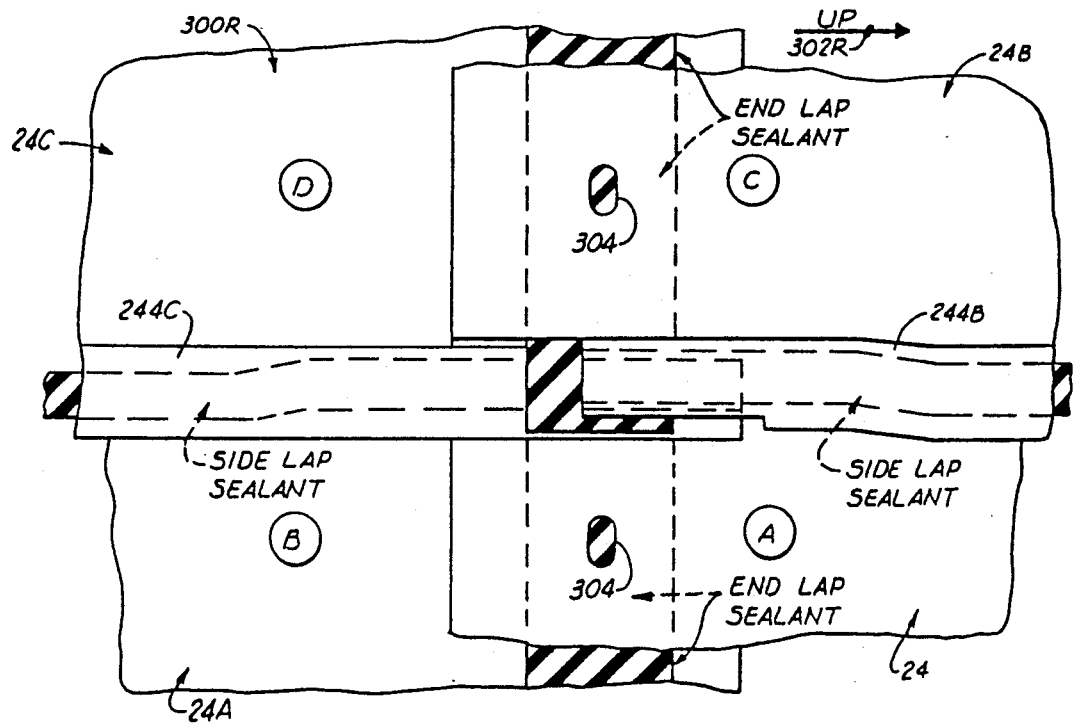

In FIG. 28A, the upslope direction of the underlying support structure is depicted by arrow 302R, and corner B of panel 24A is now downslope. Corner A of panel 24 is lapped over corner B and on top of the end lap sealant that is preferably factory installed on panel 24A in the position shown. Next (FIG. 28B), corner D of panel 24C is positioned to interlock its female side lap portion 244C over the male side lap portion 242A at corner B. End lap sealant is disposed on panel 24C as shown, preferably at the factory. Then (FIG. 28C), panel 24B is positioned to interlock its female side lap portion 244B over the male side lap portion 242 of panel 24 and over the female side lap portion 244C of corner D (panel 24C).

Figure 28D:
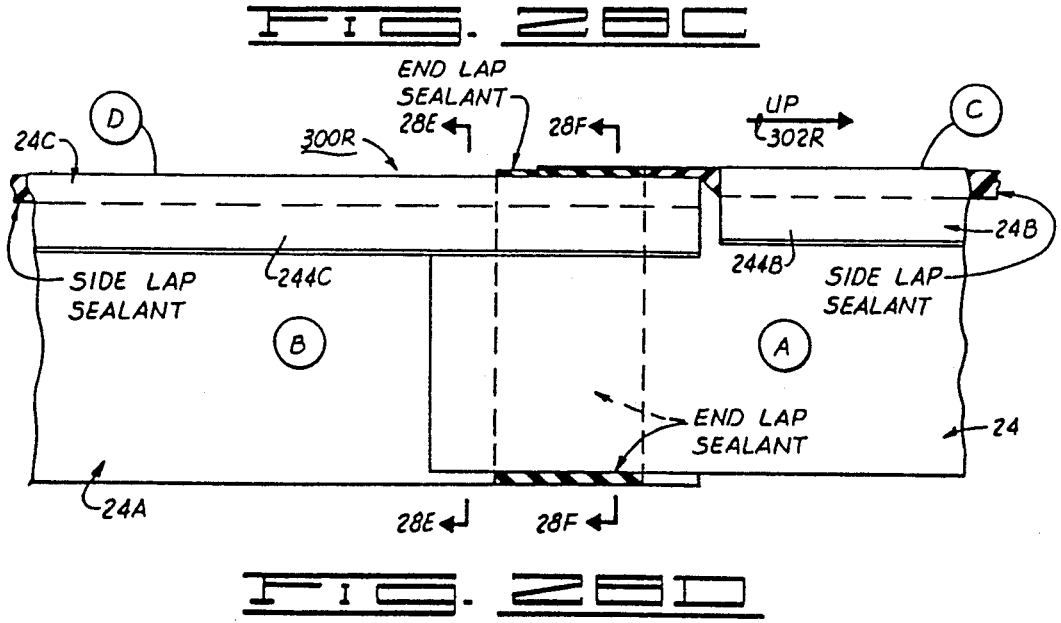

FIG. 28D is an elevational view of the four corner juncture area 300R showing portions of each of the corners A, B, C and D as these corners interlap. The notching of the panels is the same as discussed above with regard to four corner juncture area 300, so it is sufficient to note only the differences thereof relative to comparing the view of FIG. 28E to that of FIG. 27E, and the same is true relative to a comparison of FIGS. 28F and 27F. It will be noted that the bottom panels in FIG. 28E are panels 24A and 24C, and that the first female leg portion 246B (corner C of panel 24B) is now outboard to the female side lap portion 244C (corner D of panel 24C). The notched first male leg portions 264, 264A (of corner A and corner B, respectively), although reversed in order, still abut the sealant 276C in the insertion cavity 252C of panel 24C. As depicted in FIG. 28F, the notched upper flat portion 254B (corner C, panel 24B) overlaps the female side lap portion 244C (corner D, panel 24C) with sealant 276B therebetween. After sealant is placed over the juncture area 300R, the aboved described cinch strap 310 and backup plate 240 are joined via appropriate screw fasteners to cooperatively compress the lapped area.

FIGS. 33-34B

As mentioned hereinabove in reference to assembling the standing seam joint 240, the closing force required to achieve the interlocking of the male and female side lap portions 242, 244 of the roof panels 24, 24A (as shown in FIG. 25) is preferably supplied by a seam roller such as shown at 370 in FIG. 33. The closing, or seaming, of the standing seam joint 240 will be discussed following a description of the seam roller 370 and an alternate thereof.

Figure 33:
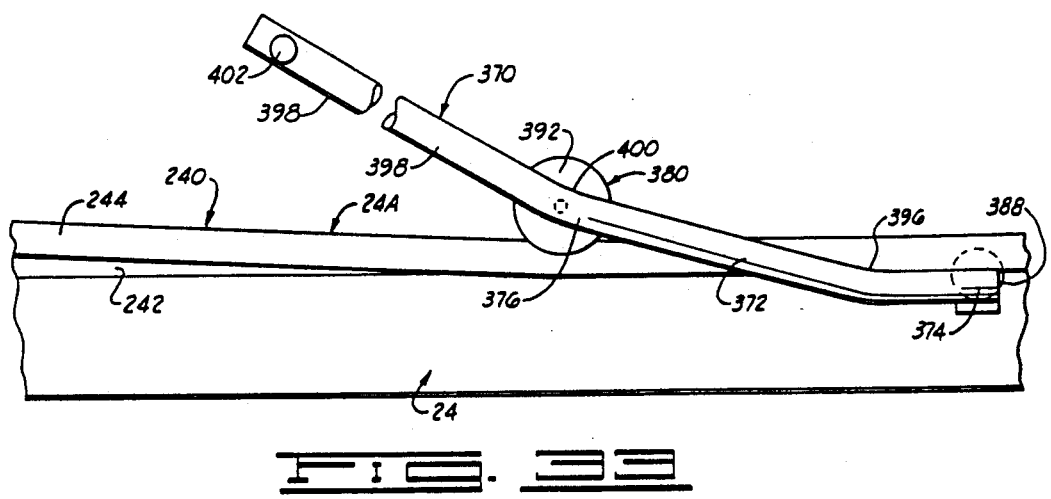
FIG. 33 is a side elevational view of a seam roller constructed in accordance with the present invention and shown in sealing engagement with the standing seam joint of FIG. 25.
Figures 33A, 33B:
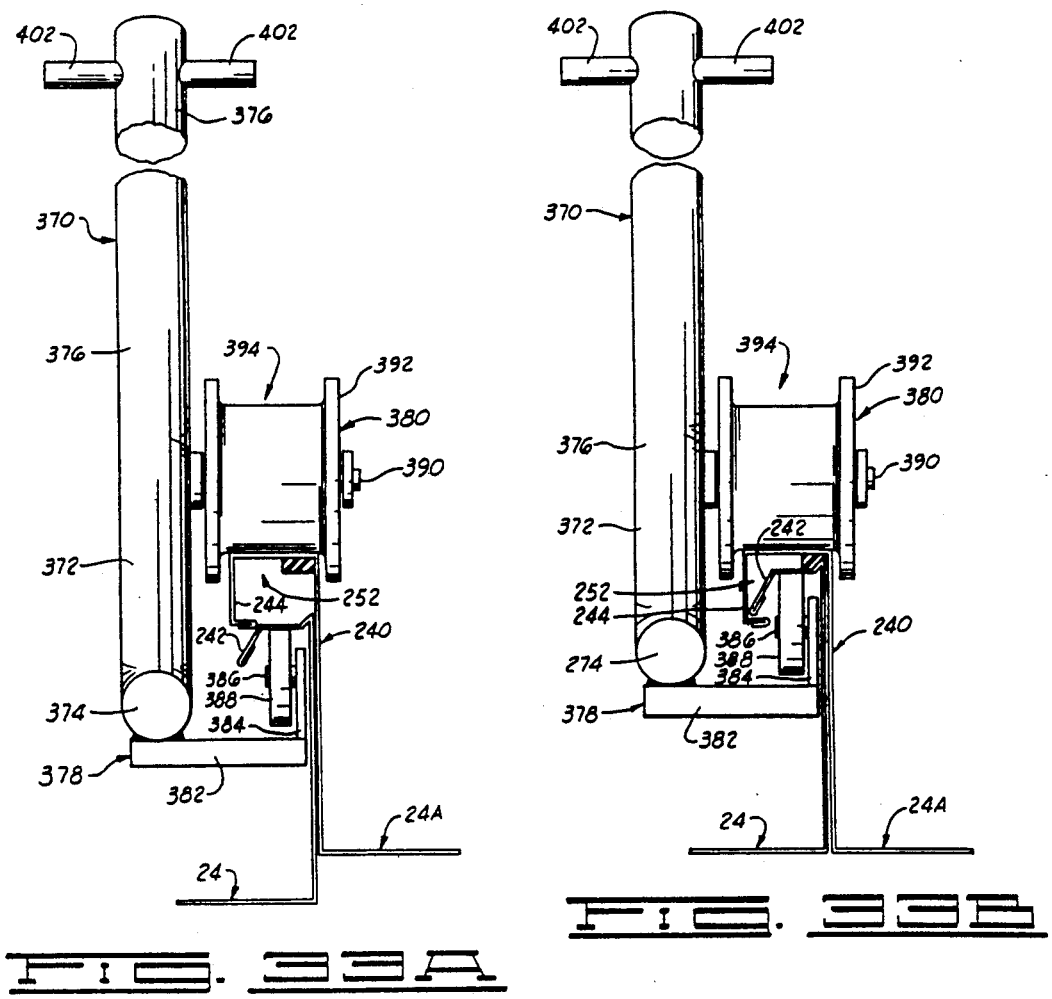
FIGS. 33A and 33B are end elevational views of the seam roller.

With reference to FIGS. 33, 33A and 33B, the seam roller 370 comprises frame member 372 having a forward end 374 and a rearward end 376. A male insertion assembly 378 is supported by the forward end 374, and a female backup assembly 380. The male insertion assembly 378 comprises a first support arm 382 preferably welded to extend normally to the frame 372 and supporting an upstanding second support arm 384 that supports a shaft 386. A male insertion wheel 388 is rotatingly mounted on the shaft 386 and is disposed for engagement with the underside of the male side lap portion 242 as shown in FIG. 33A which is an end view of the seam roller 370.

The female backup assembly 380 has a support shaft 390 which is supported by the frame 372 near its rearward end 376 to extend generally parallel to the first support arm 382. A female backup wheel 392 is rotatingly supported by the support shaft 390 and has a tracking groove 394 which is dimensioned to accept and track the female side lap portion 244 of the roof panel 24A as shown in FIG. 33A.

The frame 372 preferably is a tubular member having a minor angular bend at 396 generally near the forward end 374, and a handle member 398 (partially shown in the drawing) extends from the rearward end 376 at an angular disposition or bend at 400. The handle member 398 extends a selected distance and has a pair of hand grips 402 extensive from each side thereof.

Once the female side lap portion 244 has been positioned over the male side lap portion 242 (in the assembly process of installing adjacent roof panel members), interlocking of these female and male portions is achieved as follows. A workman, holding the handle member 398, causes the male insertion wheel 388 to be placed beneath the male side lap portion 242 in the manner depicted in FIG. 33A. Next, the workman, by rotating the handle member 398 toward the standing seam joint 240, causes the female backup wheel 392 to bear upon the top of the female side lap portion 244 as shown in FIG. 33B. The relational positions of the wheels 388, 392 are determined such that the leverage of the handle rotation causes the male side lap portion 242 to be forced into the insertion cavity 252 of the female side lap portion 244, as shown, above the male insertion wheel 388. Finally, the workman need only pull or push the handle member 398 along the length of the standing seam joint 240 with the handle 398 in this position to force sealing interlocking of the male and female side lap portions 242, 244. Once this has been achieved, disengagement of the seam roller 370 is accomplished by the workman rotating the handle member 398 away from the standing seam joint 240 and removing the male insertion wheel 388 from under the male side lap portion 242.

Figure 34:
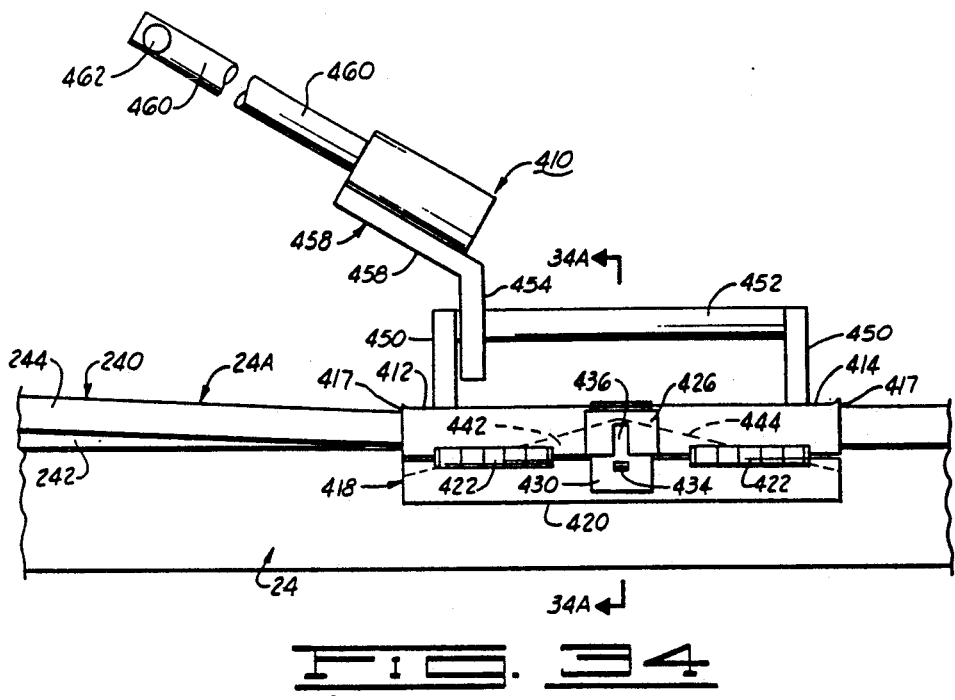
FIG. 34 is a side elevational view of an alternate seam roller.
Figures 34A, 34B:
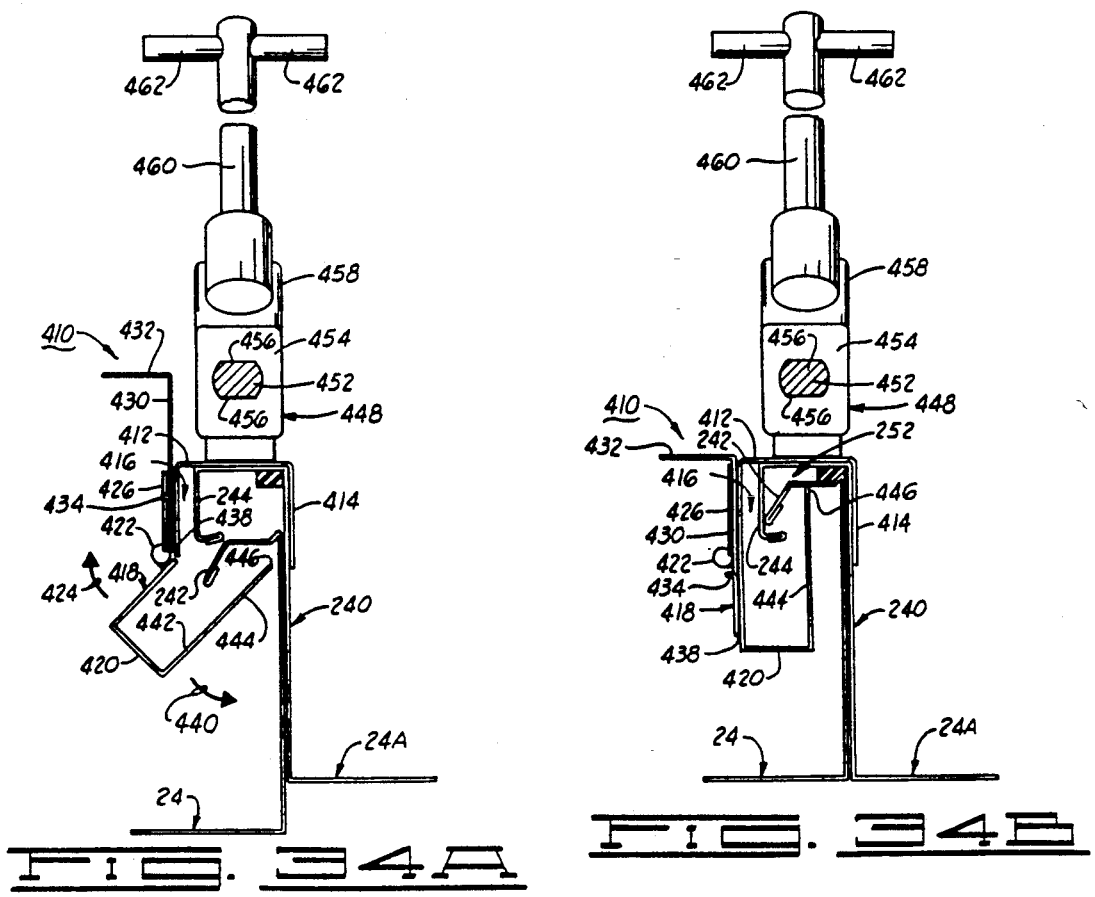
FIGS. 34A and 34B are end elevational views of that seam roller.

Another embodiment of a seam roller constructed in accordance with the present invention is shown in FIGS. 34 and 34A-34B wherein seam roller 410 comprises a frame member 412 having an upper channel shaped member 414 having a tracking groove 416 and having upturned flared edges 417 at the ends thereof. The tracking groove 416 is dimensioned to accept and track the female side lap portion 244 of the roof panel 24A. The member 414 serves as a backup assembly similar to that of the female backup assembly 380 described above for seam roller 370 (FIG. 33). A male insertion assembly 418 comprises a generally channel shaped member 420 and a pair of spring biased hinge members 422 which interconnect the member 420 and the member 414, the hinge members 422 being biased to rotate the member 420 in the direction indicated by arrow 424.

The male insertion assembly 418 also comprises a latch assembly 426 which is supported by the frame member 412 generally between the hinges 422. The latch assembly 426 forms a groove between itself and the frame member 412 and a blot plate 430 is disposed for sliding therein, the bolt plate 430 having a gripping portion 432 formed to extend generally normal to its body portion and having an extending tab member 434 that is clearingly received in a slot 436 such that the movement of the bolt plate 430 is selectively permitted between a downward locking mode shown in FIGS. 34 and 34B, and an upward unlocking mode shown in FIG. 34A. The lower edge 438 of the bolt plate 430 is beveled to reduce interfering contact with the member 420, the member 420 being rotatable in a direction indicated by arrow 440 as a workman forces the bolt plate 430 downward to its locking mode via the gripping portion 432. In the locking mode, the bolt plate 430 extends below the lower edge of the member 414. When a workman pulls up on the gripping portion 432, the bolt plate 430 is retracted from engagement with the member 420, thus permitting the biasing hinges 422 to rotate the member in the direction 424.

The channel shaped member 420 has a male insertion portion 442 that is supported for engagement with the underside of the male side lap portion 242 as shown in FIG. 34B when the bolt plate 430 is placed in its locking mode. The male insertion portion has an upper edge 444 as depicted by the dash lines in FIG. 34, with a rounded apex 446 being the contact with the male side lap portion 242.

The seam roller 410 further comprises a handle assembly 448 that connects to the frame 412 as follows. A pair of upwardly extending support plates 450 support a support rod 452 therebetween, and an apertured slide member 454 is slidably supported on the support rod 452. Preferably, the support rod 452 is flatted as at 456, as is the aperture in the slide member 454, in order to orient the slide member as depicted in FIG. 34. The slide member 454 has an angular upper portion 458 to which a handle member 460 is attached. A pair of hand grips 462 extend from opposite sides of the uppermost portion of the handle member 460.

Once the female side lap portion 244 of a panel, such as panel 24A, has been positioned over the male side lap portion 242 (such as of panel 24), interlocking of these members to form the standing seam joint 240 is achieved as follows. A workman, places the frame member 412 of the seam roller 410 over the female side lap portion 244, causing the tracking groove 416 to rest on top of the female side lap portion. Next, the workman forces the bolt plate 430 into its locking mode which rotates the male insertion assembly 418 so as to cause the apex 446 of the male insertion portion 442 to drive the male side lap portion 244 into the insertion cavity 252 of the female side lap portion 244. As the workman pulls or pushes, the seam roller 410 along the length of the standing seam joint 240 using the handle 460, the cooperative effort of the male insertion portion 442 and the tracking groove 416 of the frame member 412, which serves as a female backup member, causes sealing interlocking of the male and female side lap portions 242, 244. Once this has been achieved, disengagement of the seam roller 410 is accomplished by the workman simply pulling the bolt plate 430 into its unlocking mode which frees the male insertion assembly 418 to be rotated, via its spring hinge members 422, out of engagement with the standing seam joint 240, and the seam roller is then lifted therefrom.

Having now described the unique standing seam joint 240 (FIG. 25) and the seam roller 370 (FIG. 33), together with alternate seam roller 410 (FIG. 34), attention will now be directed to the dynamics of seam rolling as it relates to the present invention. With typical snap-together, standing seam joints it is possible to apply considerable force to the top of the female portion of the corrugation and the bottom of the male corrugation to force the male and female components into seating engagement. However, in the standing seam joint 240 of the present invention, the only force available to cause the male exterior edge 274 and the edge retaining lip 260 to become properly engaged is the residual elasticity in the male and female leg portions 266, 250. Sometimes the residual elasticity of these components is not sufficient to cause them to seat properly because of imperfection in the formation or assembly of the panel and the fact the forward portion of the panel not yet joined is elastically holding the joint apart so as to prevent these components from seating properly.

As shown in FIG. 33, there is a point where one joint edge actually crosses the other joint edge at an angle. It is only as the snap together process passes this point that the male edge may actually become seated or fully engaged by the female edge. As the snapping process continues, and as the resistance to nesting lessens as the cross-over point proceeds down the panel, the male exterior edge 274 begins to side down the edge retaining lip 260. By this time the two vertical forces driving the joint together has likewise moved down the length of the panel and it remains for the residual forces to seat the male and female edges properly. However, at this point, there is a force exerted by the side lap sealant 276 which tries to separate the joint components, and there is a mutual residual elasticity trying to force the edge 274 into nesting engagement with the edge retaining lip 260.

By having the inclination of the male leg 266 greater than the edge retaining lip 260 of female leg 250, it is possible to minimize the continued frictional engagement of the contacting portions of these two components and greatly encourage them to seat properly. If this is coordinated with an appropriate but limited amount of oversnap, it is possible to achieve a very desirable configuration with favorable seaming, or joining, characteristics. This will become clear as seaming of the standing seam joint 240 is considered.

With continued reference to FIG. 25: during the seaming operation, as the edge 274 clears the upper most part of the edge retaining lip 260, compression on the side lap sealant 276 caused by the seam roller 370 is at the maximum. As soon as the edge 274 begins to slide down the incline of the lip 260, the compressive force on the sealant 276 begins to diminish and the force required to drive the edge 274 along the incline of the lip 260 begins to diminish. However, if the angle 262 of the lip 260 is more than about 30°, the sealant 276 must be too severely over compressed and friction between the edge 274 and the lip 260 is increased accordingly, thus preventing initial movement of the edge 274 past the upper most portion of the lip 260. This process is facilitated if both edges of these engaging components are smoothe and rounded, as shown, to enhance movement therebetween.

It is clear that the present invention is well adapted to carry out the objects and to attain the ends and advantages mentioned as well as those inherent therein. While presently preferred embodiments of the invention have been described for purposes of this disclosure, numerous changes may be made which will readily suggest themselves to those skilled in the art and which are encompassed within the spirit of the invention disclosed and as defined in the appended claims.

What is claimed is:

1. A slope build-up system for roofs comprising:
a plurality of spaced, elongated spanning members adapted to be placed above an existing roof, and adapted to support structural members of a new roof;
independently, vertically adjustable stanchions supporting the spanning members at spaced intervals along their lengths whereby the spanning members can be held in the desired positions having a required degree of slope relative to the existing roof, each of said vertically adjustable stanchions comprising:
a pair of interfitting, elongated longitudinally adjustable channel sections; and
a device locking each of said interfitting, longitudinally adjustable channel sections at a location to establish the required and selected height for each of said stanchions.

2. A slope build-up system for roofs comprising:
a plurality of spaced, elongated spanning members adapted to be placed above an existing roof, and adapted to support structural members of a new roof;
independently, vertically adjustable stanchions supporting the spanning members at spaced intervals along the lengths whereby the spanning members can be held in desired positions having a required degree of slope relative to the existing roof, each of said vertically adjustable stanchions comprising:
a pair of interfitting, elongated longitudinally adjustable telescoping sections; and
a device locking each of said interfitting, longitudinally adjustable telescoping sections at a location to establish the required and selected height for each of said stanchions.

3. A slope build-up system for roofs comprising:
a plurality of spaced, elongated spanning channel members adapted to be placed above an existing roof, and adapted to support structural members of a new roof;
a plurality of independently, vertically adjustable stanchions arranged in at least one row and each having an upper end projecting into a spanning channel member fitted over said upper end, each of said stanchions being vertically adjustable and supporting the spanning members at spaced intervals along their lengths whereby the spanning members can be held in desired positions having a required degree of slope relative to the existing roof, each of said vertically adjustable stanchions comprising:
a pair of interfitting, elongated, longitudinally adjustable sections, each of said sections comprising inner and outer interfitting channel sections; and
a device locking each of said interfitting, longitudinally adjustable channel sections at a location to establish the required and selected height for each of said stanchions; and
fastener means attaching a spanning member to the stanchions in each of said rows of stanchions supporting the respective spanning member.

4. A slope build-up system for roofs comprising:
a plurality of new roof elements adapted to be located and supported above an existing roof;
independently vertically adjustable, horizontally spaced roofing support spacers supporting the new roof elements at horizontally spaced intervals whereby the new roof elements can be held in a desired form having a required degree of slope relative to the existing roof, and each of said vertically adjustable roofing support spacers comprising:
an upper web member;
a lower web member adjustably overlapping and bearing against said upper web member; and
fastening means adjustably interconnecting said upper and lower web members.

5. A slope build-up system for roofs as defined in claim 4 and further characterized as including means bracing at least one of said adjustable roofing support spacers.

6. A slope build-up system for roofs comprising:
an upper new roof adapted to span a major part of an existing roof;
a plurality of independently vertically adjustable roofing support spacers each having a fine degree of vertical adjustability supporting said upper new roof at horizontally spaced intervals, each of said vertically adjustable roofing support spacers adapted to be supported upon an existing roof, and each of said vertically adjustable roofing support spacers including:
a lower member having an upwardly directed part;
an upper member having a downwardly directed part;
said upwardly directed part overlapping said downwardly directed part and contacting said downwardly directed part, said overlapping parts being selectively adjustable relative to each other to change the vertical dimension of said vertically adjustable roofing support spacer; and means selectively securing said downwardly directed and upwardly directed parts to each other at a selected relative position to each other to thereby provide a fine degree of adjustability.

7. A slope build-up system for roofs as defined in claim 6 and further characterized as including means bracing each of said adjustable roofing support spacers.

8. A slope build-up system for roofs comprising:
a plurality of spaced, elongated top spanning members disposed in a selected desired collective configuration above an existing roof; and
a plurality of spaced, elongated bottom spanning members spaced below the top spanning members and supported by an existing roof;
a plurality of independent, vertically adjustable and lockable stanchions connected between the top and bottom spanning members at spaced intervals along the spanning members, said top and bottom spanning members comprising:
hat-shaped top and bottom channel members having their open sides in opposing relationship, said stanchions comprising extensible and retractable telescoping sections, with said stanchions having their top and bottom end portions fixedly secured within the top and bottom hat-shaped channel members, respectively.

9. A slope build-up system for roofs as defined in claim 8 wherein said telescoping sections consist of a pair of slidingly interfitted channel sections.

10. A slope build-up system as defined in claim 9 wherein said system further includes fastener means selectively interlocking said channel sections at a selected location therealong whereby said stanchions are each independently selectively vertically adjustable and are interlocked by means of said fastener means.

11. A slope build-up system for roofs as defined in claim 10 wherein said fastener means is a screw screwed into and through each of said channel sections.

12. A slope build-up system for roofs comprising:
a plurality of roof panels adapted to be supported above an existing roof;
a plurality of independently vertically adjustable, horizontally spaced roofing support spacer means supporting the roof panels at horizontally spaced intervals whereby the roof panels can be held in a desired relation to an existing roof, each of said vertically adjustable roofing support spacer means including:
an upper web member having a first fastener receiving aperture therethrough;
a lower web member having a second fastener receiving aperture therethrough in a position adapted for alignment with said first fastener receiving aperture, at least one of said fastener receiving apertures being elongated to facilitate variable alignment with the other of said apertures, said upper web member and said lower web member being overlapped so that said first and second fastener receiving apertures overlap to a selected extent; and
a fastener element extended through said first and second apertures and secured at a selected fixed location to secure the relative position of said upper web member to said lower web member to thereby selectively fix the vertically extending dimension of said roofing support spacer means.

13. A slope build-up system for roofs as defined in claim 12 and further characterized as including a brace element extending laterally from, and substantially normal to, each of said spacer means.

14. A slope build-up system for roofs comprising:
a plurality of spaced, elongated spanning members adapted to be placed above an existing roof, and adapted to support a new roof;
independently vertically adjustable, horizontal spaced stanchions supporting the spanning members at spaced intervals along their lengths whereby the spanning members can be held in a common plane having a selected arrayed configuration relative to the existing roof, and the spanning members being adapted to support a new roof, each of said vertically adjustable stanchions comprising:
a pair of interfitting, longitudinal adjustable channel sections; and
screw means for selectively interlocking said interfitting, longitudinally adjustable channel sections at a selected position relative to each other to establish the required and selected height for each of said stanchions; and
a lower, substantially horizontally extending member secured to the lower end of each of said vertically adjustable stanchions and supported by said existing roof.

15. A slope build-up system for roofs comprising:
a plurality of spaced, elongated, hat-shaped downwardly opening top spanning channels disposed substantially in a common plane above an existing roof;
a plurality of spaced, elongated, hat-shaped upwardly opening bottom spanning channels spaced below the top spanning channels and supported by the existing roof; and
a plurality of independent, vertically adjustable stanchions each having a top end portion and a bottom end portion, and each of said stanchions being connected between at least one of the top channels and one of the bottom channels, each of said stanchions comprising extensible and retractable telescoping sections, with said stanchions having their top and bottom end portions fixedly secured within the top and bottom hat-shaped channels, respectively.

16. A slope build-up system for roofs as defined in claim 15 wherein each of said adjustable stanchions consist of a pair of slidingly interfitted channel sections.

17. A slope build-up system for roofs comprising:
a plurality of space elongated top spanning members disposed substantially in a common plane above an existing substantially flat roof;
a plurality of spaced elongated bottom spanning members spaced below the top spanning members and adapted to rest upon an existing roof substantially in a common plane, said top and bottom spanning members extending in perpendicular relationship to each other and lying in planes crossing each other;
a plurality of independently vertically adjustable and lockable stanchions connected between the top and bottom spanning members at spaced intervals along the top and bottom spanning members;
the top and the bottom spanning members each comprising a hat-shaped channel member having its open side facing downwardly, in the case of the top spanning members, and facing upwardly in the case of the bottom spanning members;

each stanchion comprising extensible and retractable telescoping channel sections, and each stanchion having top and bottom end portions fixedly secured within hat-shaped channel members constituted one of the top spanning members and one of the bottom spanning members, respectively.

18. A slope build-up system for roofs as defined in claim 17 wherein each of said vertically adjustable roofing support spacers is an elongated element having a longitudinal axis, and wherein said bracing means comprises at least one bracing element adapted to extend between each of said vertically adjustable roofing support spacers and an existing roof and extending substantially normal to the plane of the longitudinal axis of said independently vertically adjustable roofing support spacer.

19. A slope build-system for roofs as defined in claim 18 wherein said fastening means is a screw.

20. A slope build-up system for roofs comprising:
a new roof adapted to span a major part of an existing roof;
a plurality of independently vertically adjustable roofing support spacers each having a fine degree of vertical adjustability supporting said new roof at horizontally spaced intervals, each of said vertically adjustable roofing support spacers adapted to be supported upon and existing roof, and each of said vertically adjustable roofing support spacers including:
a lower web member;
an upper web member overlapping said lower web member, and contracting said lower web member, said upper and lower web members being selectively adjustable relative to each other to change the vertical dimension of said vertically adjustable roofing support spacer; and
means selectively securing said upper and lower web members to each other at a selected relative position to each other to thereby provide a fine degree of adjustability;
means bracing each of said vertically adjustable roofing support spacers in two planes extending substantially perpendicular to the existing roof.

21. A slope build-up system for roofs comprising:
a new roof adapted to cover a major part of an existing roof;
a plurality of independently vertically adjustable roofing support spacers, said spacers supporting said new roof at spaced intervals, each of said vertically adjustable roofing support spacers adapted to be supported by an existing roof, and each of said vertically adjustable roofing support spacers including:
an upper member having a downwardly directed element;
a web member having upwardly directed and downwardly directed ends;
a lower member having an upwardly directed element;
the upwardly directed end of said web member overlapping the downwardly directed element of the upper member and contacting said downwardly directed element;
a downwardly directed end of said web member overlapping the upwardly directed element of the lower member and contacting said upwardly directed element;
the extent of overlap of portions of said web member with said upwardly directed element and said downwardly directed element being selectively adjustable relative to each other to thereby change the vertical dimension of the respective vertically adjustable roofing support spacer;
first securing means securing said upwardly directed end of said web member to the downwardly directed element of said upper member; and
second securing means securing said downwardly directed end of said web member to the upwardly directed element of said lower member;
one of said first and second securing means being selectively adjustable in its point of securement at a selected relative position as between the members thereby secured to each other to provide a fine degree of adjustability in the vertical height of said vertically adjustable roofing support spacers.

22. A slope build-up system for roofs as defined in claim 21 and further characterized as including means bracing each of said adjustable roofing support spacers.

23. A slope build-up system for roofs comprising, in combination:
an existing roof;
a plurality of spaced, elongated top spanning members disposed above said existing roof; and
a plurality of spaced, elongated bottom spanning members spaced below the top spanning members and supported by said existing roof and extending perpendicular with respect to said top spanning members; and
a plurality of independent, vertically adjustable and lockable stanchions connected between at least one of the top spanning members and one of the bottom spanning members.

24. A slope build-up system for roofs comprising:
a roof adapted to cover a major part of an existing roof;
a plurality of roofing support spacers each having vertical adjustability supporting said roof at spaced intervals, each of said vertically adjustable roofing support spacers adapted to be supported by an existing roof, and each of said vertically adjustable roofing support spacers including:
an elongated, upper member having a downwardly directed element;
an elongated lower member having an upwardly directed element;
a first elongated web extending upwardly from said lower member to said upper member and defining an acute angle with said upper member, said first web having an upwardly directed end and a downwardly directed end, said upwardly directed end of the first web overlapping the downwardly directed element of the upper member, and said downwardly directed end of the first web overlapping the upwardly directed element of said lower member;
first fastener means securing the upwardly directed end of said first web to the downwardly directed element of the upper member;
second fastener means securing the downwardly directed end of said first web to the upwardly directed element of said lower member;
at least one of said first and second fastener means being located at a selected location along the respective upper or lower member to facilitate selective adjustment of the vertical distance by which said upper member is spaced above said lower member;

a second elongated web extending upwardly from said lower member to said upper member and defining an acute angle with said upper member, said second web having an upwardly directed end, and a downwardly directed end, said upwardly directed end of said second web overlapping the downwardly directed element of said upper member, and said downwardly directed end of said second web overlapping the upwardly directed element of said lower member, said second elongated web extending in the opposite direction from the direction of extension of the first web;

third fastener means securing the upwardly directed end of said second web to said downwardly directed element of the upper member;

fourth fastener means securing the downwardly directed end of said second web to the upwardly directed element of said lower member;

at least one of said third and fourth fastener means being located at a selected location along the respective upper and lower member to facilitate selective adjustment of the vertical distance by which said upper member is spaced above said lower member; and whereby by reason of the extension of said first and second webs in opposite directions, said first and second webs act to brace said upper member as well as to support and space said upper member above said lower member by a selected vertical distance.

25. A slope build-up system for roofs as defined in claim 24 wherein at least one of said first and second webs is bendable to selectively change the angulation of said bendable web with respect to said upper member and said lower member to thereby vary the spacing between said upper member and said lower member.

26. A slope build-up system for roofs as defined in claim 24 wherein said upper member and said lower member are in non-parallel, non-coplanar planes.

27. A slope build-up system for roofs as defined in claim 24 wherein at least one of said first and second webs is rotatable about an axis which is located so as to permit said web to extend at an acute angle of selectively variable magnitude to one of said upper members or lower members as a result of such rotation, to thereby facilitate the selective adjustment of the vertical distance separating said upper members from said lower members.

28. In a slope build-up system for re-roofing a building which includes, in combination, a building, an old pre-existing roof, and a new roof at a higher level over and above the old pre-existing roof, the improvement which comprises:

a plurality of elongated, horizontally spaced upper members supporting at least a portion of the new roof located thereabove;

a plurality of elongated, horizontally spaced lower members supported by the old existing roof;

a plurality of horizontally spaced roofing support spacer means positioned between each of said upper members and at least one of said lower members, each of said roofing support spacer means having an upper end portion and a lower end portion;

a first connecting means for connecting the upper end portion of each of said support spacer means to one of said upper members, said first connecting means constituting first pivot pins;

a second connecting means for connecting the lower end portion of each of said spacer means to one of said lower members, said second connecting means consisting of second pivot pins; and wherein each of said first connecting means, or each of said second connecting means, or both of said first and second connecting means, are selectively adjustable in the location at which said upper or said lower end portions of said spacer means are both the upper and lower end portions thereof are connected to said upper and lower members, or, are connected to be adjustable in the angle at which the upper or lower end portions of said spacer means extends to said upper and lower members to thereby facilitate selective adjustment of the height of each adjusting member above each one of said lower members.

29. In a slope build-up system for re-roofing a building which includes, in combination, a building, an old pre-existing roof, and a new roof at a higher level over and above the old existing roof, the improvement as defined in claim 28, wherein the upper end portion of each of said roofing support spacer means overlaps and contacts one of said upper members.

30. In a slope build-up system for re-roofing a building which includes, in combination, a building, an old pre-existing roof, and a new roof at a higher level over and above the old existing roof, the improvement as defined in claim 29, wherein each of said second connecting means connecting each of said lower end portions to said lower members comprises a pivot pin.

31. In a slope build-up system for re-roofing a building which includes, in combination, a building, an old pre-existing roof, and a new roof at a higher level over and above the old existing roof, the improvement as defined in claim 29, wherein said lower end portion of said roofing support spacing means are adjustably connected to the respective lower members.

32. In a slope build-up system for re-roofing a building which includes, in combination, a building, an old pre-existing roof, and a new roof at a higher level over and above the old existing roof, the improvement as defined in claim 31, wherein said upper end portions of said roofing support means are adjustably connected to the respective upper members at selected locations therealong.

33. In a slope build-up system for re-roofing a building which includes, in combination, a building, an old pre-existing roof, and a new roof at a higher level over and above the old existing roof, the improvement as defined in claim 28, wherein said lower end portions of said roofing support spacing means are adjustably connected to the respective lower members.

34. In a slope build-up system for re-roofing a building which includes, in combination, a building, an old pre-existing roof, and a new roof at a higher level over and above the old existing roof, the improvement as defined in claim 28, wherein said upper end portions of said roofing support means are adjustably connected to the respective upper members at selected locations therealong.

35. In a slope build-up system for re-roofing a building which includes, in combination, a building, an old pre-existing roof, and a new roof at a higher level over and above the old existing roof, the improvement as defined in claim 29, wherein said upper end portions of said roofing support means are adjustably connected to the respective upper members at selected locations therealong.

36. In a slope build-up system for re-roofing a building which includes, in combination, a building, an old pre-existing roof, and a new roof at a higher level over and above the old pre-existing roof, the improvement which comprises:

- a plurality of elongated, horizontally spaced upper members supporting at least a portion of the new roof located thereabove;
- a plurality of elongated, horizontally spaced lower members supported by the old existing roof;
- a plurality of horizontally spaced roofing support spacer means positioned between each one of said upper members and one of said lower members, each of said roofing support spacer means having an upper end portion and a lower end portion;
- each of said upper members having a downwardly directed element overlapping and in contact with, said upper end portion of one of said spacer means;
- a first connecting means connecting the upper end portion of each of said support spacer means to the downwardly directed element of a respective one of said upper members; and
- a second connecting means for connecting the lower end portion of each said support spacer means to one of said lower members; and
- wherein said second connecting means is selectively adjustable in the location at which said lower end portions of said spacer means are connected to said lower members to thereby facilitate selective adjustment of the height of each of said upper members above at least one of said lower members.

37. In a slope build-up system for re-roofing a building which includes, in combination, a building, an old pre-existing roof, and a new roof at a higher level over and above the old pre-existing roof, the improvement which comprises:

- a plurality of elongated, horizontally spaced upper members supporting at least a portion of the new roof located thereabove;
- a plurality of elongated, horizontally spaced lower members supported by the old existing roof;
- a plurality of horizontally spaced roofing support spacer means positioned between each one of said upper members and one of said lower members, each of said roofing support spacer means having an upper end portion and a lower end portion;
- a first connecting means for connecting the upper end portion of each of said support spacer means to one of said upper members, said first connecting means constituting first pivot pins;
- a second connecting means for connecting the lower end portion of each of said spacer means to one of said lower members, said second connecting means constituting second pivot pins; and
- wherein each of said first connecting means and each of said second connecting means, or both of said first and said second connecting means, are selectively adjustable in the location at which said upper or said lower end portions of said spacer means, or both the upper and lower end portions thereof, are connected to said upper and lower members, or, are connectably adjustable in the angles at which the upper or lower end portions of said spacer means extend to said upper and lower members to thereby facilitate selective adjustment of the height of each adjusting member above said lower members; and
- wherein the lower end portion of each of said roofing support spacer means overlaps and contacts one of said lower members.

38. A method of re-roofing an existing roof of a structure by selectively supporting a new roof of a selectively variable configuration at selected vertical distances above selected locations on the existing roof by means of selectively vertically adjustable support spacers, said method comprising:

providing a multiplicity of said selectively vertically adjustable support spacers selectively sized so as to be locatable between the existing roof and the new roof when the new roof is positioned at a selected desired location, said support spacers each including:
- a lower member securable to the existing roof;
- an upper member spaced above the lower member and adapted to support the new roof at one location; and
- at least one web means extendable between said upper member and said lower member and having an upper end adapted to contact and support said upper member, said web means being selectively movable relative to said upper member and said lower member to facilitate selectively elevating or lowering the upper member relative to the lower member and also relative to the existing roof, each of said web means being initially connected either to one of said upper members, or to one of said lower members, each of said web means being selectively movable relative to said upper and lower members by changing its angular relationship to at least one of said upper and lower members.

39. A method of re-roofing an existing roof as defined in claim 38 wherein the angular relationship of at least one of said web means to at least one of said upper and lower members is changed by bending a first portion of said one web means relatively to a second portion of said one web means to change the angle between the two portions of the respective web means thus subjected to such bending.

40. A method of re-roofing an existing roof as defined in claim 38 wherein one end of each of said web means is pivotally connected to either the adjacent upper member or the adjacent lower member in the same respective vertically adjustable support spacer in which the respective web means is located, and wherein said angular relationship is changed by pivoting the web means about the pivotal axis of its point of pivotal connection so as to change the angle at which the respective web means extends with respect to said upper and lower members.

41. A method of re-roofing an existing roof of a structure by selectively supporting a new roof of a selectively variable configuration at selected vertical distances above selected locations on the existing roof by means of selectively vertically adjustable support spacers, said method comprising:

providing a multiplicity of said selectively vertically adjustable support spacers selectively sized so as to be locatable between the existing roof and the new roof when the new roof is positioned at a desired location, said support spacers each including:

a lower member securable to the existing roof;

an upper member spaced above the lower member and adapted to support the new roof at one location; and at least one web means extendable between said upper member and said lower member and having an upper end adapted to contact and support said upper member, said web means being selectively movable relative to said upper member and said lower member to facilitate selectively elevating or lowering the upper member relative to the lower member and relative to the existing roof, each of said web means being initially connected either to one of said upper members or to one of said lower members, each of said web means being selectively moved relative to said upper and lower members by changing its angular relationship to at least one of said upper and lower members;

securing a first of said lower members of a first of said vertically adjustable support spacers to the existing roof at a selected location;

securing at least one additional lower member of at least one additional vertically adjustable support spacer to the existing roof at selected locations in positional relation to said first lower member as determined by where support is to be provided for the new roof;

each of said web means in each of said support spacers being an elongated web member extended from one of said lower members to one of said upper members;

wherein at least one of said elongated web members is extended in a direction from a lower member to which said lower end of the respective one of the elongated web member is connected which is opposite from the direction of extension of at least one other of said elongated web members from the point at which the lower end of said other elongated web member is connected to said lower member to thereby provide bracing of an upper member supported on the upper ends of said elongated web members which are extended in opposite directions with respect to each other;

selectively moving said web means in said first vertically adjustable support spacer and in each of said additional vertically adjustable support spacers relative to said upper and lower members in said first and additional vertically adjustable support spacers;

supporting said upper members in said first and additional support spacers upon said selectively moved web means to selectively establish the vertical distance of said upper members above the existing roof to which the several lower members are secured, said vertical distances being established in accordance with prior selective movement of the several web means;

positioning at least a portion of the new roof on the several upper members of the vertically adjustable support members after the vertical relationship of the new roof to the old roof has been established; and connecting said portion of the new roof to said upper members.

* * * * *

UNITED STATES PATENT AND TRADEMARK OFFICE
CERTIFICATE OF CORRECTION

PATENT NO. : 5,303,528
DATED : April 19, 1994
INVENTOR(S) : Harold G. Simpson and Leo E. Neyer It is certified that error appears in the above-indentified patent and that said Letters Patent is hereby corrected as shown below:

Column 6, lines 6 and 7, delete "factor-s" and substitute therefor --factors--;

Column 35, line 33, delete "blot" and substitute therefor --bolt--; and

Column 37, line 61, after "along" delete "the" and substitute therefor --their--.

Signed and Sealed this

Twenty-ninth Day of November, 1994

Attest:

BRUCE LEHMAN

*Attesting Officer*  *Commissioner of Patents and Trademarks*